US011945092B2

(12) United States Patent
Kamiya

(10) Patent No.: US 11,945,092 B2
(45) Date of Patent: Apr. 2, 2024

(54) POWER TOOL

(71) Applicant: MAKITA CORPORATION, Anjo (JP)

(72) Inventor: Takeshi Kamiya, Anjo (JP)

(73) Assignee: MAKITA CORPORATION, Anjo (JP)

( * ) Notice: Subject to any disclaimer, the term of this patent is extended or adjusted under 35 U.S.C. 154(b) by 70 days.

(21) Appl. No.: 17/694,858

(22) Filed: Mar. 15, 2022

(65) Prior Publication Data

US 2022/0314418 A1 Oct. 6, 2022

(30) Foreign Application Priority Data

Apr. 2, 2021 (JP) ................................ 2021-063670

(51) Int. Cl.
*B25F 5/00* (2006.01)
*B25B 21/02* (2006.01)

(52) U.S. Cl.
CPC .............. *B25F 5/001* (2013.01); *B25B 21/02* (2013.01)

(58) Field of Classification Search
CPC ........ B25B 21/02; B25B 21/008; B25F 5/001
See application file for complete search history.

(56) References Cited

U.S. PATENT DOCUMENTS

2019/0160636 A1 5/2019 Hirabayashi et al.
2020/0353610 A1* 11/2020 Huggenberger .......... B25F 5/02
2021/0170564 A1* 6/2021 Gehret .................... B23B 45/00

FOREIGN PATENT DOCUMENTS

EP 2551064 A2 * 1/2013 ........... B23B 45/008
JP 2019-098450 A 6/2019

* cited by examiner

*Primary Examiner* — Daniel Jeremy Leeds
(74) *Attorney, Agent, or Firm* — Oliff PLC

(57) ABSTRACT

A power tool includes a reducer that has a small size in an axial direction and is highly durable, although including a transmission mechanism. The power tool includes a motor, a reducer that reduces rotation from the motor, and an actuator to be actuated by the rotation reduced by the reducer. The reducer includes at least two stages of internal gears aligned in an axial direction, a preceding planetary gear and a succeeding planetary gear adjacent to each other in the axial direction to revolve within the internal gears, and at least two stages of carriers aligned in the axial direction. A carrier of the carriers supports the preceding planetary gear and the succeeding planetary gear radially overlapping each other with a single pin.

20 Claims, 31 Drawing Sheets

POWER TOOL

CROSS-REFERENCE TO RELATED APPLICATIONS

This application claims the benefit of priority to Japanese Patent Application No. 2021-063670, filed on Apr. 2, 2021, the entire contents of which are hereby incorporated by reference.

BACKGROUND

1. Technical Field

The present disclosure relates to a power tool including a reducer.

2. Description of the Background

Power tools such as impact drivers include a reducer to reduce the rotation speed of a motor and transmit the reduced rotation to an output shaft such as an anvil. Japanese Unexamined Patent Application Publication No. 2019-98450 describes a reducer that includes axially aligned multiple gear stages each including multiple planetary gears, a carrier supporting the planetary gears with pins, and an internal gear having internal teeth to revolve the planetary gears.

BRIEF SUMMARY

Such a known reducer includes two axially-adjacent internal gears rotatably in preceding and succeeding stages. The reducer selectively restricts rotation of the two internal gears to select from two variable speeds. In this case, a single carrier supports the corresponding planetary gears in the preceding and succeeding stages with a single pin. Thus, an axially longer pin may be used, and the reducer may be enlarged. The pin can break or deform and is less durable.

One or more aspects of the present disclosure are directed to a power tool including a reducer that has a small size in the axial direction and is highly durable.

An aspect of the present disclosure provides a power tool, including:

- a motor;
- a reducer configured to reduce rotation from the motor, the reducer including
  - at least two stages of internal gears aligned in an axial direction,
  - a preceding planetary gear in a preceding stage,
  - a succeeding planetary gear in a succeeding stage adjacent to the preceding planetary gear in the axial direction, the preceding planetary gear and the succeeding planetary gear being configured to revolve within the internal gears, and
  - at least two stages of carriers aligned in the axial direction, a carrier of the carriers supporting the preceding planetary gear and the succeeding planetary gear radially overlapping each other with a single pin; and
- an actuator configured to be actuated by the rotation reduced by the reducer.

The power tool according to the above aspect includes the reducer that has a small size in the axial direction and is highly durable.

DETAILED DESCRIPTION

Embodiments of the present disclosure will now be described with reference to the drawings.

Overview of Impact Driver and Housing Structure

Figure 1:
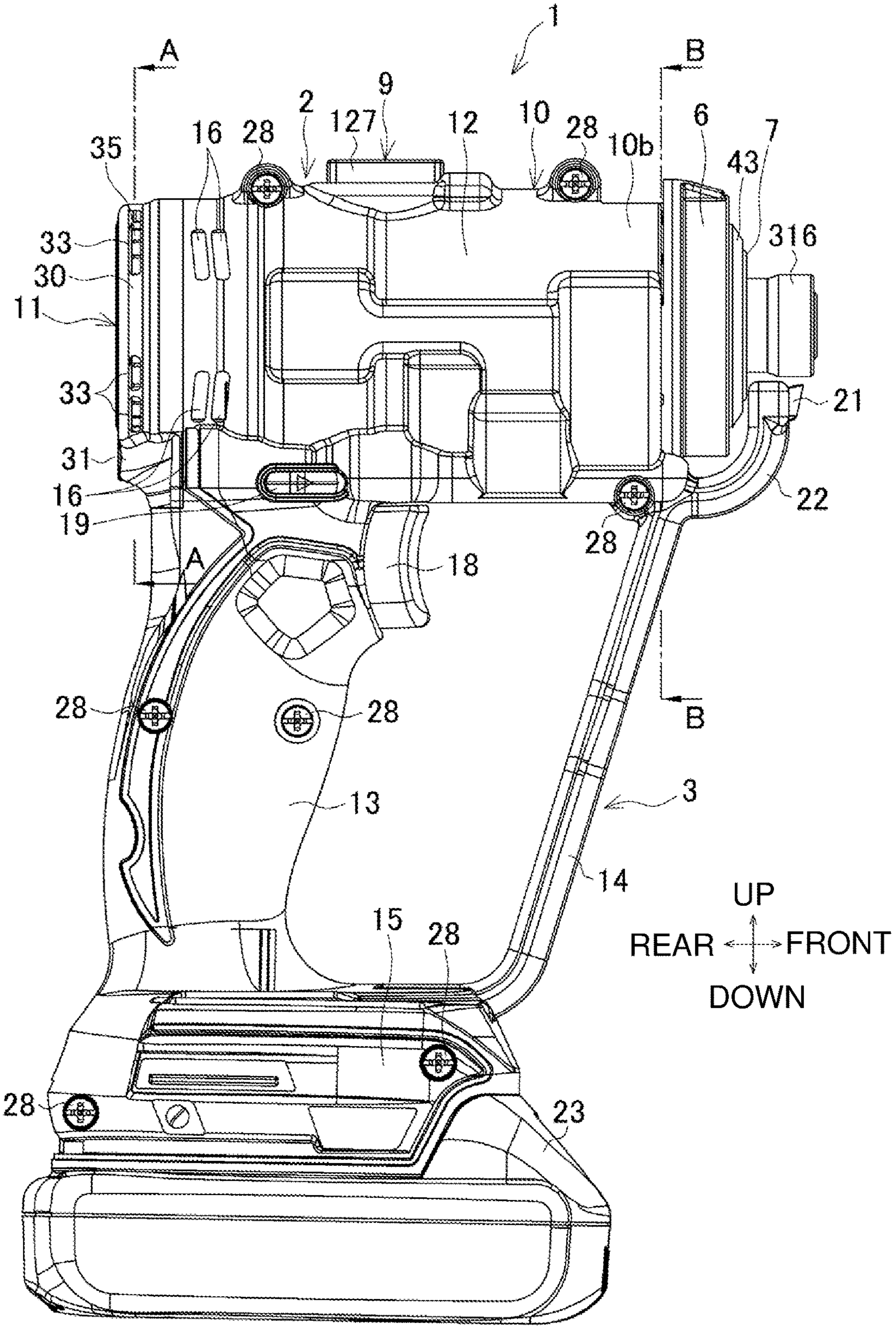
FIG. 1 is a side view of an impact driver.
Figure 2:
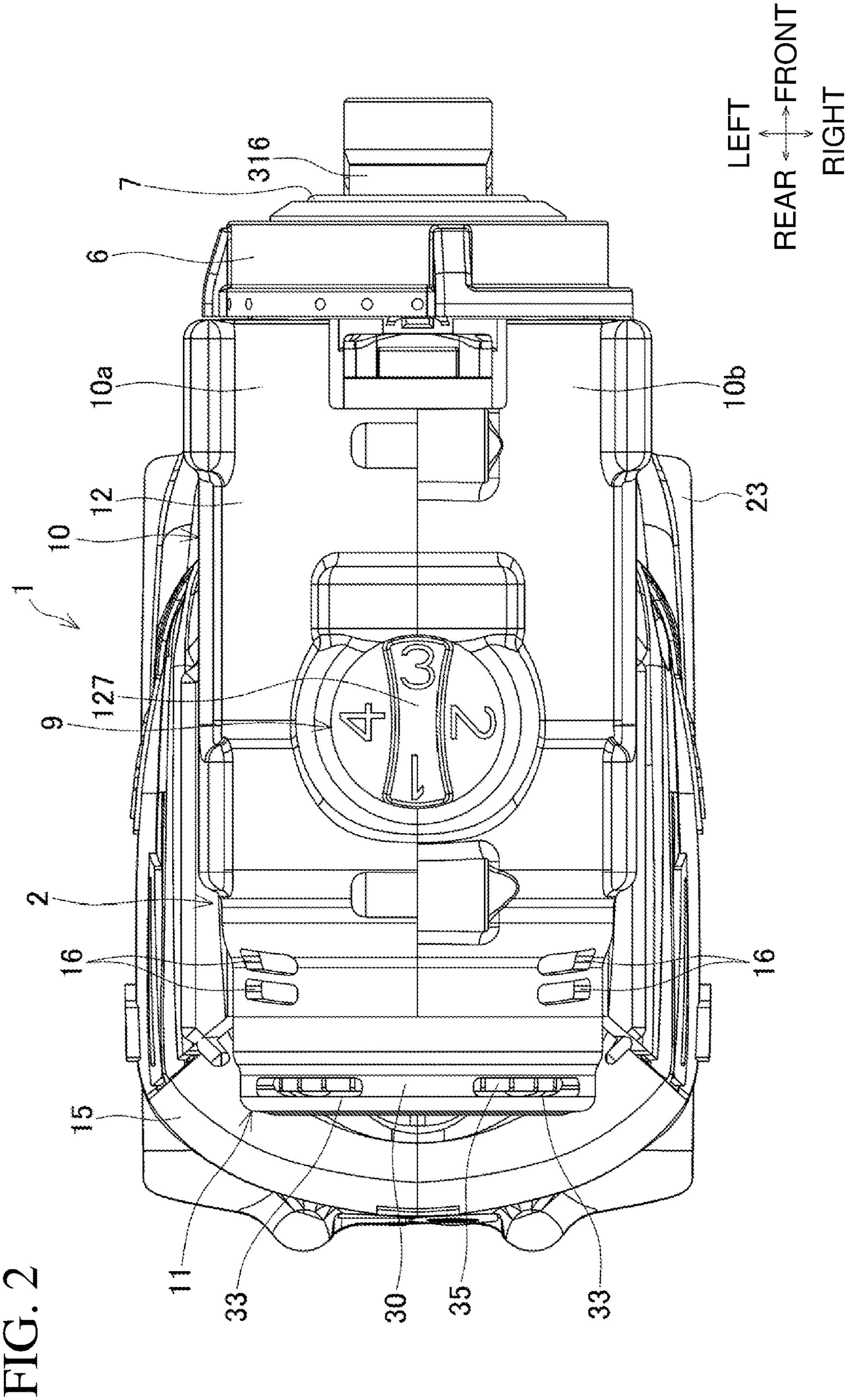
FIG. 2 is a plan view of the impact driver.
Figure 3:
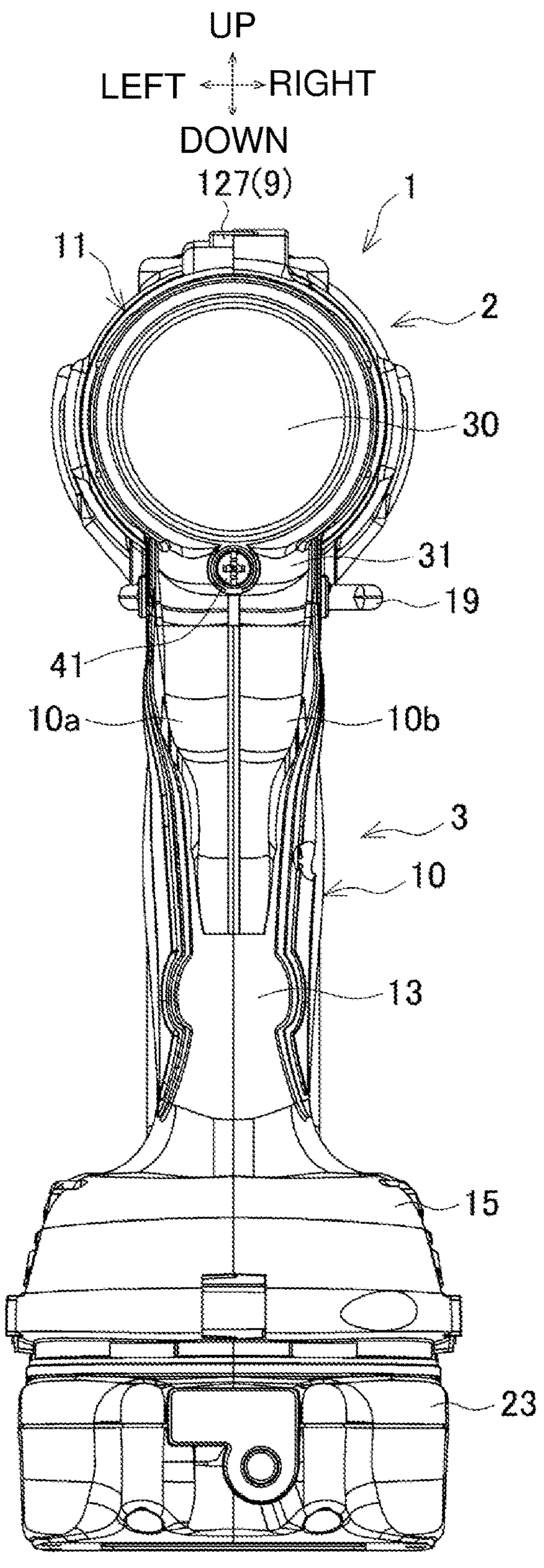
FIG. 3 is a rear view of the impact driver.
Figure 4:
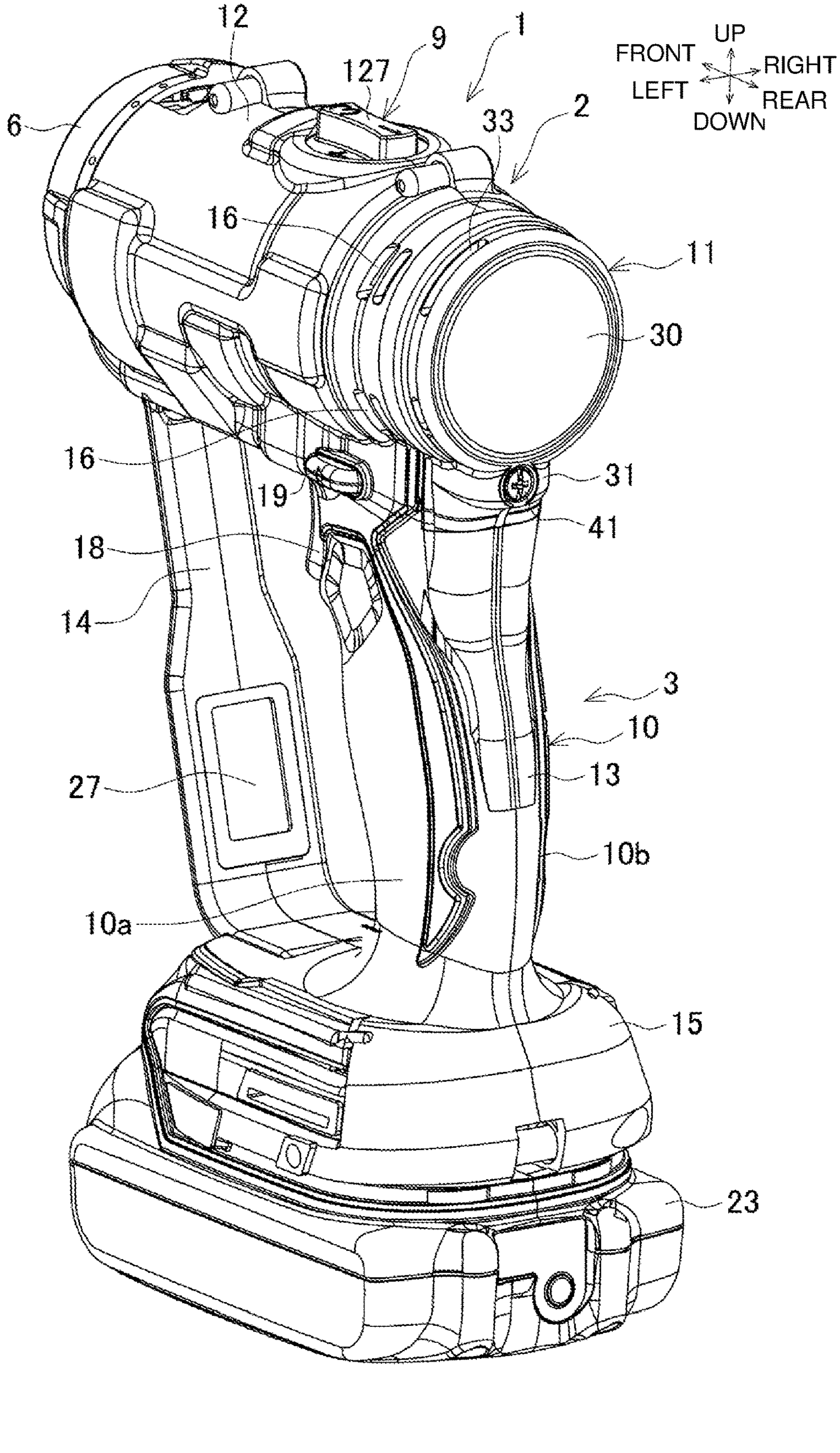
FIG. 4 is a rear perspective view of the impact driver.
Figure 5:
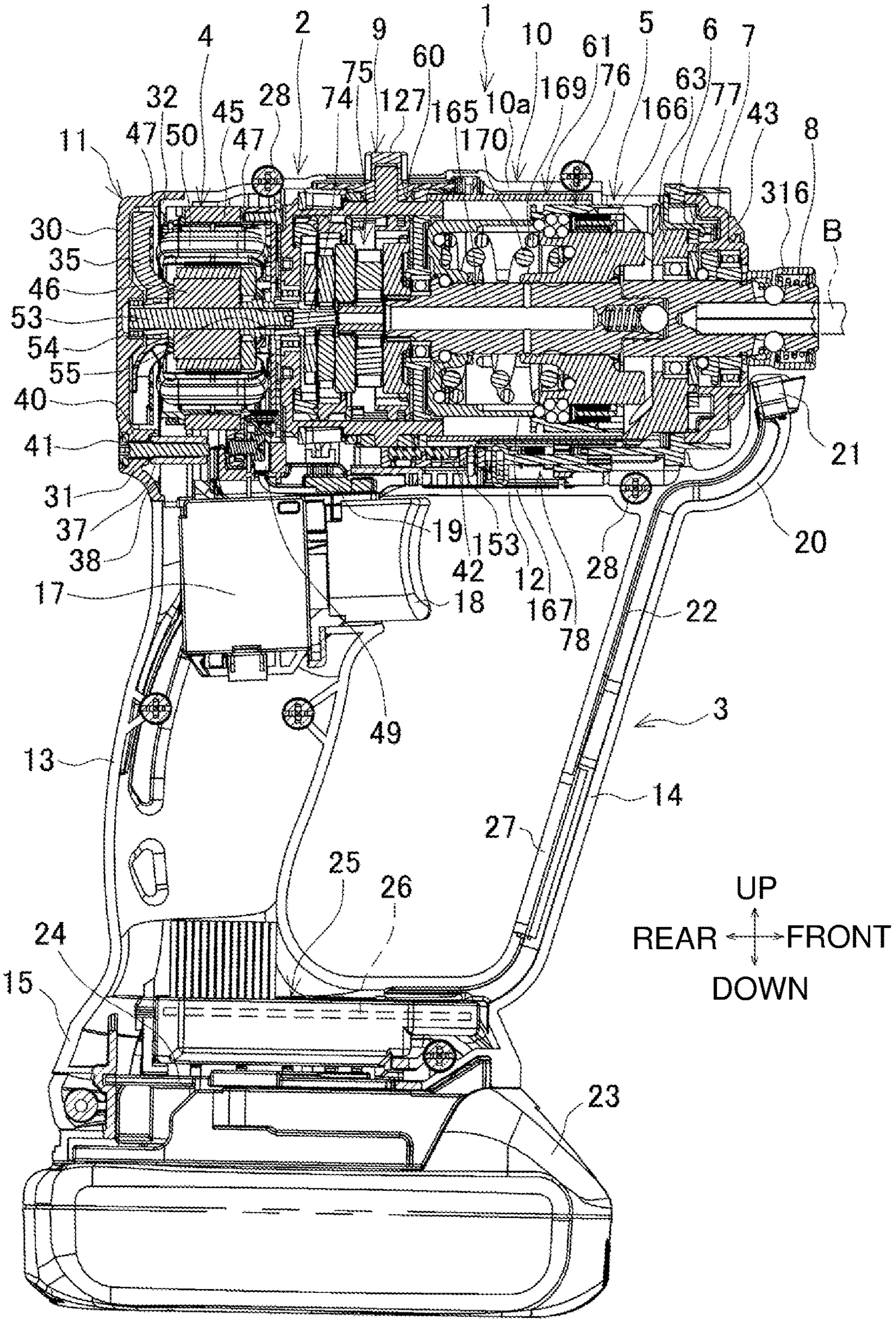
FIG. 5 is a central longitudinal sectional view of a main body of the impact driver without a right half housing.

FIG. 1 is a side view of a rechargeable impact driver as an example of a work tool, a power tool, or an impact tool. FIG. 2 is a plan view of the impact driver. FIG. 3 is a rear view of the impact driver. FIG. 4 is a rear perspective view the impact driver. FIG. 5 is a central longitudinal sectional view of a main body of the impact driver without a right half housing.

An impact driver 1 includes a main body 2 and a handle 3. The main body 2 has a central axis extending in a front-rear direction. The main body 2 contains a motor 4 and an actuator unit 5. The actuator unit 5 includes a mode change ring 6 in its front portion. The mode change ring 6 is exposed outside. A hammer case 7 is located in front of the mode change ring 6. The hammer case 7 is exposed frontward. The actuator unit 5 includes an anvil 8. The anvil 8 protrudes frontward from a middle portion of the hammer case 7. A speed switching dial 9 is located on the upper surface of the actuator unit 5 and exposed upward. The speed switching dial 9 is rotatable.

The handle 3 protrudes downward from the main body 2. The hammer case 7 receives a rubber bumper 43 on its front surface.

The impact driver 1 includes a housing including a body housing 10, a rear cover 11, and the hammer case 7. The body housing 10 includes a body 12, a grip 13, a guard 14, and a battery mount 15. The body 12 is cylindrical and serves as a middle part of the main body 2 excluding the front and rear ends. The body 12 has multiple inlets 16 in its left and right rear portions. The body 12 holds the motor 4 and the actuator unit 5. The mode change ring 6 and the hammer case 7 are exposed at the front of the body 12.

The grip 13 extends downward from the rear end of the body 12 to be a rear part of the handle 3. A switch 17 is located at the upper end of the grip 13. The switch 17 has a trigger 18 protruding frontward. The grip 13 is at the rear end of the body 12. This allows gripping the basal end of the grip 13 and facilitates pushing of the main body 2 forward. A forward-reverse switch button 19 for the motor 4 is located above the switch 17.

The guard 14 extends downward from the front end of the body 12 to be a front part of the handle 3. The guard 14 has a smaller lateral width than the grip 13. The guard 14 overlaps the grip 13 as viewed from the front. The guard 14 has a raised portion 20 at its upper end. The raised portion 20 is curved to below the anvil 8 in front of the main body 2. A lamp 21 is located at the upper end of the raised portion 20. The lamp 21 illuminates ahead of the anvil 8. The internal space of the guard 14 serves as a wiring housing 22. The wiring housing 22 houses, for example, lead wires (not shown) that electrically connect a controller 25 (described later), the lamp 21, sensors, and other components to one another.

The battery mount 15 connects to the lower end of the grip 13 and the lower end of the guard 14. Thus, the handle 3 is looped. The battery mount 15 receives a battery pack 23 as a power supply in a manner slidable from the front. The battery mount 15 includes a terminal mount 24 and the controller 25. The terminal mount 24 is electrically connectable to the battery pack 23. The controller 25 includes a control circuit board 26. The controller 25 performs various control operations such as controlling the motor 4 and monitoring the remaining power level of the battery pack 23. The controller 25 also has an electronic clutch function of stopping the rotation of the motor 4 in response to the output torque reaching or exceeding a predetermined value.

A display 27 is located on the back surface of (inside) the guard 14. The display 27 is electrically connected to the control circuit board 26 with lead wires (not shown). The display 27 shows, for example, the remaining power level of the battery pack 23 and the number of gears of the electronic clutch. The display 27 is a touchscreen. The number of gears of the electronic clutch can be selected by touching the display 27.

The body housing 10 and the rear cover 11 are formed from a resin. The body housing 10 includes left and right half housings 10*a* and 10*b*, which are joined together with multiple screws 28 placed from the right.

Figure 6A:
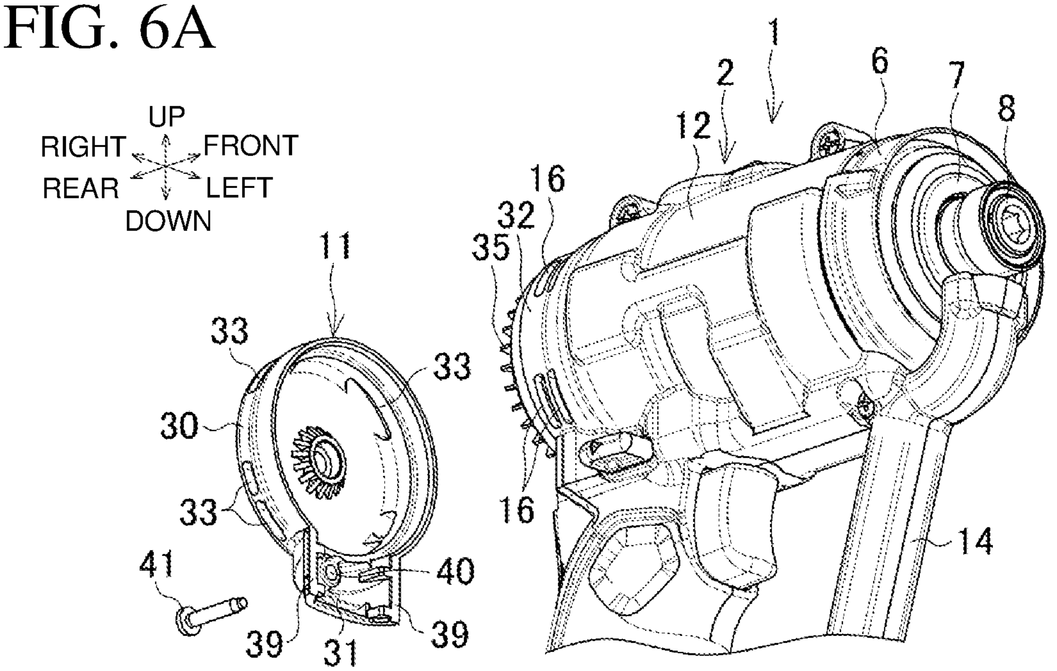
FIG. 6A is a partial front perspective view of the impact driver with a rear cover being removed.
Figure 6B:
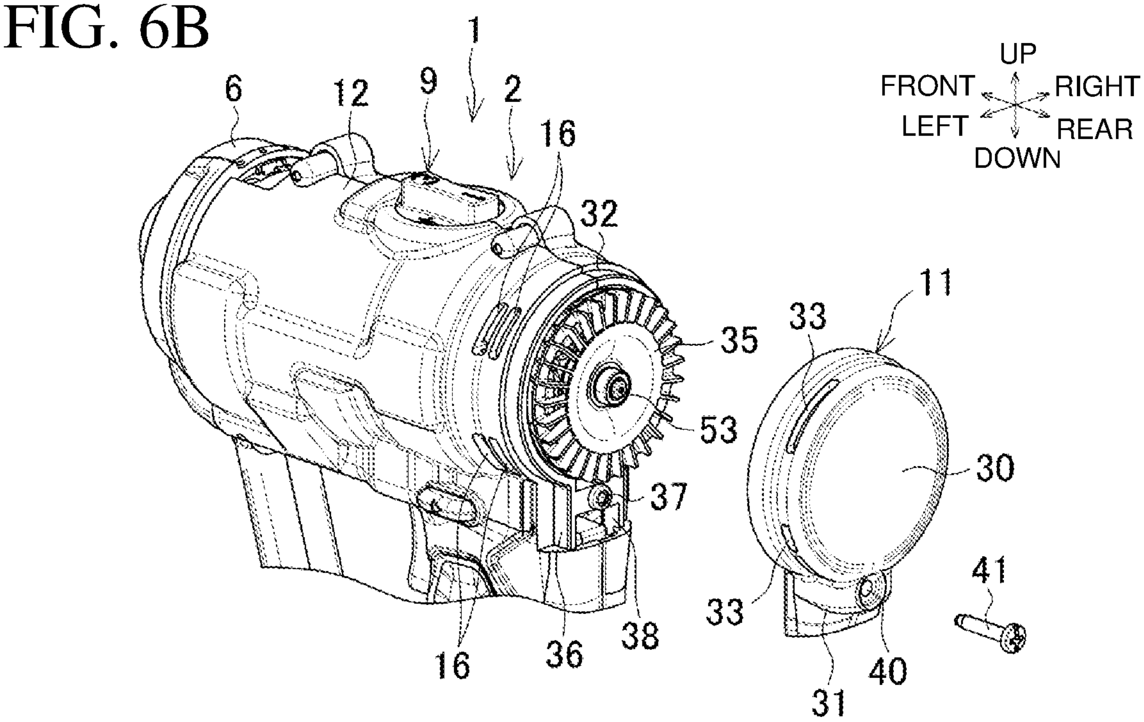
FIG. 6B is a partial rear perspective view of the impact driver with the rear cover being removed.

The rear cover 11 includes a cap 30 and a screw reception 31. The cap 30 is circular as viewed from the rear. As shown in FIGS. 6A and 6B, the cap 30 is tightly fitted over a cylindrical section 32 at the rear end of the body 12 from behind. The cap 30 has multiple outlets 33 in its peripheral surface. The outlets 33 are elongated in the circumferential direction of the cap 30.

Figure 7:
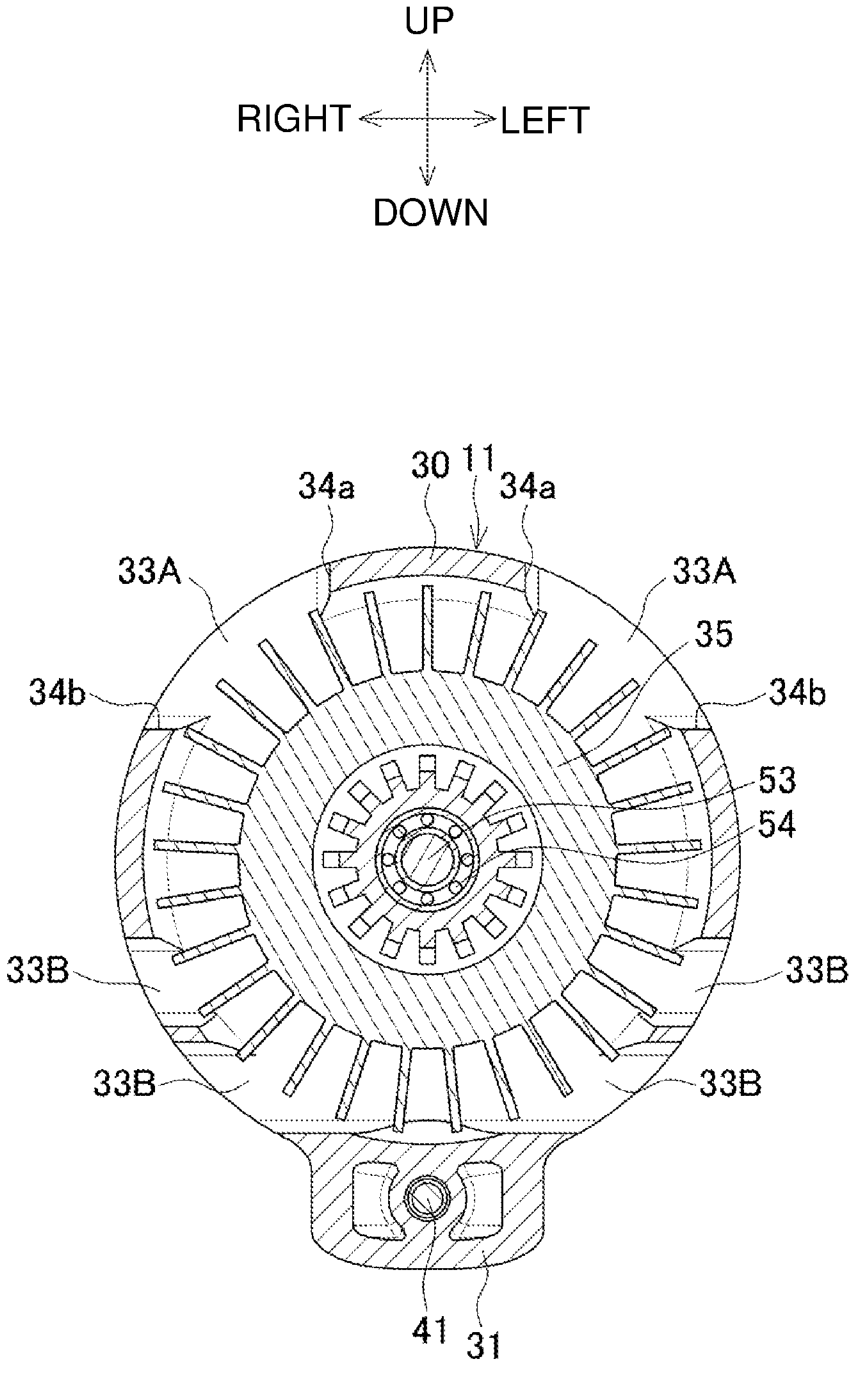
FIG. 7 is an enlarged sectional view taken along line A-A in FIG. 1.

As shown in FIG. 7, the upper half of the cap 30 has a right outlet 33A and a left outlet 33A (referred to as outlets 33A when distinguished from the outlets 33) elongated in the circumferential direction. The lower half of the cap 30 has two right outlets 33B and two left outlets 33B (referred to as outlets 33B when distinguished from the outlets 33) shorter in the circumferential direction. In the upper two outlets 33A, inner edges 34*a* that are circumferentially adjacent to each other extend vertically. Inner edges 34*b* circumferentially apart from each other extend laterally. The inner edges of the four outlets 33B in the lower half extend laterally parallel to the inner edges 34*b*.

A fan 35 mounted on a rotational shaft 53 of the motor 4 is located inside the cap 30. Any rotation of the fan 35, either forward or reverse, causes air to be guided upward by the inner edges 34*a* to be discharged upward through the two outlets 33A.

The screw reception 31 extends downward from the bottom of the cap 30. A rotation locking member 36 protrudes downward from the cylindrical section 32 on the rear surface of the body 12. The rotation locking member 36 extends vertically. The rotation locking member 36 has internal threads 37 in its upper middle portion. A through-hole 38 being open rearward is located below the internal threads 37. The wiring between the grip 13 below and the inside of the main body 2 extends through the through-hole 38.

The screw reception 31 includes a pair of ribs 39 on the front surface. The pair of ribs 39 are fitted to the rotation locking member 36 laterally. A circular through-hole 40 is located between the pair of ribs 39.

To join the rear cover 11, the cap 30 is fitted over the cylindrical section 32, and the ribs 39 on the screw reception 31 are fitted to the rotation locking member 36. In this state, a screw 41 placed through the through-hole 40 from behind is screwed onto the internal threads 37. The single screw 41 alone is used to join the rear cover 11.

Internal Mechanism of Main Body

Figure 8:
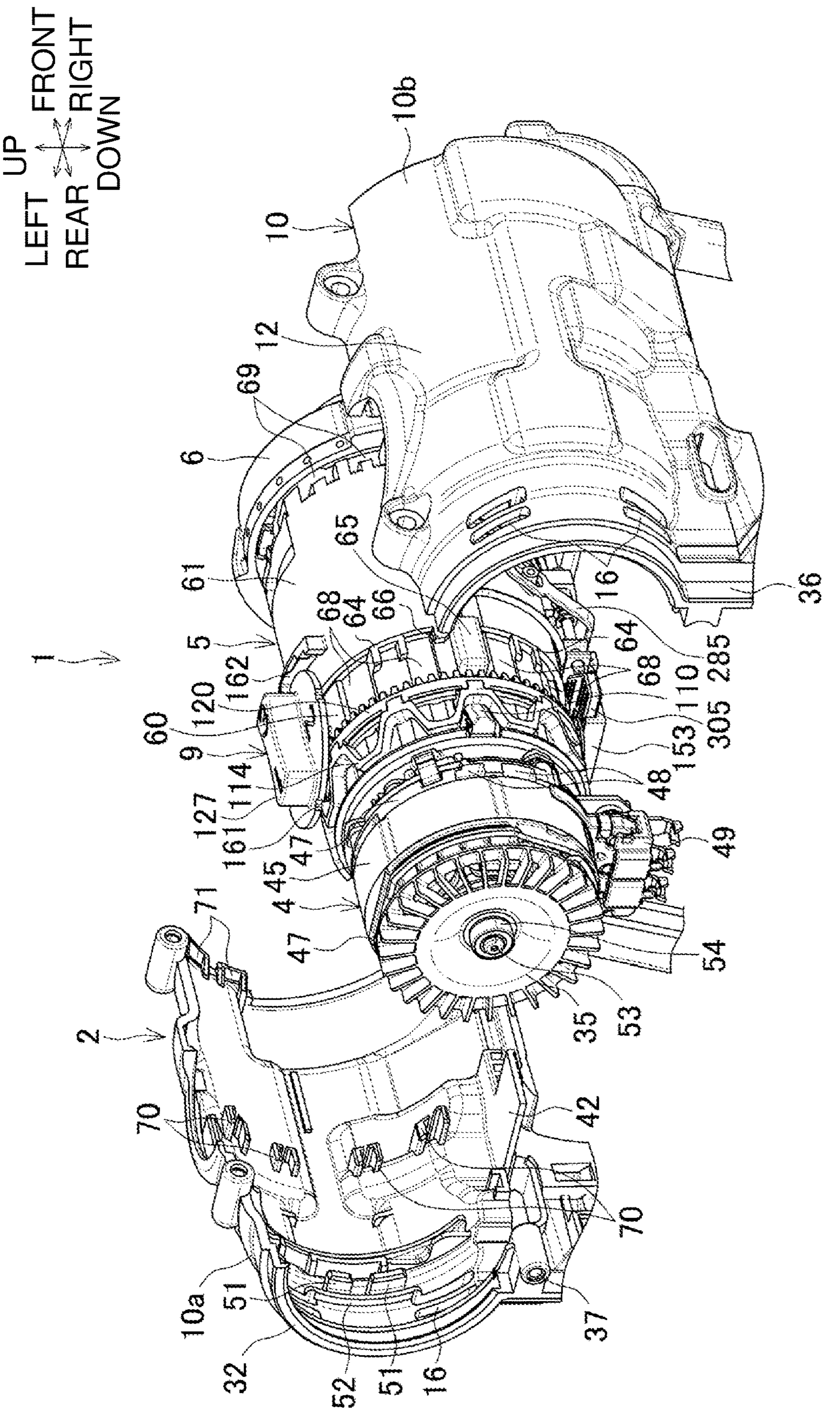
FIG. 8 is an exploded perspective view of a body of a main housing.

The motor 4 is an inner-rotor brushless motor including a stator 45 and a rotor 46. Insulators 47 are located in front of and behind the stator 45. As shown in FIG. 8, upper and lower positioning recesses 48 are located on each of the left and right of the front insulator 47. A terminal unit 49 is located below the front insulator 47. The terminal unit 49 is electrically connected to multiple coils 50 wound around the stator 45 with the insulators 47 in between. The terminal unit 49 is connected to a lead wire extending to the controller 25.

Two engagement tabs 51 protrude from the inner surface of each of the left and right half housings 10*a* and 10*b* as the body 12. The two engagement tabs 51 are aligned vertically. The engagement tabs 51 engage with the positioning recesses 48. A support rib 52 extends along the peripheral surface of the stator 45 behind the engagement tabs 51 on the inner surface of each of the half housings 10*a* and 10*b*. Thus, the stator 45 is held at the rear of the body 12.

The rotor 46 has the rotational shaft 53 at the center and extends through the stator 45. The rear end of the rotational shaft 53 is supported at the center of the cap 30 in the rear cover 11 with a bearing 54. The fan 35 is mounted on the rotational shaft 53 in front of the bearing 54. The fan 35 radially overlaps the bearing 54. The rotational shaft 53 has a pinion 55 on its front end.

As shown in FIGS. 9A to 11, the actuator unit 5 includes a rear gear case 60 and a front gear case 61.

The rear gear case 60 is a bottomed cylinder with the rear surface closed with a rear plate 62 and the front end being open. The front gear case 61 is a bottomed cylinder with the front surface closed with a front plate 63 and the rear end being open. The front gear case 61 has a larger diameter than the rear gear case 60. The opening at the rear end of the front gear case 61 is externally mounted onto the front end of the rear gear case 60. An upper rear stopper 64 and a lower rear stopper 64 (FIGS. 8 and 9A) are located on each of the lateral side surfaces of the rear gear case 60. The rear end of the front gear case 61 is in contact with the rear stoppers 64. A semicylinder 65 protrudes from each of the lateral side surfaces of the rear gear case 60 between the two rear stoppers 64. The semicylinder 65 extends in the front-rear direction and has the front end being open.

A front stopper 66 is located on each of the lateral side surfaces of the front gear case 61. Each front stopper 66 is in contact with the semicylinder 65 from above. The front gear case 61 is restricted from moving backward by the rear stoppers 64 and from rotating circumferentially by the semicylinders 65.

Figure 12A:
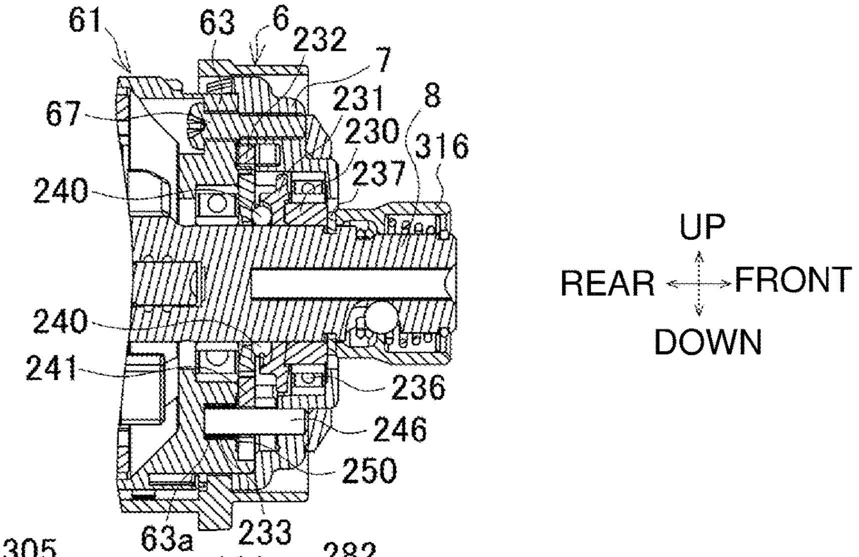
FIG. 12A is a partial sectional view taken along line E-E in FIG. 9B.
Figure 13:
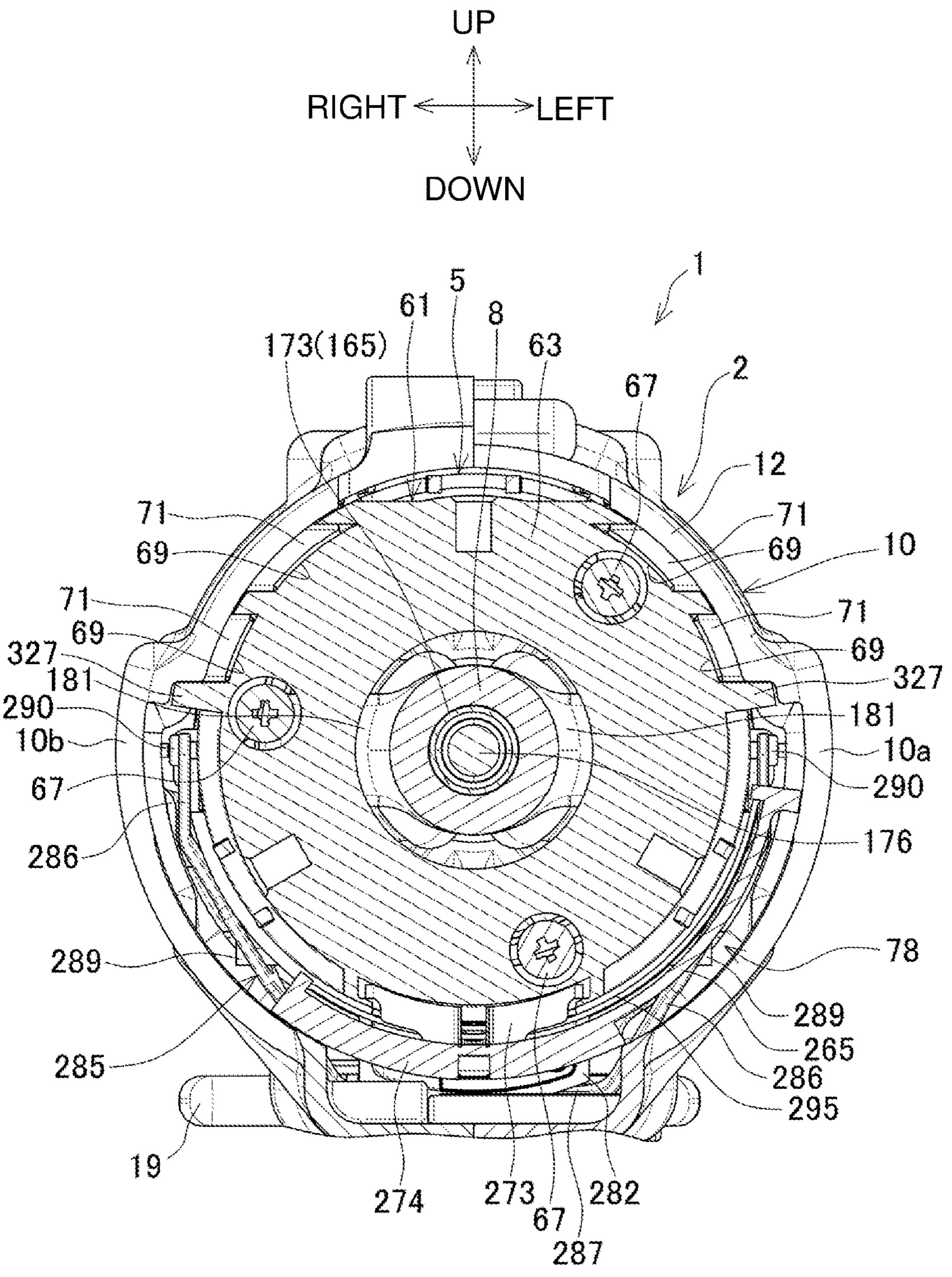
FIG. 13 is an enlarged sectional view taken along line B-B in FIG. 1.

As shown in FIGS. 12A and 13, the hammer case 7 is fastened to the front plate 63 with multiple screws 67 from the rear. The mode change ring 6 is rotatably supported between the front plate 63 and the hammer case 7.

Four rear engagement recesses 68 are located on each of the lateral side surfaces of the rear gear case 60 at the front. The rear engagement recesses 68 are at predetermined intervals in the circumferential direction of the rear gear case 60. Each of the rear engagement recesses 68 extends in the front-rear direction. As shown in FIGS. 8 and 13 as well, two front engagement recesses 69 are arranged circumferentially on an upper front portion of the front gear case 61 and behind the mode change ring 6. Each front engagement recess 69 is open outside laterally.

Four rear engagement parts 70 are located on the inner surface of each of the left and right half housings 10*a* and 10*b* at the rear of the body 12. The rear engagement parts 70 engage with the rear engagement recesses 68. Two front engagement parts 71 are located on each of the lateral inner surfaces of the body 12 at the front. The front engagement parts 71 engage with the front engagement recesses 69.

With the front engagement recesses 69 engaged with the front engagement parts 71 and the rear engagement recesses 68 engaged with the rear engagement parts 70, the actuator unit 5 is held in the body 12 while being restricted from rotating and moving forward and backward.

In particular, the front gear case 61 is held between the left and right half housings 10*a* and 10*b* upward from a lateral line including an axis as viewed from the front, as shown in FIG. 13. This allows a wide space exceeding 180° in the circumferential direction to be used by a linkage switcher 78 between the front gear case 61 and the body 12 below the area in which the front gear case 61 is held.

The rear plate 62 of the rear gear case 60 has a thick portion 72 at its center. The thick portion 72 is circular as viewed from the front and protrudes frontward. The thick portion 72 retains an input gear 74 with a bearing 73. The input gear 74 meshes with the pinion 55 on the rotational shaft 53 at the rear to be rotatable together with the rotational shaft 53. The input gear 74 includes a first gear section 74*a* at the rear. The input gear 74 includes a second gear section 74*b* with a smaller diameter than the first gear section 74*a* at the front.

The actuator unit 5 includes, from the rear, a reducer 75, a striker 76, a vibrator 77, and the linkage switcher 78 that links these actuators in a switchable manner. These members will now be described in the stated order.

1. Reducer

Figure 14:
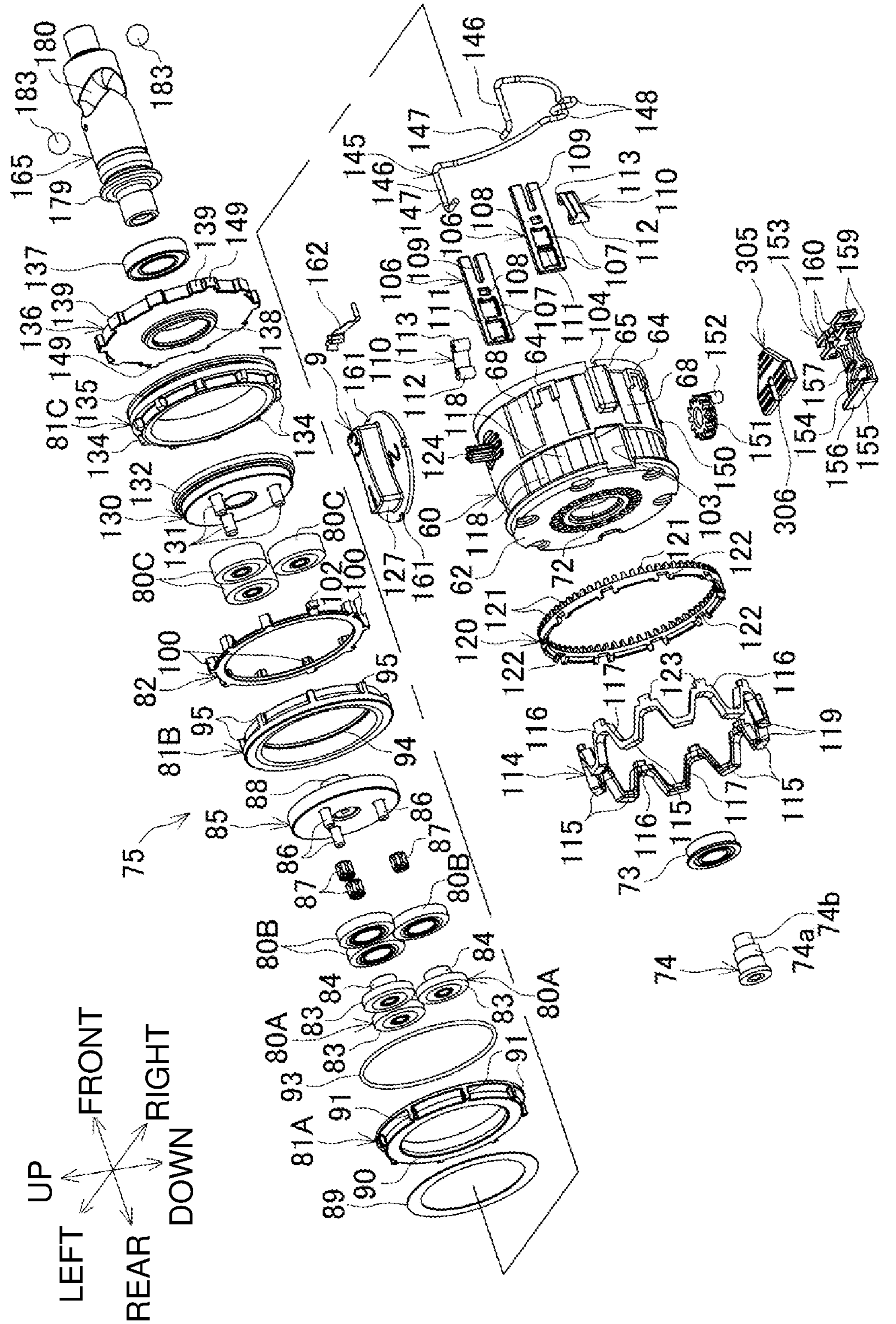
FIG. 14 is an exploded rear perspective view of a reducer.

The reducer 75 is housed in the rear gear case 60. As shown in FIG. 14 as well, the reducer 75 includes three stages of gear pairs aligned in an axial direction. Each gear pair includes three planetary gears 80 and an internal gear 81 meshing with the three planetary gears 80. Each stage has a different reduction ratio. In the example described below, the gear components are labeled with A to C from the rear (first stage), such as planetary gears 80A (first stage), planetary gears 80B (second stage), and planetary gears 80C (third stage). An engagement ring 82 is located between the internal gear 81B in the second stage and the internal gear 81C in the third stage.

Figure 10:
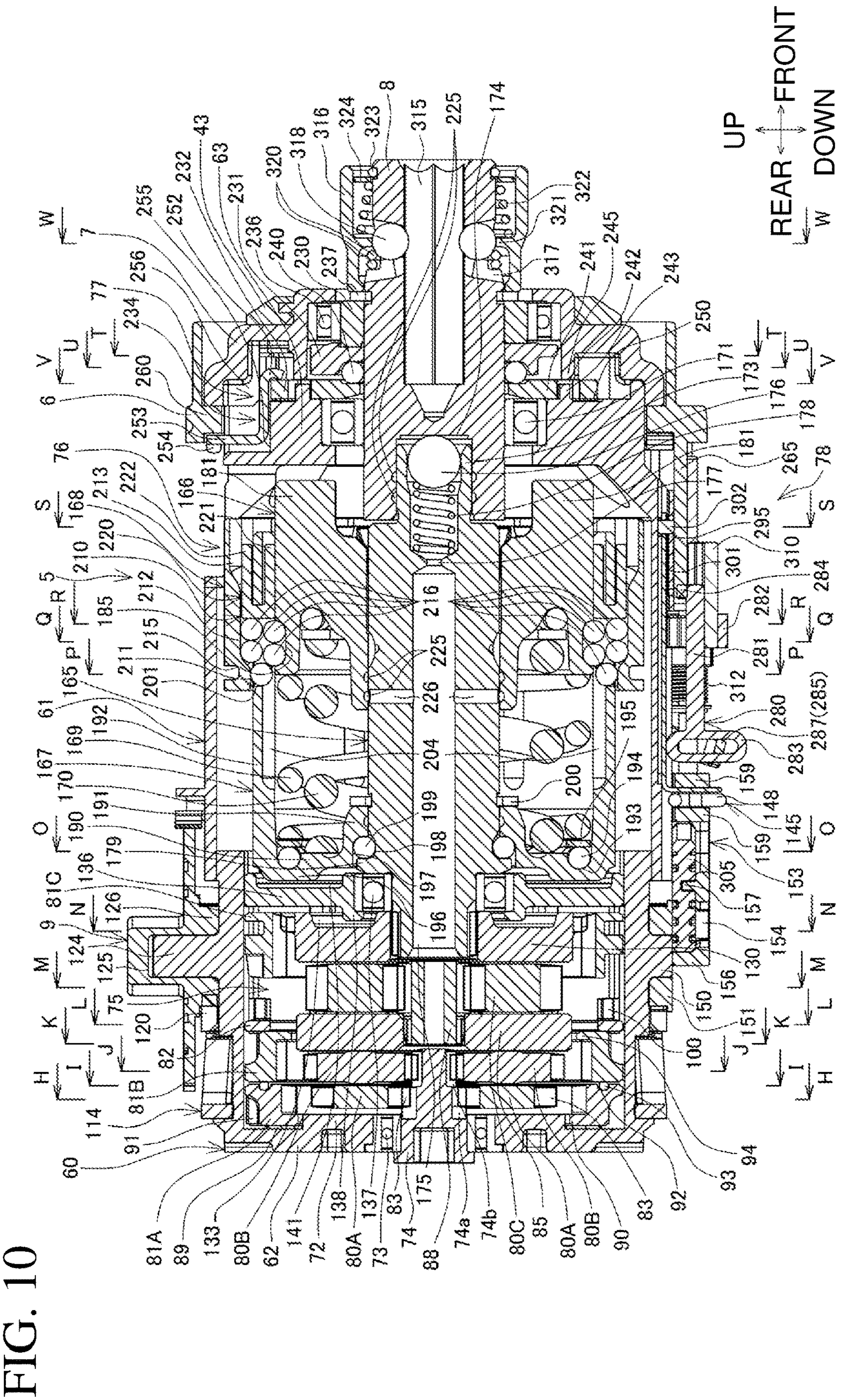
FIG. 10 is an enlarged sectional view taken along line C-C in FIG. 9B.
Figure 11:
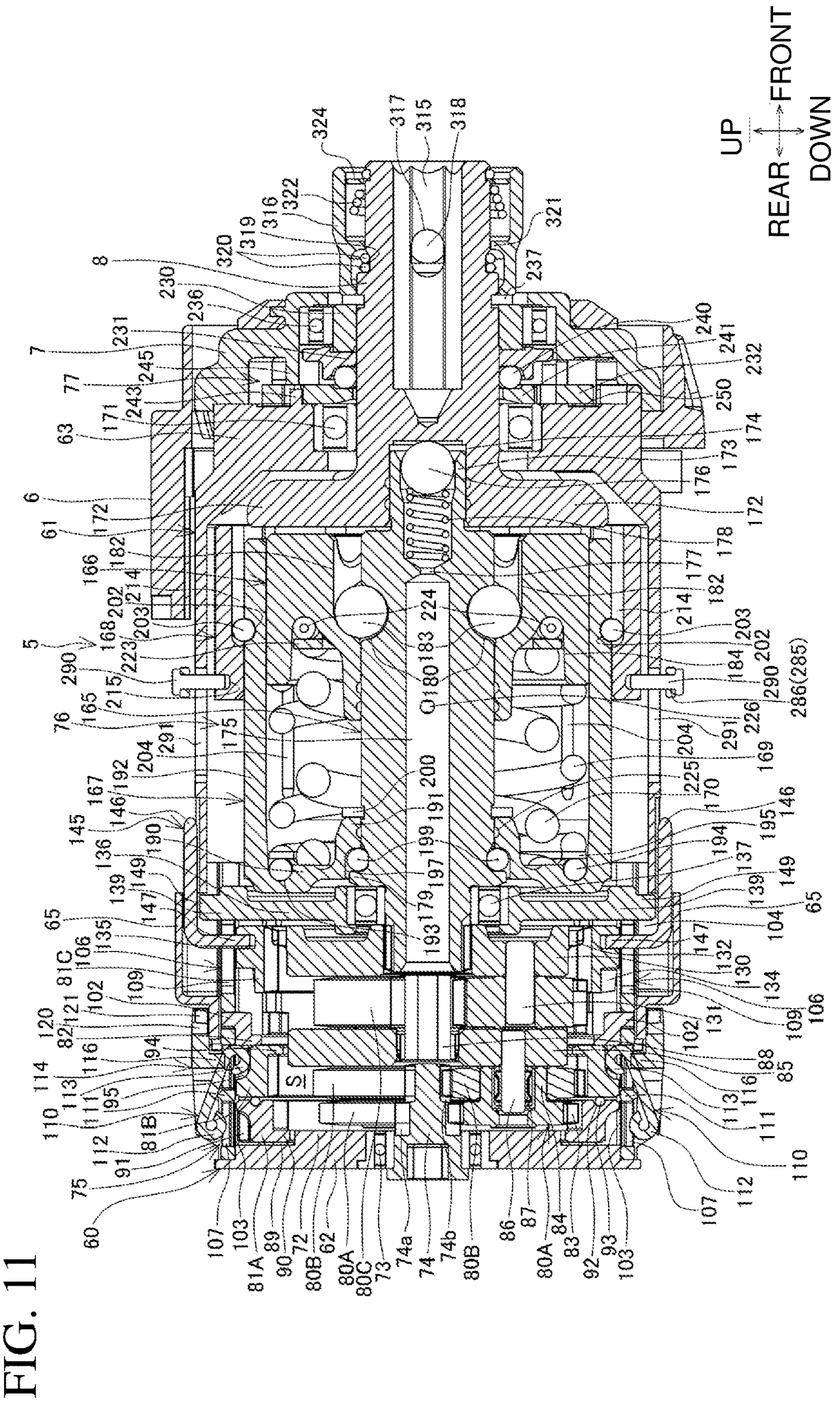
FIG. 11 is an enlarged sectional view taken along line D-D in FIG. 9B.
Figure 15A:
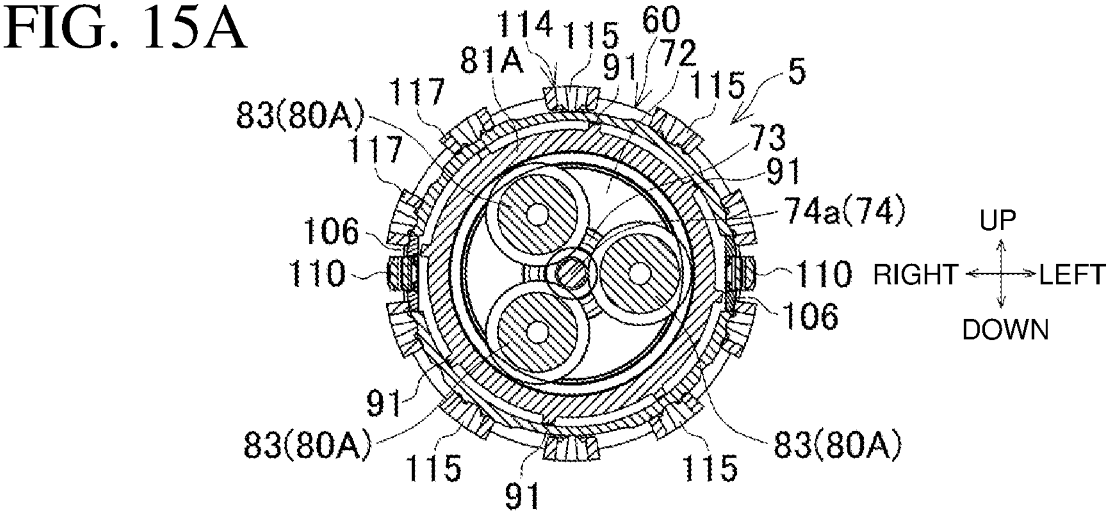
FIG. 15A is a sectional view taken along line H-H in FIG. 10.

As shown in FIGS. 10, 11, and 15A, each planetary gear 80A in the first stage meshes with the internal gear 81A in the first stage and the first gear section 74*a* in the input gear 74. Each planetary gear 80A includes a rear gear section 83 and a front bearing section 84 with a smaller diameter.

Figure 15B:
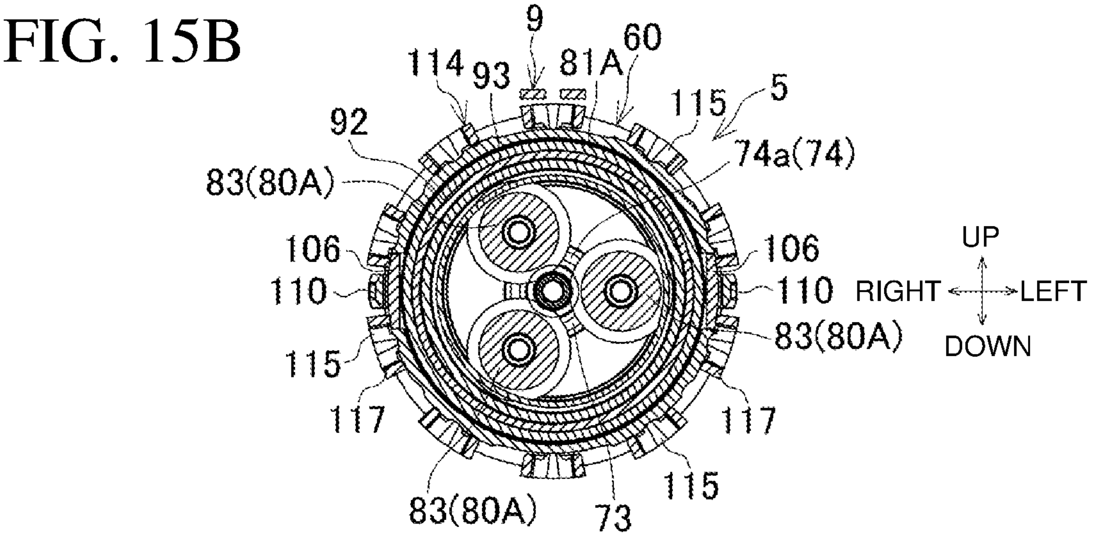
FIG. 15B is a sectional view taken along line I-I in FIG. 10.
Figure 15C:
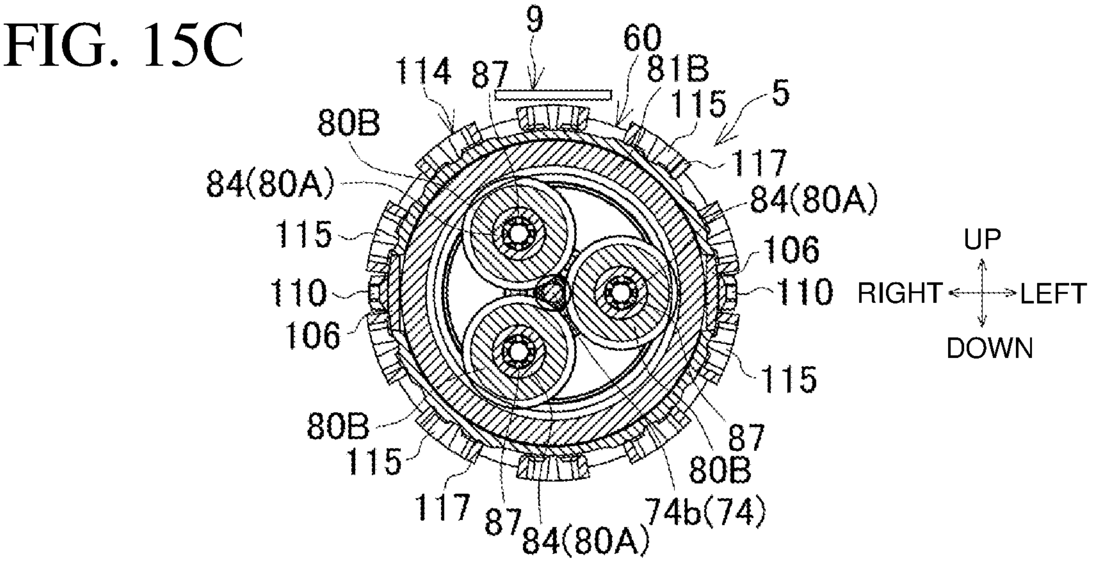
FIG. 15C is a sectional view taken along line J-J in FIG. 10.

Each planetary gear 80B in the second stage is externally mounted on the bearing section 84 of the corresponding planetary gear 80A. Thus, each planetary gear 80A in the first stage and the corresponding planetary gear 80B in the second stage overlap each other radially. The planetary gears 80B mesh with the internal gear 81B in the second stage and with the second gear section 74*b* in the input gear 74, as shown in FIG. 15C as well.

A disk-shaped rear carrier 85 is located in front of the planetary gears 80B. The rear carrier 85 includes three pins 86 protruding rearward. Each pin 86 supports the bearing section 84 in the corresponding planetary gear 80A with a bearing (needle bearing in this example) 87. A spur gear 88 is connected to the center of the rear carrier 85 with splines to protrude frontward.

In this manner, each planetary gear 80A and the corresponding planetary gear 80B rotatable in the same direction with the input gear 74 overlap each other radially. This shortens the axis length including both the planetary gears 80A and the planetary gears 80B, allowing the use of shorter pins 86. Each pin 86 may also use a single bearing 87. Each planetary gear 80A is in contact with the corresponding pin 86 by a smaller length. This reduces mechanical loss resulting from frictional resistance.

In particular, with the bearing section 84 in each planetary gear 80A supporting the corresponding planetary gear 80B, the relative angular velocity between the planetary gear 80A and the planetary gear 80B is slower than the relative angular velocity between the planetary gear 80B and the pin 86. The planetary gears 80B reducing the speed thus cause less mechanical loss. In other words, the planetary gears 80B in contact with the planetary gears 80A rotating slowly in the same direction cause less mechanical loss than when being in contact with the nonrotatable pins 86.

The first-stage internal gear 81A is located in front of the rear plate 62 of the rear gear case 60 in a rotatable manner with a washer 89. The internal gear 81A has a rear flange 90 on the rear of its internal teeth portion. The diameter of the rear flange 90 decreases toward the center. The rear flange 90 is near the outer peripheral surface of the thick portion 72 of the rear plate 62. Multiple rear engagement ribs 91 are located on the outer circumference of the internal gear 81A. The multiple rear engagement ribs 91 are at equal intervals circumferentially, as shown in FIGS. 14 and 15A. Each rear engagement rib 91 extends in the front-rear direction. The internal gear 81A has an annular holder groove 92 on its front surface. The holder groove 92 is coaxial with the internal gear 81A. The holder groove 92 receives an O-ring 93, as shown in FIG. 15B.

The second-stage internal gear 81B has more internal teeth than the internal gear 81A. The internal gear 81B is adjacent to the internal gear 81A in the axial direction and pressed against the O-ring 93. The internal gear 81B is also rotatable.

Figure 16A:
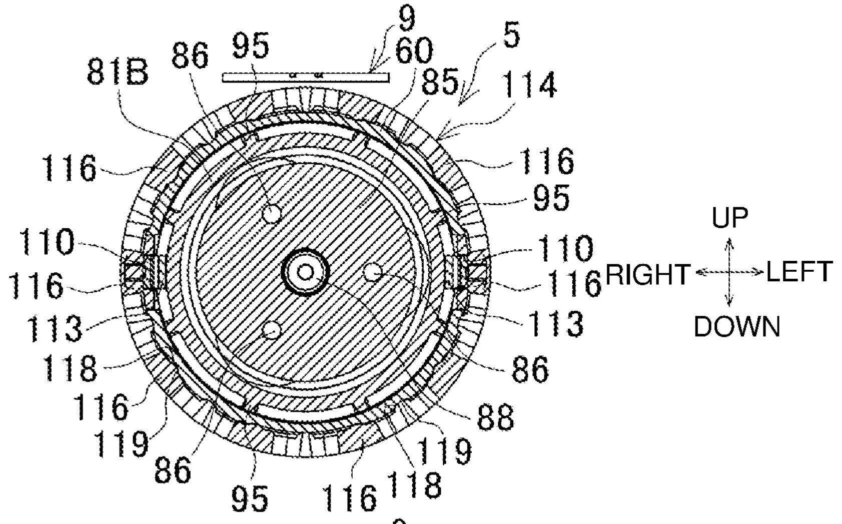
FIG. 16A is a sectional view taken along line K-K in FIG. 10.

The internal gear 81B has a front flange 94 having a diameter decreasing toward the center on the front of its internal teeth portion. The front flange 94 is near the outer peripheral surface of the rear carrier 85. As shown in FIGS. 14 and 16A as well, multiple front engagement ribs 95 are located on the outer circumference of the internal gear 81B. The multiple front engagement ribs 95 are located at the same interval circumferentially as the rear engagement ribs 91. Each front engagement rib 95 extends in the front-rear direction.

Thus, as shown in FIG. 11, a retaining space S is defined between the internal gears 81A and 81B by the rear flange 90, the front flange 94, and the O-ring 93. The retaining space S retains grease radially inside the internal gears 81A and 81B. This reduces drying out of grease. For any drying out of grease, the needle bearings used as the bearings 87 for the planetary gears 80A can maintain lubrication.

Figure 16B:
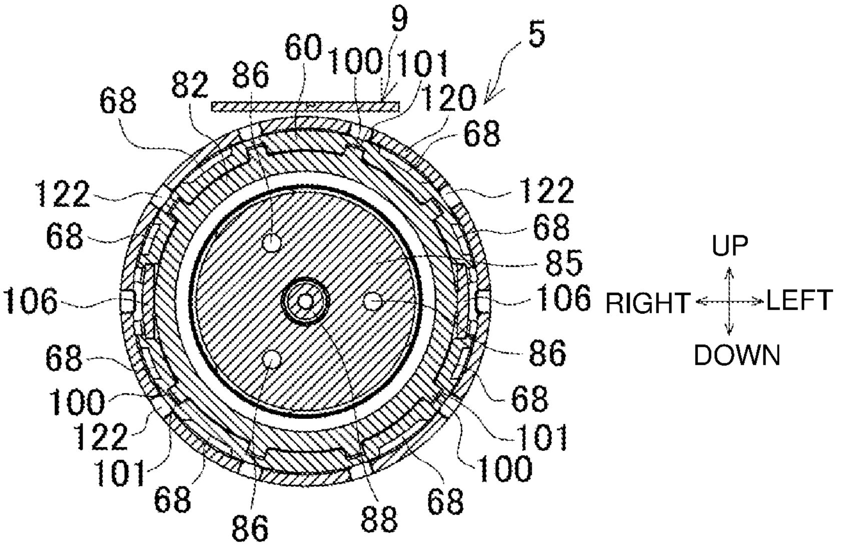
FIG. 16B is a sectional view taken along line L-L in FIG. 10.
Figure 17:
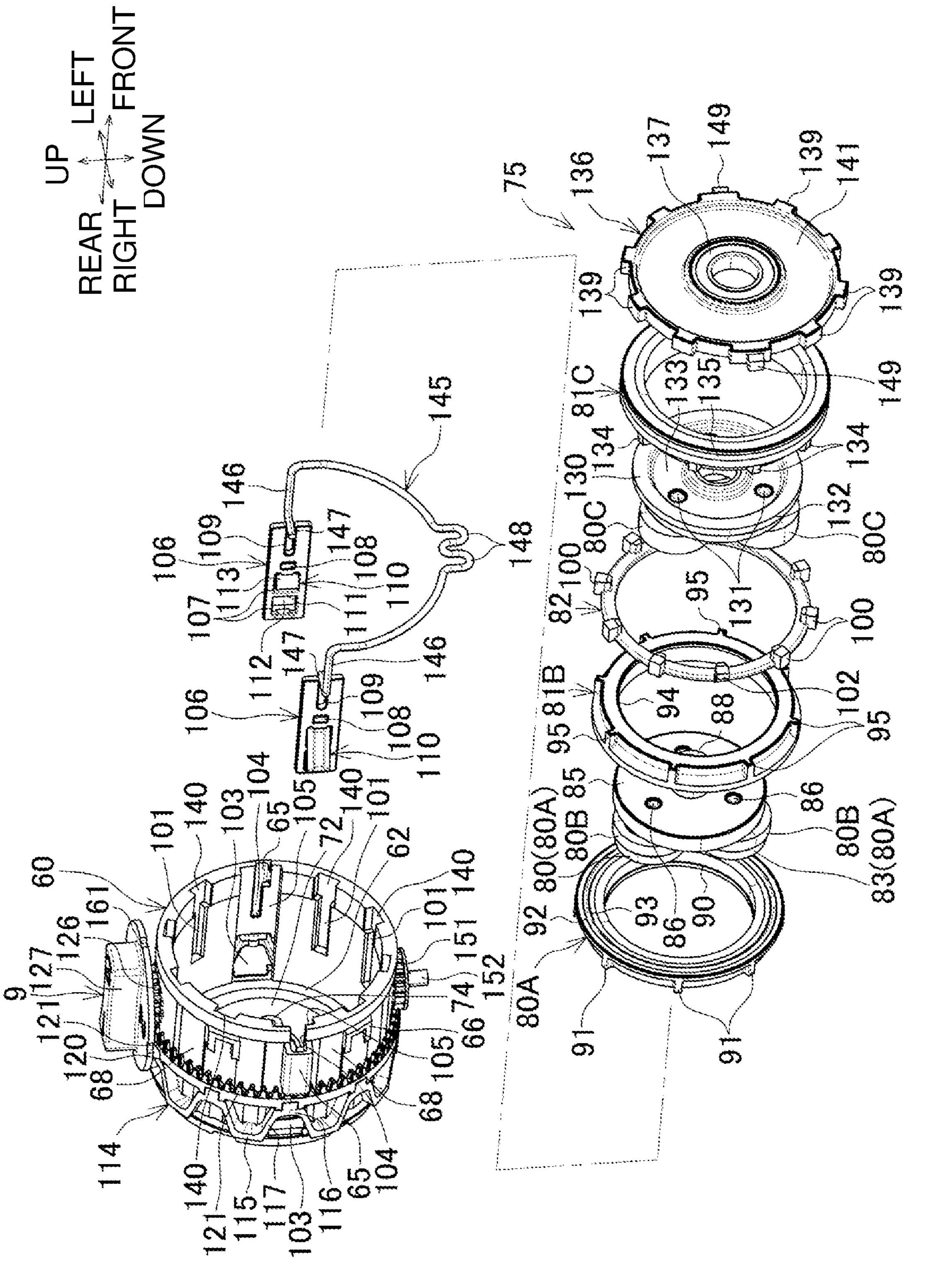
FIG. 17 is an exploded front perspective view of the reducer.

The engagement ring 82 is housed in the rear gear case 60 in front of the internal gear 81B. The engagement ring 82 includes multiple engagement tabs 100 on its outer circumference. The engagement tabs 100 are at equal intervals circumferentially. Each engagement tab 100 protrudes radially outward and extends frontward. As shown in FIGS. 16B and 17, the rear gear case 60 has multiple engagement grooves 101 on its inner circumferential surface. Each engagement groove 101 extends rearward from the front end of the rear gear case 60. The engagement grooves 101 receive the engagement tabs 100 on the engagement ring 82 from the front.

The engagement ring 82 is thus restricted from rotating in the rear gear case 60. Projections 102 protruding radially outward are located on the outer surfaces of left and right engagement tabs 100 on the engagement ring 82. The projections 102 engage with through-holes 108 in speed switching supporters 106 described later. The speed switching supporters 106 are restricted from moving forward and backward in the rear gear case 60 by a bracket plate 136 described later. Thus, the engagement ring 82 is restricted from moving forward, and the internal gears 81A and 81B are also restricted from moving forward.

The rear gear case 60 has an opening 103 in each of its left and right side surfaces behind the semicylinder 65. Each opening 103 extends in the front-rear direction. Each semicylinder 65 has a slit 104 extending in the front-rear direction inside. Each slit 104 is open at the front end of the rear gear case 60.

Figure 18A:
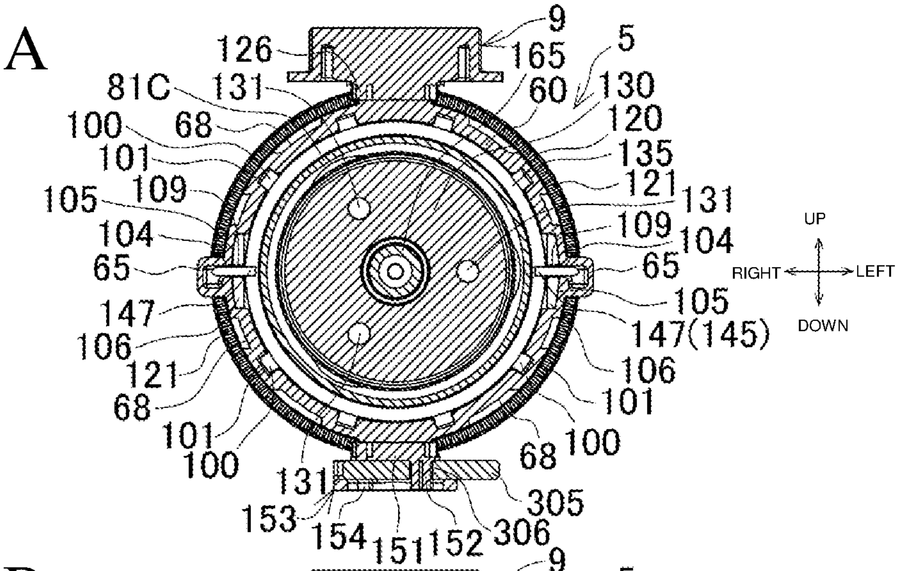
FIG. 18A is a sectional view taken along line N-N in FIG. 10.

As shown in FIGS. 17 and 18A, the rear gear case 60 has a pair of grooves 105 on its inner circumferential surface inward from the opening 103. Each groove 105 extends in the front-rear direction. The grooves 105 receive the speed switching supporters 106. The speed switching supporters 106 fitted in the grooves 105 are plates extending in the front-rear direction. Each speed switching supporter 106 has a pair of front and rear square holes 107 in its rear portion. The square holes 107 are located inward from the opening 103. Each speed switching supporter 106 has a through-hole 108 in front of the square holes 107. The through-hole 108 is engaged with the corresponding projection 102 on the engagement ring 82. Each speed switching supporter 106 has an inner slit 109 in front of the through-hole 108. The inner slit 109 extends rearward from the front end of the speed switching supporter 106.

Each speed switching supporter 106 includes a speed switching plate 110 on its outer rear surface. The speed switching plate 110 is a plate extending in the front-rear direction over the front and rear square holes 107 in the speed switching supporter 106. As shown in FIG. 11, each speed switching plate 110 has its middle portion in the front-rear direction being in contact with a partition 111 between the square holes 107 in the speed switching supporter 106. The speed switching plate 110 has a rear engagement portion 112 on the rear end and a front engagement portion 113 on the front end. The rear engagement portion 112 and the front engagement portion 113 are curled toward the center of the rear gear case 60.

Each speed switching plate 110 can thus swing inward alternately about its center in contact with the partition 111 within the opening 103 in the rear gear case 60. The outer circumference of the internal gear 81A in the first stage is located inward from the rear engagement portion 112. When swinging inward from the rear gear case 60, the rear engagement portion 112 is engageable with a rear engagement rib 91 through the rear square hole 107. In this state, the front engagement portion 113 at the opposite end protrudes outward from the opening 103 and separates from the outer circumference of the internal gear 81A. The outer circumference of the internal gear 81B in the second stage is inward from the front engagement portion 113. When swinging inward from the rear gear case 60, the front engagement portion 113 is engageable with a front engagement rib 95 through the front square hole 107. In this state, the rear engagement portion 112 at the opposite end protrudes outward from the opening 103 and separates from the outer circumference of the internal gear 81B.

A speed switching ring 114 is rotatable on the outer periphery of the rear gear case 60 outward from the speed switching plate 110. The speed switching ring 114 is a frame continuous in the circumferential direction while meandering forward and backward. The speed switching ring 114 has ten rear pressing portions 115 and ten front pressing portions 116. Each rear pressing portion 115 extends circumferentially at the rear of the speed switching ring 114. Each front pressing portion 116 extends circumferentially at the front of the speed switching ring 114. The rear pressing portions 115 and the front pressing portions 116 alternate with each other circumferentially. A rear pressing portion 115 and a front pressing portion 116 adjacent to each other are connected by a slope 117. An imaginary circle containing the rear pressing portions 115 is outward from the rear engagement portion 112 of each speed switching plate 110. An imaginary circle containing the front pressing portions 116 is outward from the front engagement portion 113 of each speed switching plate 110.

Thus, rotation of the speed switching ring 114 causes alternate switching between a phase in which the rear pressing portions 115 are outside the rear end of each speed switching plate 110 and a phase in which the front pressing portions 116 are outside the front end of each speed switching plate 110. In the phase in which the rear pressing portions 115 are outside the rear end of the speed switching plate 110, the rear pressing portions 115 press the rear end of the speed switching plate 110 inward. The speed switching plate 110 thus swings into a backward-tilting posture, with the rear engagement portion 112 engaging with a rear engagement rib 91 on the first-stage internal gear 81A. This restricts rotation of the internal gear 81A.

In the phase in which the front pressing portions 116 are outside the front end of the speed switching plate 110, the front pressing portions 116 press the front end of the speed switching plate 110 inward. The speed switching plate 110 thus swings into a forward-tilting posture, with the front engagement portion 113 engaging with a front engagement rib 95 on the second-stage internal gear 81B. This restricts rotation of the internal gear 81B. This swing is performed by the right and left speed switching plates 110 in synchronization.

When switching between the phases, the slope 117 presses the speed switching plates 110 inward as the slope 117 passes through the speed switching plates 110 on the outer surface. This causes each speed switching plate 110 to swing between the forward-tilting posture and the backward-tilting posture.

A face gear ring 120 is connected to the front of the speed switching ring 114. The face gear ring 120 is annular and has the same diameter as the speed switching ring 114. The face gear ring 120 has multiple teeth 121 on its front surface. The multiple teeth 121 continue circumferentially at equal intervals. Each tooth 121 protrudes frontward. The face gear ring 120 has multiple cutouts 122 on its rear surface. The cutouts 122 correspond one-to-one to the front pressing portions 116 of the speed switching ring 114. Each front pressing portion 116 has a mating projection 123 that is fitted into the corresponding cutout 122. The face gear ring 120 and the speed switching ring 114 are thus connected integrally in the rotation direction.

The speed switching ring 114 is rotated by a rotational operation on the speed switching dial 9. The speed switching dial 9 is disk-shaped in a plan view. As shown in FIG. 10, an upper support projection 124 protrudes upward from the upper surface of the rear gear case 60. The speed switching dial 9 has a receiving hole 125 at the center of its lower surface. The receiving hole 125 receives the upper support projection 124. The speed switching dial 9 is thus rotatable about the upper support projection 124. The speed switching dial 9 includes an upper gear 126 located on its lower surface coaxially. The upper gear 126 meshes with the teeth 121 on the face gear ring 120, as shown in FIG. 18A as well. A knob 127 protrudes from the upper surface of the speed switching dial 9 across the diameter.

Figure 16C:
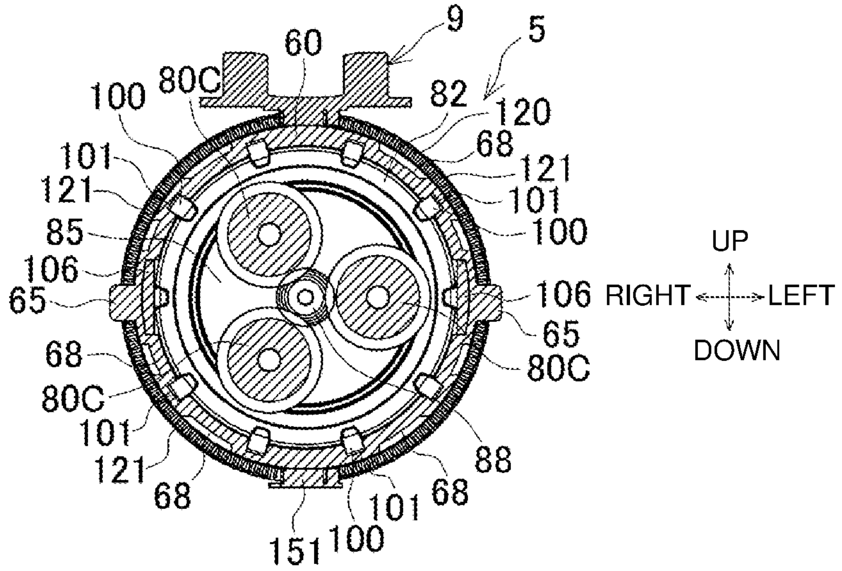
FIG. 16C is a sectional view taken along line M-M in FIG. 10.

As shown in FIG. 16C as well, each planetary gear 80C in the third stage is located in front of the rear carrier 85 and meshes with the spur gear 88. The planetary gears 80C are supported on a disk-shaped front carrier 130 with pins 131. The pins 131 shorter in the axial direction allow direct contact of the planetary gears 80C with the front carrier 130. This reduces the bending moment of the pins 131 and thus reduces the likelihood of breaks.

The front carrier 130 has multiple outer engagement teeth 132 on its front outer circumference. The rear end of a spindle 165 (described later) is connected to the center of the front carrier 130 with splines. The front carrier 130 is thus less susceptible to the kinks from the spindle 165. The gears and the pins are thus less likely to receive impact loads unevenly applied from the spindle 165. This improves the durability of the reducer 75. As shown in FIGS. 10 and 17, the front carrier 130 has an annular recess 133 on its front surface around the spindle 165.

The internal gear 81C in the third stage is movable forward and backward inside the rear gear case 60. The internal gear 81C has multiple engagement ribs 134 on its rear outer circumference. The internal gear 81C has as many (ten) engagement ribs 134 as the engagement tabs 100 on the engagement ring 82. The internal gear 81C has a rectangular groove 135 that is annular on its front outer circumference.

At a backward position, the internal gear 81C has the engagement ribs 134 circumferentially engaged with the engagement tabs 100 on the engagement ring 82, with the internal teeth meshing with the planetary gears 80C. This restricts rotation of the internal gear 81C. In a forward position, as shown in FIG. 11, the internal gear 81C is disengaged from the engagement ring 82 and has its internal teeth meshing with the planetary gears 80C and the outer engagement teeth 132 on the front carrier 130.

The bracket plate 136 is located in front of the internal gear 81C. The bracket plate 136 supports the rear end of the spindle 165 with a bearing 137. The bracket plate 136 has a bearing stop 138 surrounding the holding portion of the bearing 137. The bearing stop 138 is annular and protrudes rearward. The bracket plate 136 has multiple engagement projections 139 on its outer circumference at equal intervals. The engagement projections 139 engage with wide portions 140 (FIG. 17) on the front ends of the engagement grooves 101 on the inner circumferential surface of the rear gear case 60. The bracket plate 136 is thus restricted from rotating and moving backward in the rear gear case 60.

The bearing stop 138 protrudes into the recess 133 on the front surface of the front carrier 130, as shown in FIG. 10. The front carrier 130 thus overlaps the bearing stop 138 radially to reduce the size in the axial direction. The bracket plate 136 has an annular recess 141 (FIG. 17) surrounding the bearing 137 on its front surface.

As shown in FIGS. 11 and 18A, the rectangular groove 135 on the third-stage internal gear 81C is engaged with a speed switching wire 145. The speed switching wire 145 is located outside on the bottom of the front gear case 61. The speed switching wire 145 is semicircular as viewed from the front, with its left and right ends bent rearward to be bends 146. The bends 146 are placed in the right and left semi-cylinders 65 on the rear gear case 60 from the front. The rear end of each bend 146 is bent toward the center of the rear gear case 60 in the semicylinder 65 to be an engagement end 147. The engagement end 147 extends through the slit 104 in the rear gear case 60 and then extends through the inner slit 109 in the speed switching supporter 106 to engage with the rectangular groove 135 on the internal gear 81C. The speed switching wire 145 has a pair of left and right projections 148 in the laterally middle of its lower portion. Each projection 148 is U-shaped and protrudes downward.

The bracket plate 136 has retaining projections 149 protruding outward from the outer peripheral surfaces of left and right engagement projections 139. The retaining projections 149 are located in front of the slit 104 in the rear gear case 60 to prevent the engagement ends 147 from slipping off.

As shown in FIGS. 10 and 14, the rear gear case 60 has a lower support projection 150 protruding downward. The lower support projection 150 is coaxial with the upper support projection 124. A speed switching gear 151 is externally mounted on the lower support projection 150 in a rotatable manner. The speed switching gear 151 is as large as and has as many teeth as the upper gear 126 on the speed switching dial 9. The teeth on the speed switching gear 151 mesh with the teeth 121 on the face gear ring 120. An eccentric pin 152 protrudes downward from an eccentric position on the lower surface of the speed switching gear 151.

A speed switching holder 153 is located below the speed switching gear 151. The speed switching holder 153 is supported on a reception plate 42 (FIGS. 5 and 8) on the inner bottom surface of the body 12 in a manner movable forward and backward. The speed switching holder 153 is a plate extending in the front-rear direction. The speed switching holder 153 has a long hole 154 extending in the lateral direction. The long hole 154 receives the eccentric pin 152 on the speed switching gear 151 from above. The long hole 154 has a circular portion 155 convex in the front-rear direction in its laterally middle portion. The speed switching holder 153 has the rear end bent upward as a stopper 156.

The speed switching holder 153 has an upward guide projection 157 on its upper surface in front of the long hole 154. The guide projection 157 extends in the lateral direction.

The speed switching holder 153 includes a pair of holder plates 159 integral with the speed switching holder 153 in its front portion in front of the guide projection 157. The holder plates 159 each extend in the lateral direction and are aligned in the front-rear direction with a spacing. A pair of left and right connecting plates 160 are located between the holder plates 159. Each connecting plate 160 extends in the front-rear direction and connects the holder plates 159 to each other. The projections 148 on the speed switching wire 145 engage with the connecting plates 160 from below. The speed switching wire 145 is thus held between the holder plates 159 to be integral with the speed switching holder 153 in the front-rear direction.

In the reducer 75, the upper speed switching dial 9 is rotated with the knob 127. This rotates the face gear ring 120 and the speed switching ring 114 with the upper gear 126. In this example, when the speed switching dial 9 is rotated by 90°, the face gear ring 120 and the speed switching ring 114 rotate by 18°. For every 90° rotation of the speed switching dial 9, each speed switching plate 110 thus switches alternately between the backward-tilting posture as pressed by the rear pressing portions 115 and the forward-tilting posture as pressed by the front pressing portions 116. In other words, every 90° rotation of the upper gear 126 switches the rotation restriction between the first-stage internal gear 81A with the rear pressing portions 115 and the rotation restriction of the second-stage internal gear 81B with the front pressing portions 116.

Rotation of the upper gear 126 causes the speed switching gear 151 to rotate oppositely at the same time through the face gear ring 120. This rotation amount (angle) is the same as for the upper gear 126. This causes the eccentric pin 152 to move eccentrically and slide the speed switching holder 153 forward and backward through the long hole 154. The speed switching wire 145 thus together moves forward and backward, causing forward and backward sliding motion of the third-stage internal gear 81C that has the engagement ends 147 engaging with the rectangular groove 135. In this example, every 180° rotation of the upper gear 126 causes the speed switching holder 153 to slide forward or backward. The internal gear 81C thus switches between a forward position and a backward position with the speed switching wire 145.

The left and right ends of the speed switching wire 145 are bent rearward to be the bends 146. The bends 146 are placed into the semicylinders 65 through their front ends to extend rearward. The internal gear 81C is thus movable linearly in the axial direction. The semicylinders 65 prevent outward warpage of the bends 146. The engagement ends 147 are thus less likely to disengage from the rectangular groove 135. The semicylinders 65 are open at the front ends alone. This reduces grease leakage.

In this manner, the reducer 75 switches, for every 90° rotation of the speed switching dial 9, the mode combining either restricting or releasing the rotation of the first- and second-stage internal gears 81A and 81B with setting the third-stage internal gear 81C either at the forward position or at the backward position to select from first to fourth speeds. The speed switching dial 9 has the numbers 1 to 4 indicating speed marked on its upper surface at every 90° positions. The speed switching dial 9 has cutouts 161 located radially outward from the numbers on its circumferential edge. The cutouts 161 are engageable with a leaf spring 162 (FIGS. 9A and 14) extending in the lateral direction and held on the upper surface of the front gear case 61. This causes a click from every 90° rotation of the speed switching dial 9.

As shown in FIGS. 14 and 16A, the rear gear case 60 has multiple click recesses 118 on its outer circumference. The speed switching ring 114 has click protrusions 119 on the inner circumference of each rear pressing portion 115 and each front pressing portion 116. The click protrusions 119 engage with the click recesses 118 in the rotation direction. As the speed switching ring 114 rotates, the click recesses 118 and the click protrusions 119 engaging with each other cause clicks.

Figure 19A:
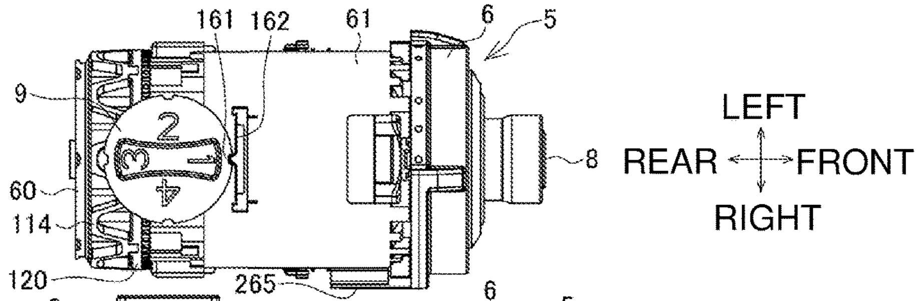
FIG. 19A is a plan view of the actuator unit with a first speed being selected in a drill mode.
Figure 19B:
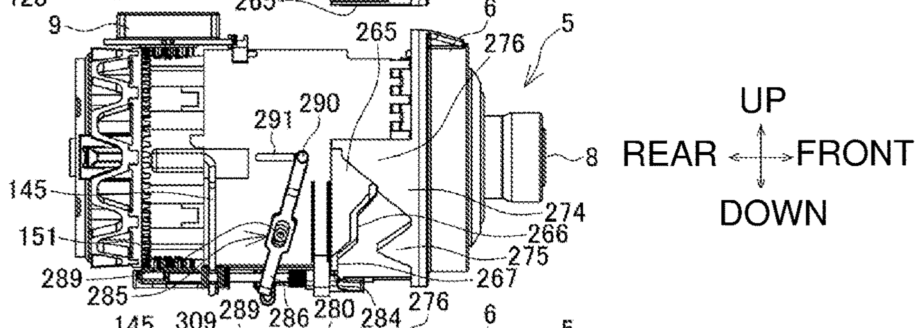
FIG. 19B is a side view of the actuator unit with the first speed being selected in the drill mode.
Figure 19C:
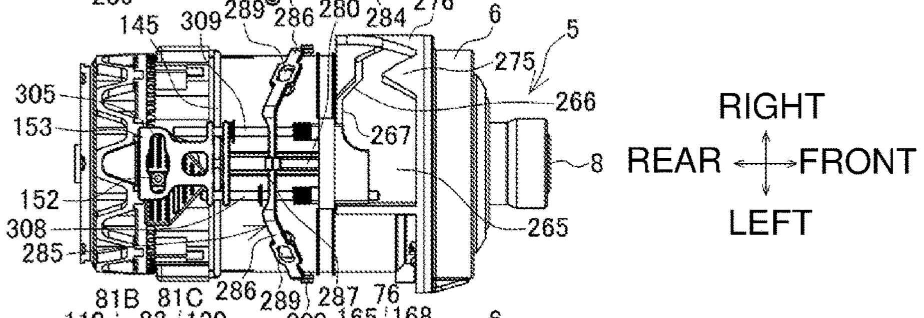
FIG. 19C is a bottom view of the actuator unit with the first speed being selected in the drill mode.
Figure 19D:
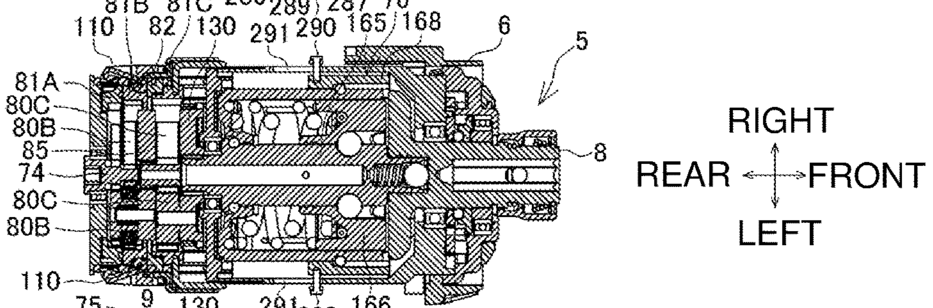
FIG. 19D is a lateral sectional view of the actuator unit with the first speed being selected in the drill mode.

FIGS. 19A to 19E show the actuator unit at the first speed. As shown in FIG. 19D, at this rotational position of the speed switching dial 9, each speed switching plate 110 tilts forward. The second-stage internal gear 81B is thus restricted from rotating, whereas the first-stage internal gear 81A is free to rotate. In this state, as shown in FIG. 19C, the speed switching gear 151 is at a first rotational position with the eccentric pin 152 at the rear left. The speed switching holder 153 is thus at a backward position and positions the third-stage internal gear 81C at the backward position. The internal gear 81C thus engages with the engagement ring 82 to be nonrotatable.

The rotation input from the input gear 74 is transmitted to the first-stage planetary gears 80A and the second-stage planetary gears 80B. The first-stage internal gear 81A is free to rotate, whereas the second-stage internal gear 81B is restricted from rotating. The planetary gears 80A thus do not revolve, and the second-stage planetary gears 80B having a higher reduction ratio alone revolve in the internal gear 81B. The rotation of the rear carrier 85 resulting from the revolving planetary gears 80B is transmitted to the third-stage planetary gears 80C, causing the planetary gears 80C to revolve in the internal gear 81C. The rotation of the front carrier 130 resulting from the revolving planetary gears 80C is transmitted to the spindle 165.

Figure 20A:
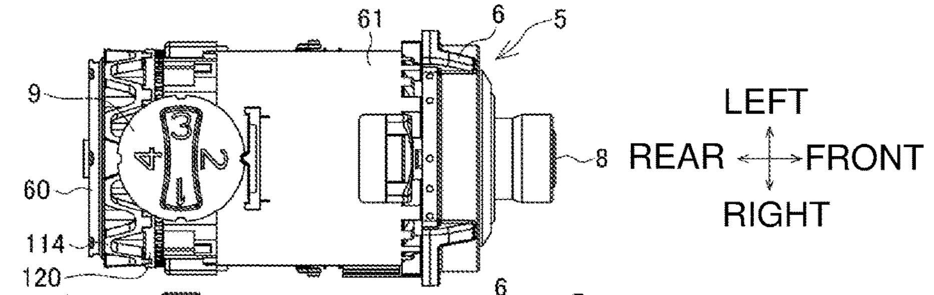
FIG. 20A is a plan view of the actuator unit with a second speed being selected in a vibration drill mode.
Figure 20B:
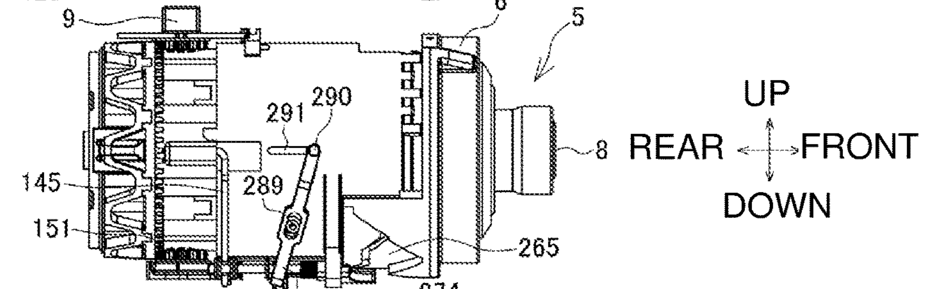
FIG. 20B is a side view of the actuator unit with the second speed being selected in the vibration drill mode.
Figure 20C:
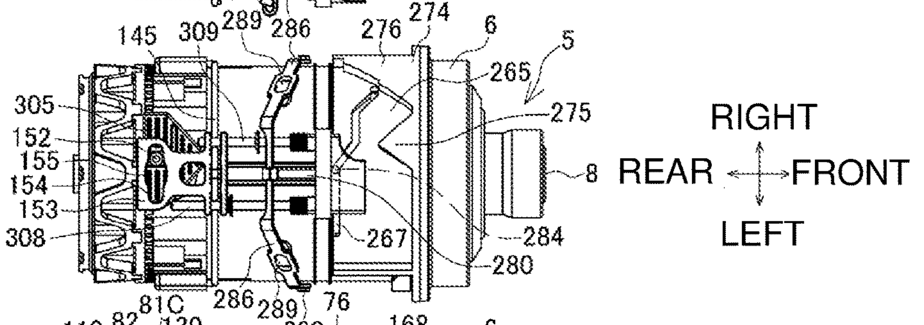
FIG. 20C is a bottom view of the actuator unit with the second speed being selected in the vibration drill mode.

FIGS. 20A to 20E show the actuator unit at the second speed. The speed switching dial 9 has turned right by 90° in a plan view from the first speed. At this rotational position of the speed switching dial 9, the 18° rotation of the face gear ring 120 causes the speed switching plates 110 to tilt backward. The first-stage internal gear 81A is restricted from rotating, whereas the second-stage internal gear 81B is free to rotate. In this state, as shown in FIG. 20C, the speed switching gear 151 has rotated left by 90° in a plan view to be at a second rotational position with the eccentric pin 152 at the rear right. The speed switching holder 153 thus remains at the backward position, with the internal gear 81C engaging with the engagement ring 82 at the backward position and being restricted from rotating. When rotating by 90°, the eccentric pin 152 moves along an arc-shaped trajectory that is convex rearward. The circular portion 155 in the middle of the long hole 154 in the speed switching holder 153 is wide enough in the front-rear direction to permit the rotation of the eccentric pin 152. This reduces the likelihood of excessive load being applied to the speed switching holder 153.

Thus, although the rotation input from the input gear 74 is transmitted to the planetary gears 80A and the planetary gears 80B, the planetary gears 80B do not revolve but the first-stage planetary gears 80A with a lower reduction ratio alone revolve in the internal gear 81A. The rotation of the rear carrier 85 resulting from the revolving planetary gears 80A is transmitted to the third-stage planetary gears 80C, causing the planetary gears 80C to revolve in the internal gear 81C. The rotation of the front carrier 130 resulting from the revolving planetary gears 80C is transmitted to the spindle 165 at a speed higher than the first speed.

FIGS. 21A to 21E show the actuator unit at the third speed. The speed switching dial 9 has turned right by 90° in a plan view from the second speed. At this rotational position of the speed switching dial 9, the 18° rotation of the face gear ring 120 causes the speed switching plates 110 to tilt forward in the same manner as for the first speed. The second-stage internal gear 81B is thus restricted from rotating, whereas the first-stage internal gear 81A is free to rotate.

Figure 21A:
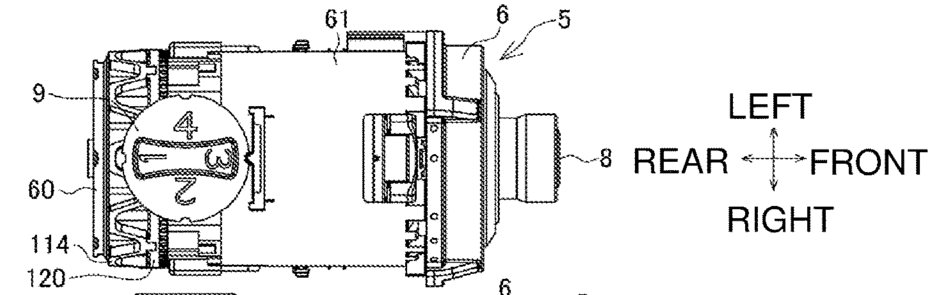
FIG. 21A is a plan view of the actuator unit with a high impact mode (third speed) being selected.
Figure 21B:
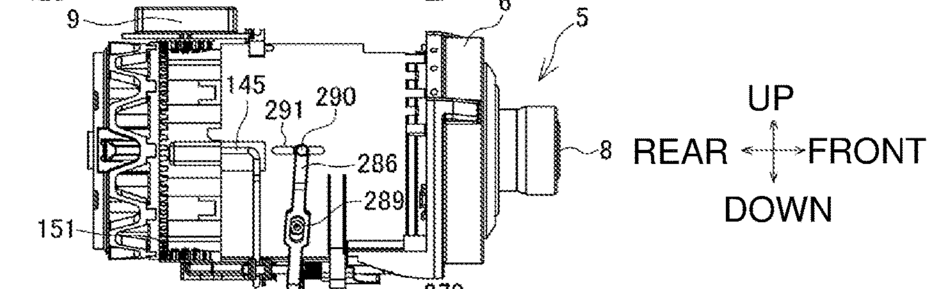
FIG. 21B is a side view of the actuator unit with the high impact mode (third speed) being selected.
Figure 21C:
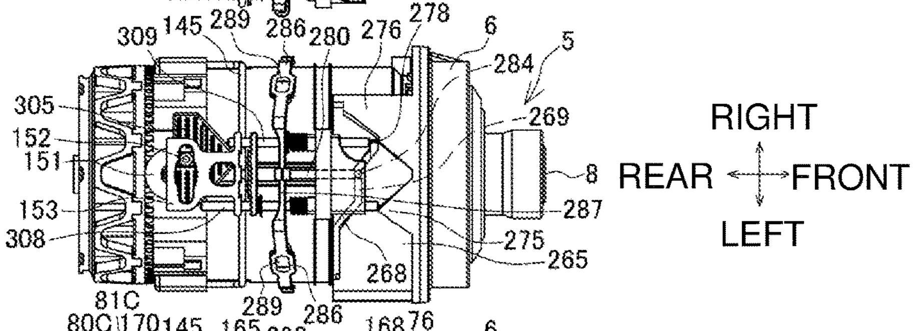
FIG. 21C is a bottom view of the actuator unit with the high impact mode (third speed) being selected.
Figure 21D:
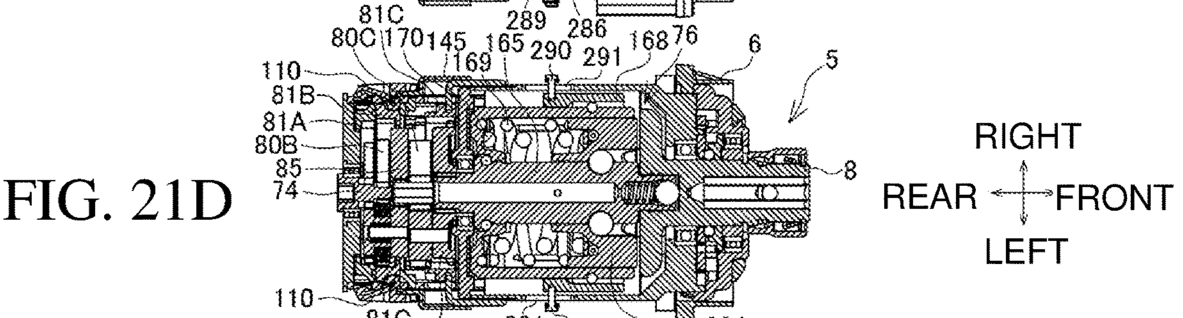
FIG. 21D is a lateral sectional view of the actuator unit with the high impact mode (third speed) being selected.

In this state, as shown in FIG. 21C, the speed switching gear 151 has rotated left by 90° in a plan view from the second speed to be at a third rotational position with the eccentric pin 152 at the front right. The speed switching holder 153 thus moves to a forward position and moves the internal gear 81C to the forward position with the speed switching wire 145. At this forward position, the internal gear 81C is free to rotate and integrates the third-stage planetary gears 80C with the front carrier 130 in the rotation direction.

Thus, although the rotation input from the input gear 74 is transmitted to the planetary gears 80A and the planetary gears 80B, the planetary gears 80A do not revolve but the second-stage planetary gears 80B with a higher reduction ratio alone revolve in the internal gear 81B. The rotation of the rear carrier 85 resulting from the revolving planetary gears 80B is transmitted to the front carrier 130 from the third-stage planetary gears 80C through the internal gear 81C. Thus, the speed reduction at the third stage is canceled, and the rotation of the front carrier 130 is transmitted to the spindle 165 at a speed higher than the second speed.

FIGS. 22A to 22E show the actuator unit at the fourth speed. The speed switching dial 9 has turned right by 90° in a plan view from the third speed. At this rotational position of the speed switching dial 9, the 18° rotation of the face gear ring 120 causes the speed switching plates 110 to tilt backward in the same manner as for the second speed. The first-stage internal gear 81A is restricted from rotating, whereas the second-stage internal gear 81B is free to rotate.

Figures 22A, 22B, 22C, 22D, 22E:
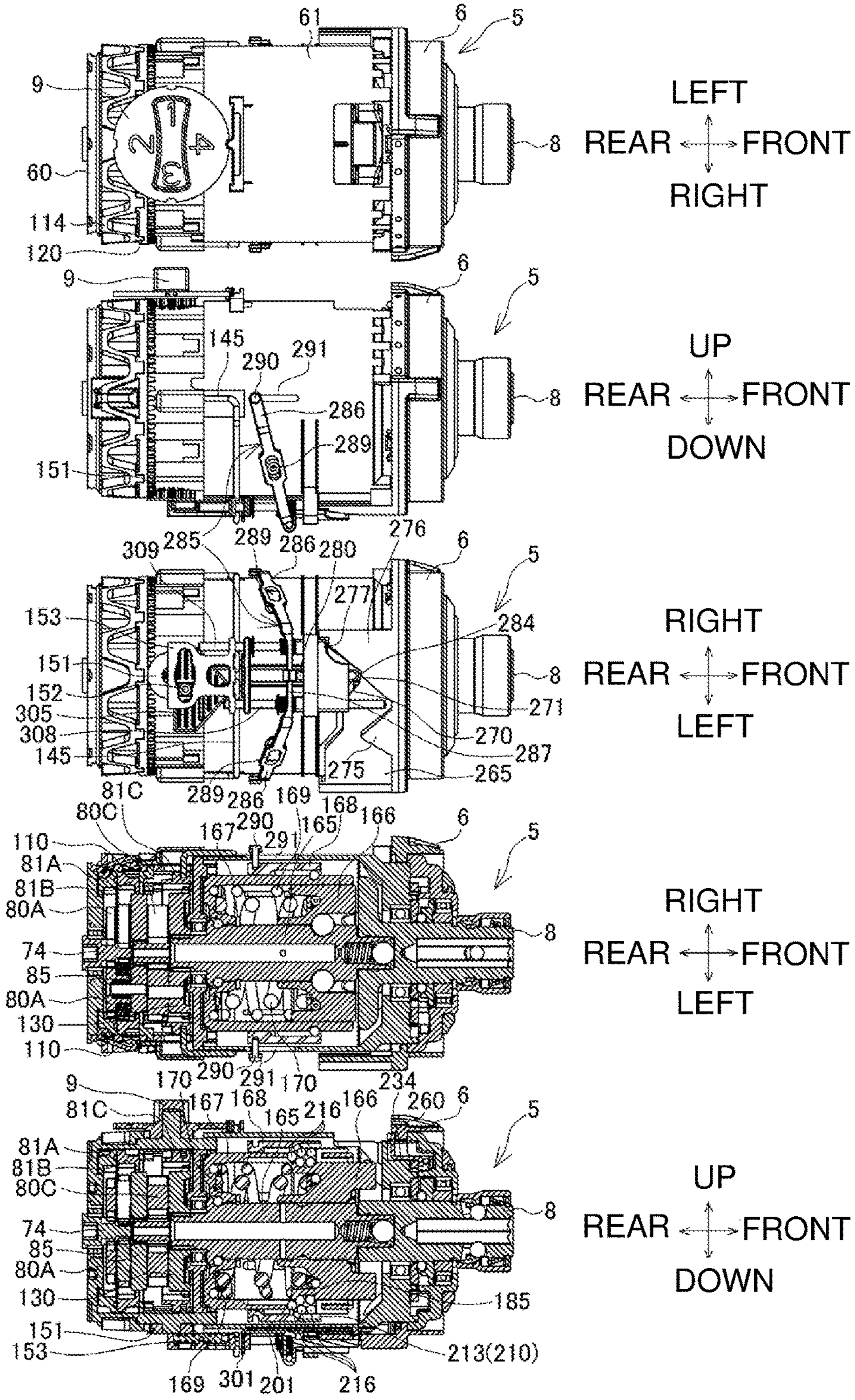
FIG. 22A is a plan view of the actuator unit with a low impact mode (fourth speed) being selected.
FIG. 22B is a side view of the actuator unit with the low impact mode (fourth speed) being selected.
FIG. 22C is a bottom view of the actuator unit with the low impact mode (fourth speed) being selected.
FIG. 22D is a lateral sectional view of the actuator unit with the low impact mode (fourth speed) being selected.
FIG. 22E is a central longitudinal sectional view of the actuator unit with the low impact mode (fourth speed) being selected.

In this state, as shown in FIG. 22C, the speed switching gear 151 has rotated left by 90° in a plan view from the third speed to be at a fourth rotational position with the eccentric pin 152 at the front left. The speed switching holder 153 and the internal gear 81C thus remain at the forward positions.

Thus, although the rotation input from the input gear 74 is transmitted to the planetary gears 80A and the planetary gears 80B, the planetary gears 80B do not revolve but the first-stage planetary gears 80A with a lower reduction ratio alone revolve in the internal gear 81A. The rotation of the rear carrier 85 resulting from the revolving planetary gears 80A is transmitted to the front carrier 130 from the third-stage planetary gears 80C through the internal gear 81C. The rotation of the front carrier 130 is thus transmitted to the spindle 165 at a speed higher than the third speed.

In this manner, the reducer 75 allows selection from variable speeds with a rotational operation on the speed switching dial 9. In a specific operational mode, a linkage operation performed by the linkage switcher 78 switches the reducer 75 automatically to a specific variable speed in response to rotation of the mode change ring 6. This linkage operation will be described later.

2. Striker

Figure 23:
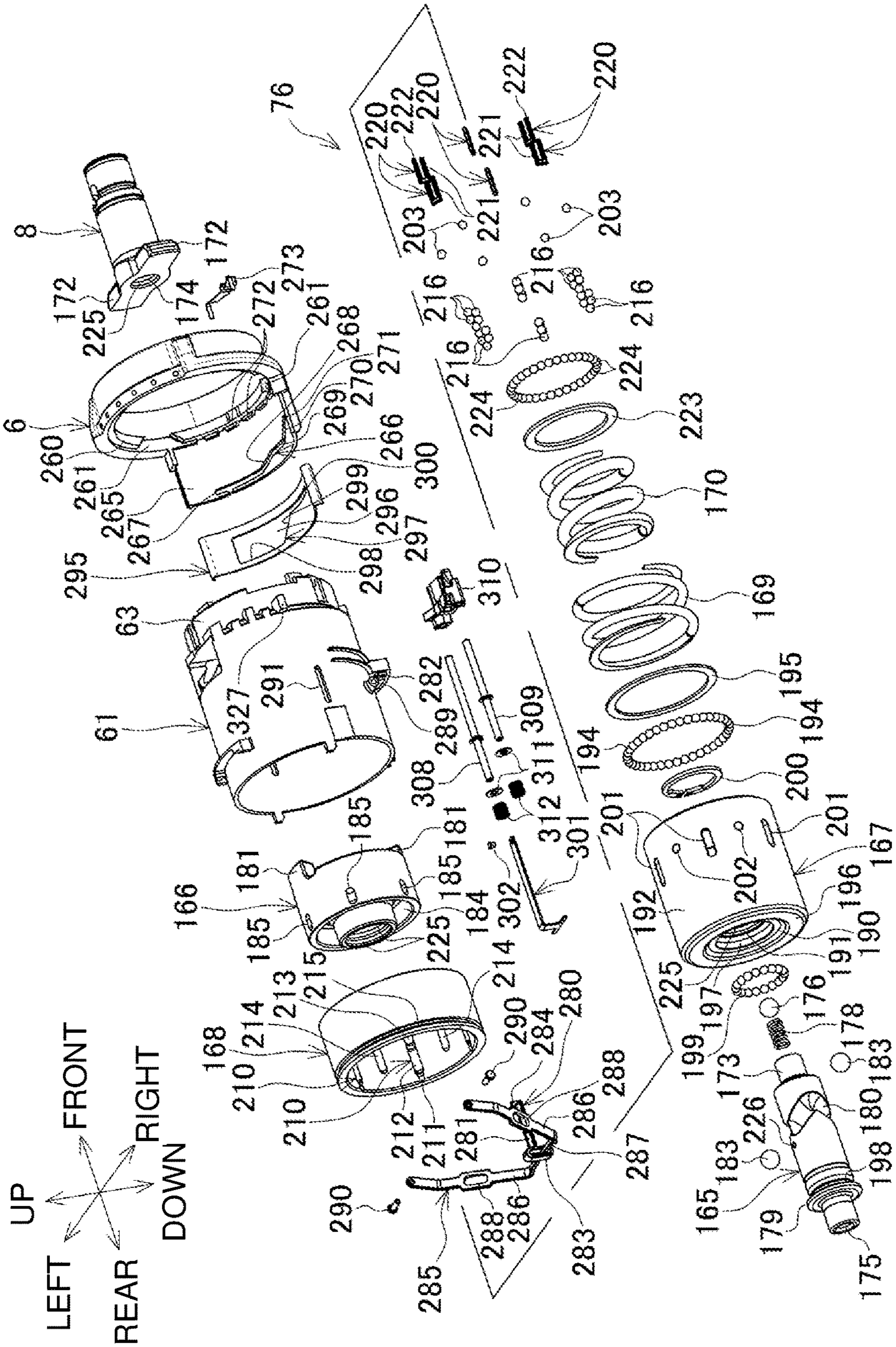
FIG. 23 is an exploded perspective view of a striker.

As shown in FIGS. 10, 11, and 23, the striker 76 includes the spindle 165, an inner hammer 166, an outer hammer 167, a hammer sleeve 168, an outer coil spring 169, an inner coil spring 170, and the anvil 8.

The striker 76 is housed in the front gear case 61, except a front portion of the anvil 8. The anvil 8 extends through the front plate 63 of the front gear case 61. The front plate 63 retains a bearing 171 that supports the anvil 8. The anvil 8 has a pair of arms 172 protruding radially on its rear end in the front gear case 61.

The spindle 165 extends frontward, with its rear portion supported by the bracket plate 136. The spindle 165 has a smaller-diameter portion 173 on its front end. The anvil 8 has an axial blind hole 174 at its rear end. The blind hole 174 receives the smaller-diameter portion 173. At a forward position of the anvil 8 at which the arms 172 are in contact with the front plate 63, a gap is left between the front surface of the spindle 165 excluding the smaller-diameter portion 173 and the rear surface of the anvil 8. The anvil 8 is thus movable backward by the length of the gap.

The spindle 165 has an axial through-hole 175 extending across its length. The through-hole 175 receives a ball 176 on its front end. The through-hole 175 has a diameter decreasing portion 177 with a smaller opening diameter behind the ball 176. A coil spring 178 is located between the ball 176 and the diameter decreasing portion 177. The coil spring 178 presses the ball 176 against the inner surface of the blind hole 174. The anvil 8 is thus urged to the forward position in a non-operating state.

The spindle 165 has a flange 179 on its rear portion in front of the bracket plate 136. The spindle 165 has a pair of inner cam grooves 180 on its front portion behind the smaller-diameter portion 173. The inner cam grooves 180 are V-shaped with the tips facing frontward.

The inner hammer 166 is cylindrical and externally mounted on the front portion of the spindle 165. The inner hammer 166 has a pair of tabs 181 on its front surface. The tabs 181 protrude frontward. The tabs 181 engage with the arms 172 of the anvil 8 in the rotation direction. The inner hammer 166 has a pair of outer cam grooves 182 on its inner circumferential surface. The outer cam grooves 182 extend rearward from the front end. A cam ball 183 is fitted between each outer cam groove 182 and the corresponding inner cam groove 180 on the spindle 165. The inner hammer 166 is thus connected to the spindle 165 with the cam balls 183 in between. The inner hammer 166 is movable forward and backward and rotatable relative to the spindle 165 in a range in which the cam balls 183 roll between the respective inner cam grooves 180 and outer cam grooves 182.

The inner hammer 166 has an annular groove 184 on its rear surface. The inner hammer 166 has multiple (six) inner fitting grooves 185 on its circumferential surface near the rear end. The multiple inner fitting grooves 185 are at equal intervals in the circumferential direction of the inner hammer 166. The inner fitting grooves 185 each extend in the front-rear direction.

The outer hammer 167 is a bottomed cylinder with the front end being open. The outer hammer 167 is externally mounted on the rear portion of the spindle 165. The outer hammer 167 includes a bottom plate 190, an inner cylinder 191, and an outer cylinder 192. The spindle 165 extends through the center of the bottom plate 190. The inner cylinder 191 protrudes frontward from the inner circumference of the bottom plate 190. The outer cylinder 192 protrudes frontward from the outer circumference of the bottom plate 190. The outer cylinder 192 protrudes frontward more than the inner cylinder 191.

Figure 18B:
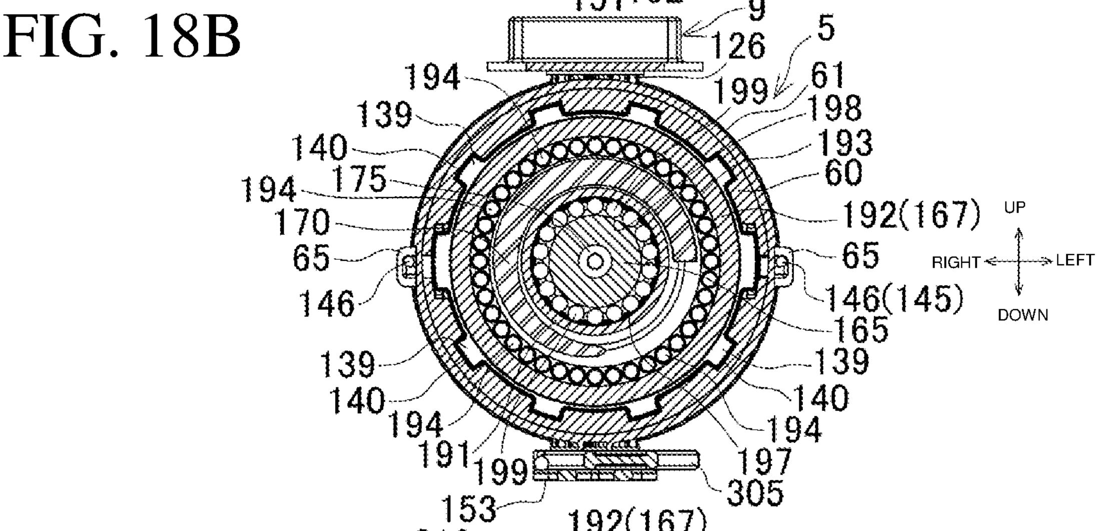
FIG. 18B is a sectional view taken along line O-O in FIG. 10.

The bottom plate 190 has an annular inner groove 193 on its inner surface along the outer circumference. The inner groove 193 receives multiple balls 194 along the entire circumference, as shown in FIG. 18B as well. The balls 194 receive the rear end of the outer coil spring 169 with a washer 195 in between. The rear end of the inner coil spring 170 is in contact with the inner surface of the bottom plate 190 inward from the balls 194. The bottom plate 190 has an annular protrusion 196 on its rear surface rearward from the inner groove 193. The protrusion 196 protrudes into the recess 141 on the front surface of the bracket plate 136. The bracket plate 136 and the bottom plate 190 thus radially overlap each other to reduce the size in the axial direction.

The inner cylinder 191 has an annular inner recess 197 extending frontward from the rear end on its inner circumferential surface. The inner recess 197 faces the flange 179 on the spindle 165 from the front. The spindle 165 has a narrow portion 198 on its outer circumference in front of the flange 179. The narrow portion 198 receives multiple balls 199 along its entire circumference. The balls 199 are in contact with the front inner surface of the inner recess 197 and receive the inner cylinder 191 in the axial direction. The spindle 165 is engaged with a stop ring 200 in front of the inner cylinder 191. The outer hammer 167 is thus connected rotatably to the spindle 165, with the inner cylinder 191 being restricted from moving forward and backward between the balls 199 and the stop ring 200.

Figure 18C:
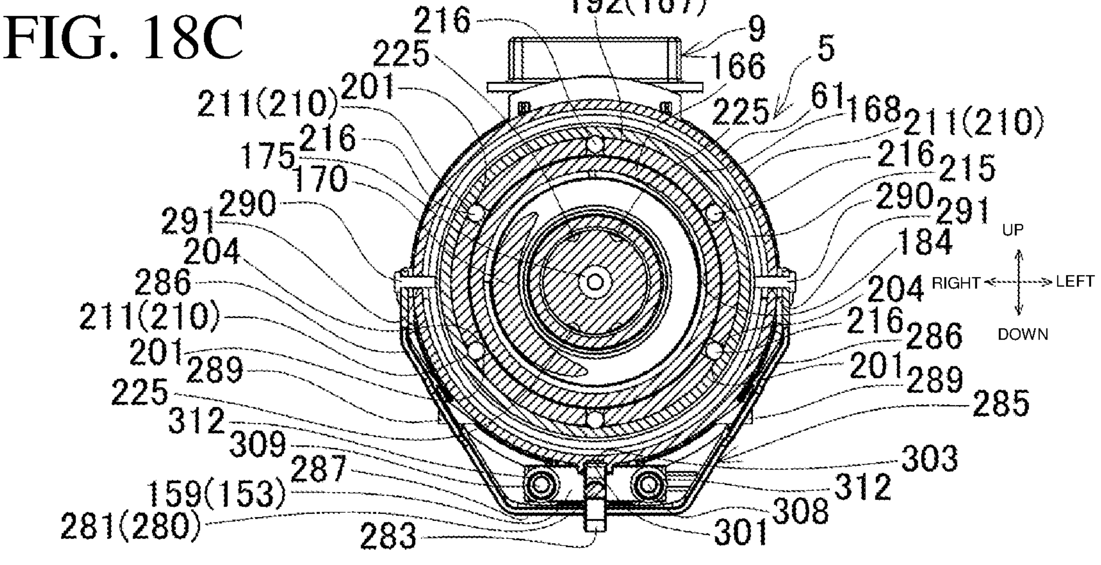
FIG. 18C is a sectional view taken along line P-P in FIG. 10.
Figure 24A:
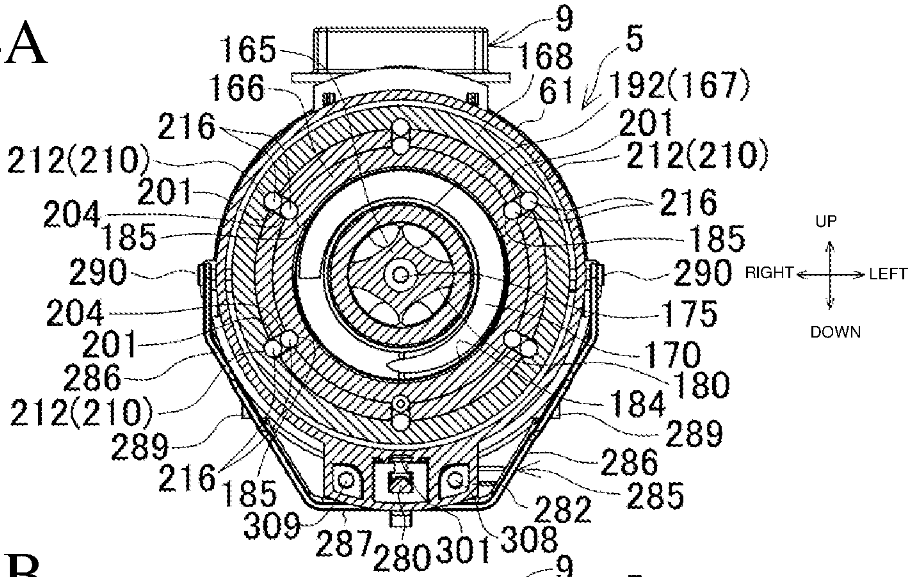
FIG. 24A is a sectional view taken along line Q-Q in FIG. 10.
Figure 24B:
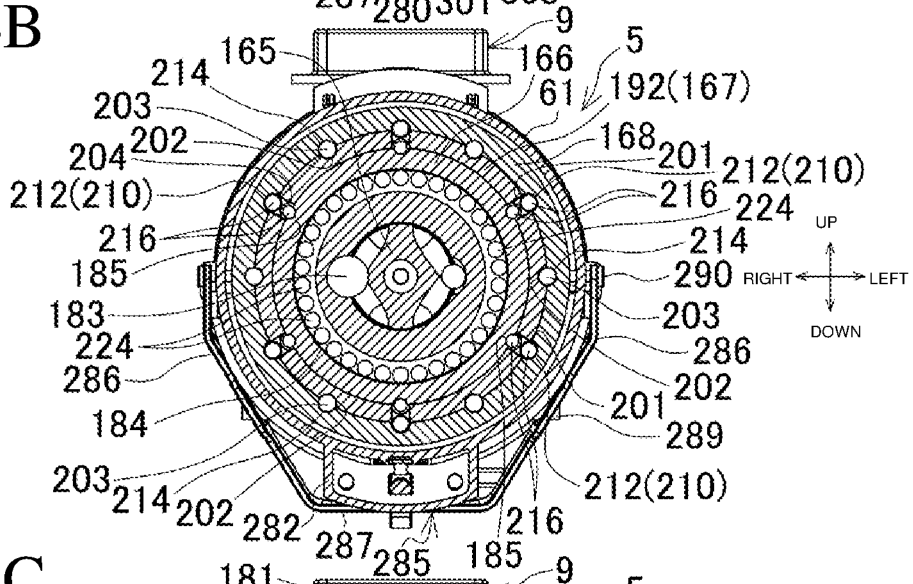
FIG. 24B is a sectional view taken along line R-R in FIG. 10.

The outer cylinder 192 has multiple (six) retainer slits 201. As shown in FIG. 18C, the multiple retainer slits 201 are at equal intervals in the circumferential direction of the outer cylinder 192. Each retainer slit 201 extends in the front-rear direction. Each retainer slit 201 corresponds to an inner fitting groove 185 on the inner hammer 166 and is located radially outward from the inner fitting groove 185. The retainer slits 201 are longer than the inner fitting grooves 185 in the front-rear direction. The outer cylinder 192 has multiple hemispherical recesses 202 each between adjacent retainer slits 201 in the circumferential direction of the outer cylinder 192, as shown in FIG. 24B as well. Each recess 202 receives a ball 203. As shown in FIGS. 10, 11, and 24A to 24C, the outer cylinder 192 has multiple support grooves 204 on its inner circumferential surface inward from the retainer slits 201. Each support groove 204 extends in the front-rear direction. Each support groove 204 extends from the front end of the outer cylinder 192 rearward more than the retainer slits 201.

Figure 24C:
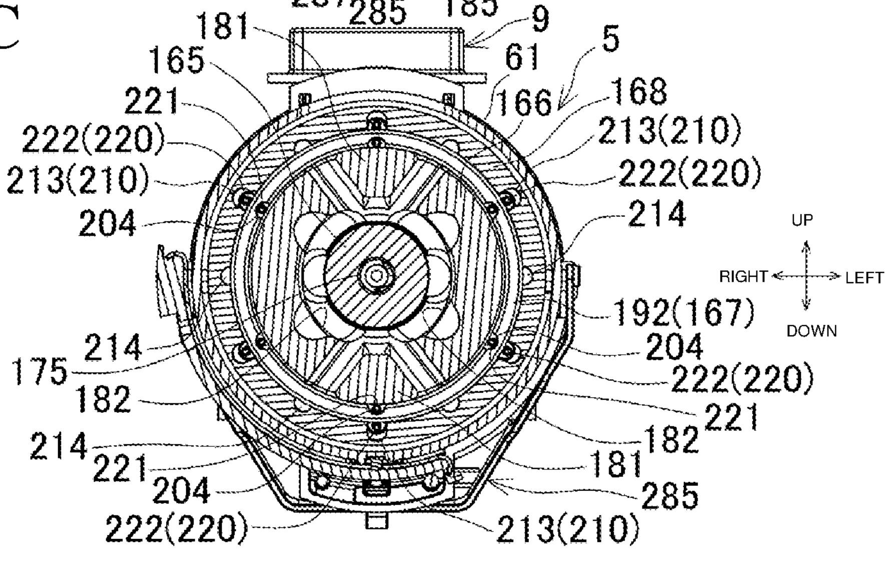
FIG. 24C is a sectional view taken along line S-S in FIG. 10.

The hammer sleeve 168 is a sleeve member externally mounted on the outer hammer 167. The hammer sleeve 168 has multiple (six) outer fitting grooves 210 on its inner circumferential surface. The multiple outer fitting grooves 210 are at equal intervals in the circumferential direction of the hammer sleeve 168. Each outer fitting groove 210 extends across the length of the hammer sleeve 168. Each outer fitting groove 210 has a radial depth increasing gradually toward the front in the order of a rear groove portion 211, a middle groove portion 212, and a front groove portion 213. The rear groove portion 211 has the smallest depth as shown in FIG. 18C. The middle groove portion 212 is deeper than the rear groove portion 211 as shown in FIGS. 24A and 24B. The front groove portion 213 is deeper than the middle groove portion 212 as shown in FIG. 24C. Each outer fitting groove 210 corresponds to a retainer slit 201 in the outer hammer 167 and is located radially outward from the retainer slit 201. Coupling grooves 214 are located circumferentially each between adjacent outer fitting grooves 210. The coupling grooves 214 are shorter than the outer fitting grooves 210 in the front-rear direction. Each coupling groove 214 extends rearward from the front end of the hammer sleeve 168. The balls 203 fitted in the recesses 202 on the outer hammer 167 are fitted into the coupling grooves 214. Thus, the outer hammer 167 and the hammer sleeve 168 are connected together integrally in the rotation direction. The hammer sleeve 168 is movable forward and backward with a stroke in which the balls 203 move relatively in the respective coupling grooves 214. The hammer sleeve 168 has an annular groove 215 on its rear circumference.

Each of the inner fitting grooves 185 on the inner hammer 166, the corresponding retainer slit 201 and support groove 204 on the outer hammer 167, and the corresponding outer fitting groove 210 on the hammer sleeve 168 radially overlap one another to together receive multiple (five) connecting balls 216. The connecting balls 216 together extend over the grooves and slits. To maintain this fitting state, multiple U-shaped clips 220 are engaged with the retainer slits 201 in front of the five connecting balls 216. Each clip 220 is placed into the front end of the corresponding retainer slit 201 from the rear, with the two ends facing frontward and the width direction aligned with the radial direction of the outer cylinder 192 of the outer hammer 167. Radially inner ends 221 of the clips 220 engage with the respective support grooves 204 on the outer cylinder 192, as shown in FIG. 24C. Radially outer ends 222 of the clips 220 engage with the respective outer fitting grooves 210 on the hammer sleeve 168.

The inner hammer 166 and the outer hammer 167 are thus connected together in the front-rear direction by the connecting balls 216, with a front portion of the outer cylinder 192 being externally mounted on the inner hammer 166. In the rotation direction, however, the hammers switch between being integral and being separate in accordance with the position of the hammer sleeve 168 in the front-rear direction.

The outer coil spring 169 and the inner coil spring 170 are doubly mounted externally on the spindle 165 between the inner hammer 166 and the outer hammer 167. The front end of the outer coil spring 169 is in contact with the rear surface of the inner hammer 166 outward from the groove 184.

The inner coil spring 170 is a wire with a larger diameter than the wire of the outer coil spring 169 and is wound reversely to the outer coil spring 169. The front end of the inner coil spring 170 is placed in the groove 184 on the inner hammer 166. The front inner surface of the groove 184 receives a washer 223 and multiple balls 224 (FIG. 24B). The washer 223 receives the front end of the inner coil spring 170.

The outer coil spring 169 and the inner coil spring 170 urge the inner hammer 166 to the forward position shown in FIGS. 10 and 11, at which each cam ball 183 is at the tip of the inner cam groove 180 on the spindle 165 and at the rear end of the outer cam groove 182 on the inner hammer 166.

Grease grooves 225 are located on each of the inner circumferential surface of the blind hole 174 in the anvil 8, the inner circumferential surface of the inner hammer 166, and the inner circumferential surface of the inner cylinder 191 in the outer hammer 167. Each grease groove 225 is annular and extends along the entire circumference of the corresponding inner circumferential surface.

In particular, the inner circumferential surface of the blind hole 174 in the anvil 8 and the inner circumferential surface of the inner hammer 166 each have two grease grooves 225 at a predetermined interval in the front-rear direction. Such multiple grease grooves 225 on each inner circumferential surface can distribute the grease between the inner circumferential surface and the shaft inside, thus maintaining lubrication.

The spindle 165 has a communication hole 226 extending radially in its middle portion behind the inner cam grooves 180. The communication hole 226 is connected to the through-hole 175. The communication hole 226 is connected to one of the grease grooves 225 on the inner hammer 166 at the forward position.

In the striker 76, a rotational operation on the mode change ring 6 moves the hammer sleeve 168 forward and backward. This switches the striking motion between being active and inactive.

When the hammer sleeve 168 is at the backward position, the deepest front groove portion 213 of each outer fitting groove 210 is outward from the corresponding retainer slit 201 in the outer hammer 167, as shown in FIG. 22E. The five connecting balls 216 are thus fitted into the corresponding front groove portion 213, retainer slit 201, and support groove 204 under a centrifugal force, separating from the corresponding inner fitting groove 185 on the inner hammer 166. This allows the inner hammer 166 alone to perform a striking action.

Figure 21E:
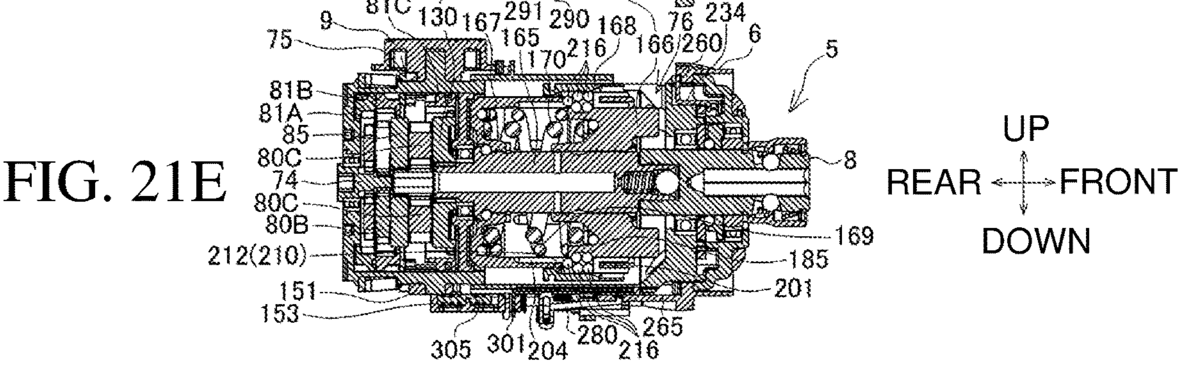
FIG. 21E is a central longitudinal sectional view of the actuator unit with the high impact mode (third speed) being selected.

When the hammer sleeve 168 is at a middle position forward from the backward position, the middle groove portion 212 of each outer fitting groove 210 is outward from the corresponding retainer slit 201, as shown in FIG. 21E. Thus, three of the five connecting balls 216 are together fitted between the corresponding middle groove portion 212 and retainer slit 201 under a centrifugal force. The inner two connecting balls 216 are together fitted between the corresponding support groove 204 in the retainer slit 201 and the corresponding inner fitting groove 185. Thus, the inner hammer 166, the outer hammer 167, and the hammer sleeve 168 operate together to cause a striking action.

Figure 19E:
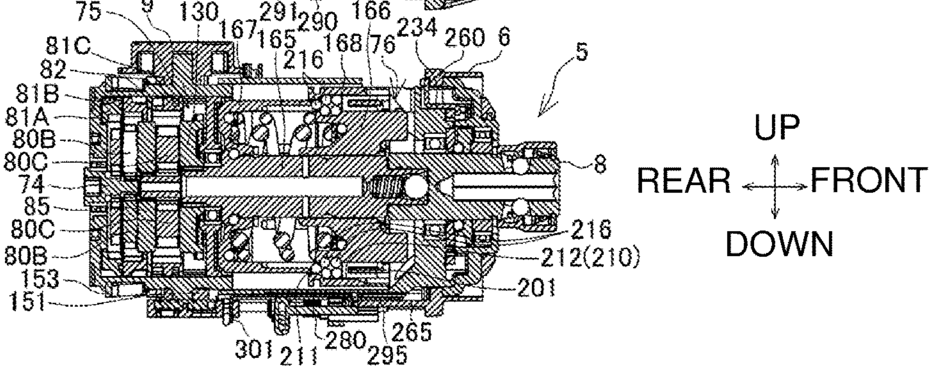
FIG. 19E is a central longitudinal sectional view of the actuator unit with the first speed selected in the drill mode.
Figure 20D:
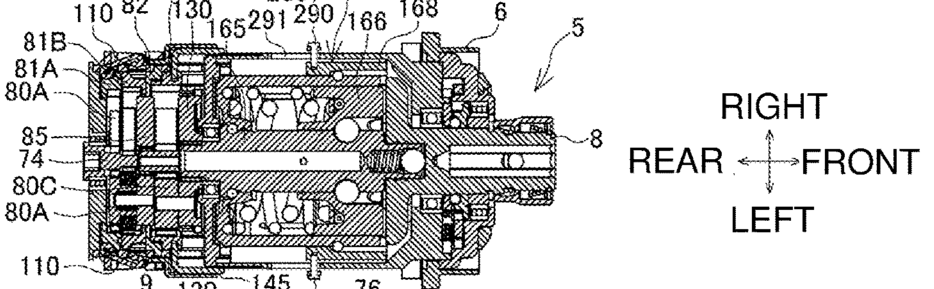
FIG. 20D is a lateral sectional view of the actuator unit with the second speed being selected in the vibration drill mode.
Figure 20E:
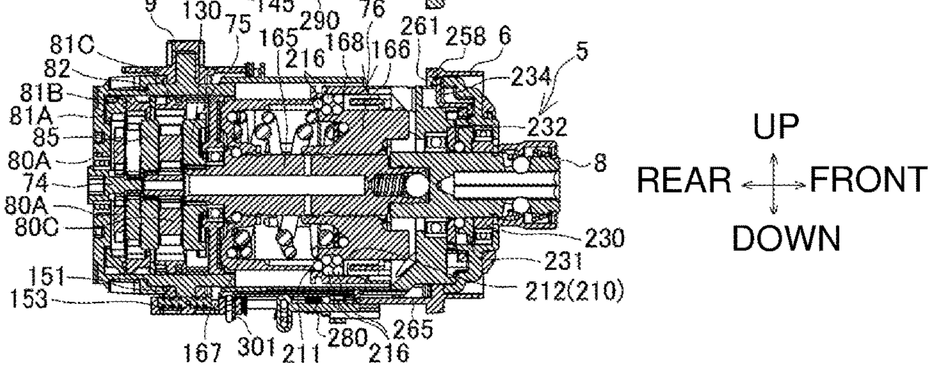
FIG. 20E is a central longitudinal sectional view of the actuator unit with the second speed being selected in the vibration drill mode.

When the hammer sleeve 168 is at a forward position forward from the middle position, the rear groove portion 211 and the middle groove portion 212 of each outer fitting groove 210 are outward from the corresponding retainer slit 201, as shown in FIGS. 19E and 20E. The five connecting balls 216 are thus immovable under any centrifugal force. The inner hammer 166 thus cannot move backward, causing no striking action.

3. Vibrator

Figure 25:
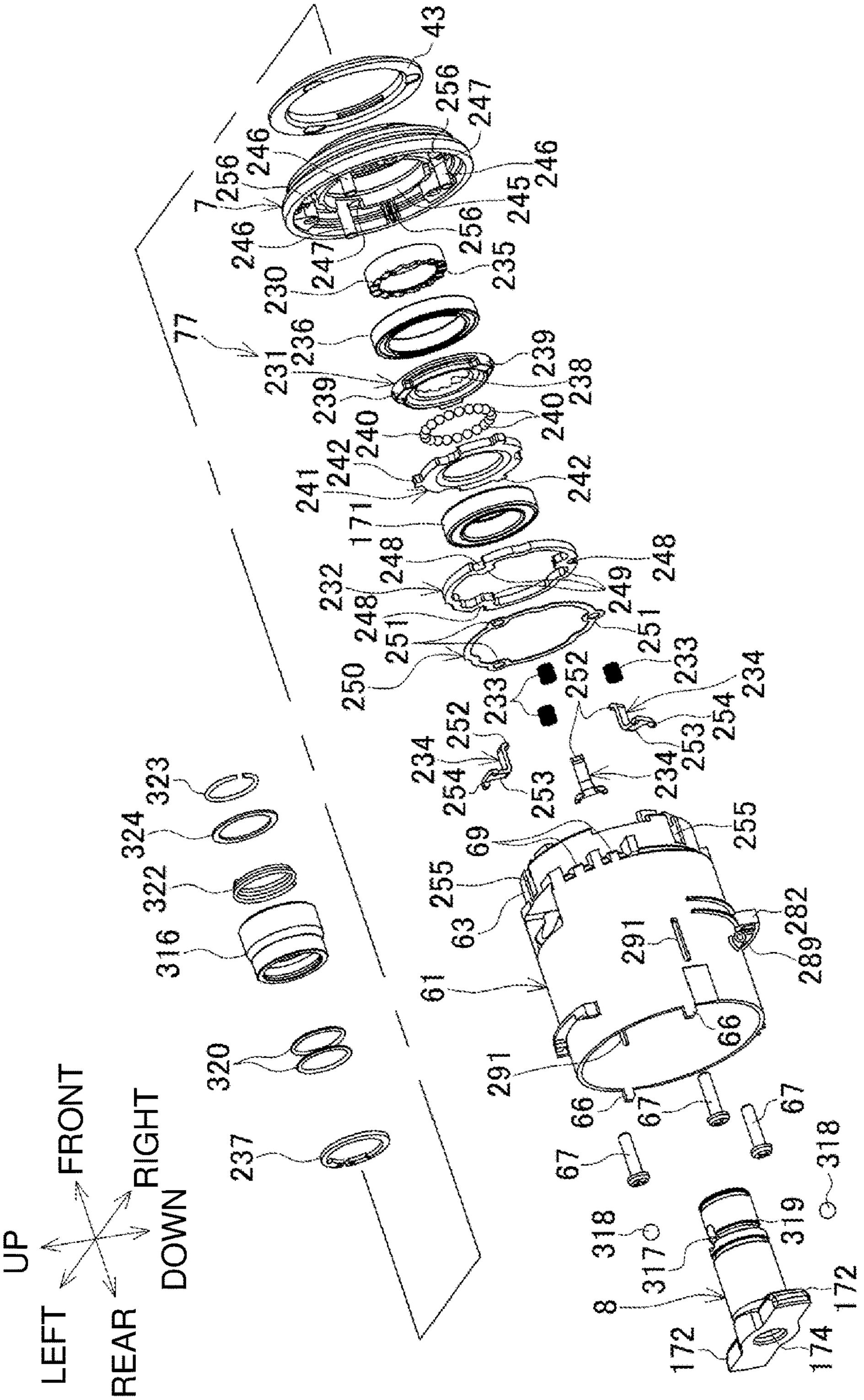
FIG. 25 is an exploded perspective view of a vibrator.

The vibrator 77 is located between the front plate 63 of the front gear case 61 and the hammer case 7. As shown in FIGS. 10, 11, and 25, the vibrator 77 includes the anvil 8, a front cam 230, a rear cam 231, a restriction ring 232, coil springs 233, and vibration switching plates 234.

The front cam 230 is annular and integrally fixed to the anvil 8 at the front inside the hammer case 7. The front cam 230 has a front cam surface 235 on its rear surface. The front cam surface 235 has continuous irregularities circumferentially. The front cam 230 is supported on the hammer case 7 with a bearing 236.

A circlip 237 is engaged and fixed to the anvil 8 in front of the front cam 230.

Figure 26A:
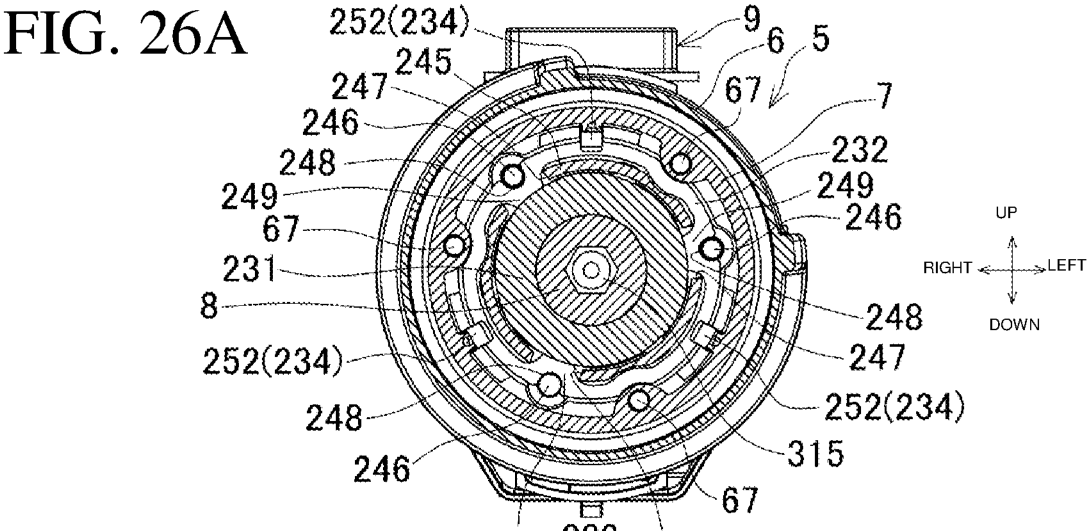
FIG. 26A is a sectional view taken along line T-T in FIG. 10.
Figure 26B:
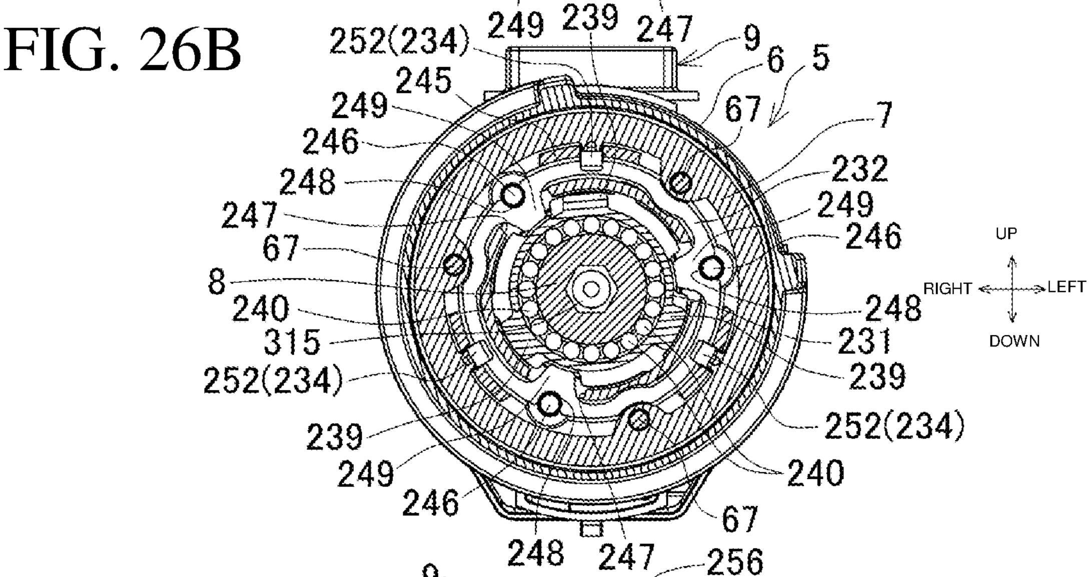
FIG. 26B is a sectional view taken along line U-U in FIG. 10.
Figure 26C:
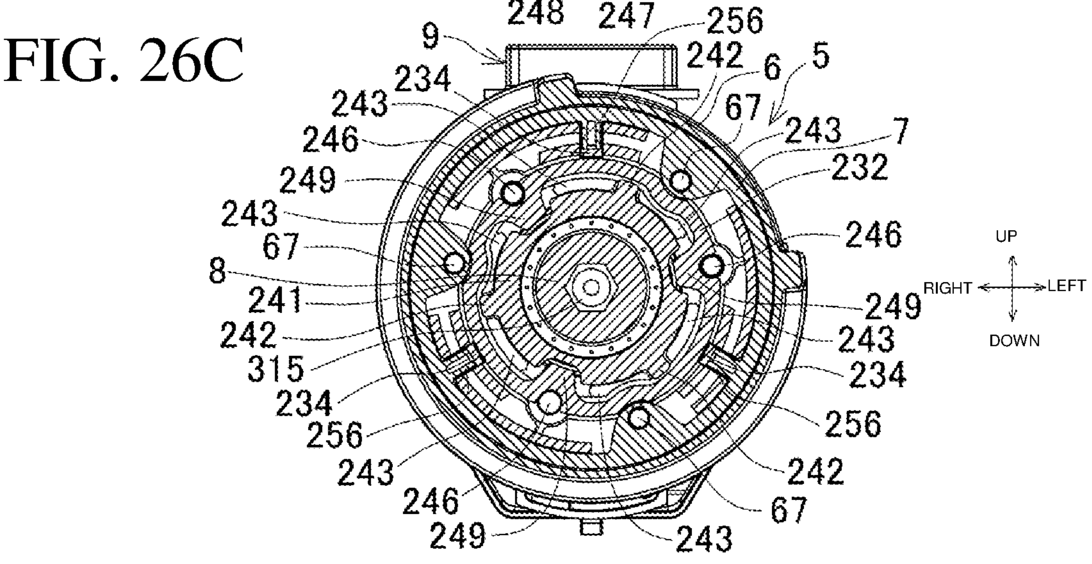
FIG. 26C is a sectional view taken along line V-V in FIG. 10.

The rear cam 231 is externally mounted on the anvil 8 behind the front cam 230. The rear cam 231 is annular and has a larger diameter than the front cam 230, as shown in FIG. 26A as well. The rear cam 231 has a rear cam surface 238 on its front surface. The rear cam surface 238 has continuous irregularities circumferentially. The rear cam 231 has three cam tabs 239 protruding rearward at circumferentially equal intervals on its rear surface along the outer circumference, as shown in FIG. 26B as well. Multiple balls 240 are located circumferentially inward from the cam tabs 239 and behind the rear cam 231. A receiving washer 241 is located behind the balls 240 and in front of the front plate 63, as shown in FIG. 26C as well. The receiving washer 241 supports the balls 240. The receiving washer 241 has three engagement projections 242 protruding radially outward on its outer circumference. The front plate 63 has stop ribs 243 on its front surface. The stop ribs 243 are engaged with the engagement projections 242 in the rotation direction to restrict rotation of the receiving washer 241.

The restriction ring 232 has a larger diameter than the receiving washer 241 and is movable forward and backward in front of the front plate 63. The hammer case 7 has a guide rib 245 protruding rearward from the rear surface. The guide rib 245 is annular and has a smaller diameter than the restriction ring 232. The hammer case 7 has three restriction pins 246 on its rear surface outward from the guide rib 245. The three restriction pins 246 are at equal intervals circumferentially. The restriction pins 246 protrude rearward, with their rear ends placed in reception holes 63*a* in the front plate 63, as shown in FIG. 12A. The guide rib 245 have cutout recesses 247 inward from the restriction pins 246.

The restriction ring 232 has three engagement recesses 248 on its outer circumference. The engagement recesses 248 are engaged with the restriction pins 246. The restriction ring 232 is thus movable forward and backward along the restriction pins 246 while being restricted from rotating by the restriction pins 246. The restriction ring 232 has three restriction protrusions 249 on its inner circumference each inside an engagement recess 248. Each restriction protrusion 249 protrudes toward the center. The restriction protrusions 249 protrude inward from the guide rib 245 through the cutout recesses 247 on the guide rib 245. When the restriction ring 232 is at a forward position, the restriction protrusions 249 engage with the cam tabs 239 on the rear cam 231 in the rotation direction. The rear cam 231 is thus restricted from rotating. When the restriction ring 232 is at a backward position, the restriction protrusions 249 disengage from the cam tabs 239 rearward. The rear cam 231 is thus free to rotate.

A washer 250 is located behind the restriction ring 232. The washer 250 has the same diameter as the restriction ring 232. The washer 250 has through-holes 251 receiving the restriction pins 246.

As shown in FIG. 12A, each coil spring 233 is received in the corresponding reception hole 63*a* in the front plate 63 between the washer 250 and the bottom surface of the reception hole 63*a*. Each coil spring 233 is externally mounted on the rear end of the corresponding restriction pin 246 extending through the washer 250. Thus, the washer 250 and the restriction ring 232 are urged forward by the coil springs 233.

Three vibration switching plates 234 are located outward from the restriction ring 232 at circumferentially equal intervals. The three vibration switching plates 234 are arranged circumferentially in a phase different from the phase for the restriction pins 246. Each vibration switching plate 234 is a narrow plate extending in the front-rear direction. Each vibration switching plate 234 has a front bend 252 in its front portion. The front bend 252 is bent inward to engage with the front surface of the restriction ring 232. Each vibration switching plate 234 has a rear bend 253 in its rear portion. The rear bend 253 is bent outward. The outer end of the rear bend 253 has two ends in its width direction. The two ends are bent outward to the rear to be a tapered portion 254.

The front plate 63 of the front gear case 61 has three holder grooves 255 on its outer circumferential surface. Each holder groove 255 is open frontward and radially outward. Each holder groove 255 receives a vibration switching plate 234. The tapered portion 254 protrudes radially outward from the holder groove 255.

The hammer case 7 has three support ribs 256 protruding inward from its inner circumferential surface. Each support rib 256 is placed into the corresponding holder groove 255 from the front to support the corresponding vibration switching plate 234 with the inner surface of the holder groove 255. Thus, each vibration switching plate 234 is movable forward and backward between the corresponding holder groove 255 and support rib 256. Each vibration switching plate 234 is urged forward together with the restriction ring 232 engaged with the front bend 252.

In the vibrator 77, a rotational operation on the mode change ring 6 switches the vibration switching plates 234 between being restricted from moving forward and being free to move forward. This allows selection from operations with vibration and without vibration. More specifically, once the vibration switching plates 234 are free to move forward, the restriction ring 232 moves forward and the restriction protrusions 249 engage with the cam tabs 239 on the rear cam 231. This restricts rotation of the rear cam 231. In this case, as the anvil 8 rotates, the front cam surface 235 of the front cam 230 engages with the rear cam surface 238 of the rear cam 231 in the rotation direction. This causes the anvil 8 to move slightly in the front-rear direction by the length of the gap with the spindle 165, thus causing vibration.

When the vibration switching plates 234 are restricted from moving forward, the restriction ring 232 moves backward to disengage the restriction protrusions 249 from the cam tabs 239 rearward. The rear cam 231 are thus free to rotate. In this case, any rotation of the anvil 8 does not cause the front cam 230 to engage with the rear cam 231, thus causing no vibration in the anvil 8.

In this example, the front cam 230 is directly supported by a bearing 236, which is used to restrict forward motion of the rear cam 231. This structure reduces the number of components and reduces the size in the axial direction.

4. Linkage Switcher

As shown in FIGS. 10 and 23, the mode change ring 6 has a ridge 260 along its inner circumference outward from the vibration switching plates 234. The ridge 260 is engaged with, from the rear, the rear bends 253 of the vibration switching plates 234 urged forward. The ridge 260 has three tapered cutouts 261 at equal intervals circumferentially. The cutouts 261 can receive the tapered portions 254 on the rear bends 253. When the mode change ring 6 is at a rotational position at which the cutouts 261 are in front of the tapered portions 254, the restriction ring 232 and the vibration switching plates 234 move to forward positions under an urging force from the coil springs 233. Thus, the restriction ring 232 restricts rotation of the rear cam 231. When the mode change ring 6 is rotated in this state, the tapered cutouts 261 press the tapered portions 254 rearward to move the vibration switching plates 234 and the restriction ring 232 to a backward position. The restriction ring 232 then disengages from the rear cam 231 rearward, allowing the rear cam 231 to be free to rotate.

Figure 27:
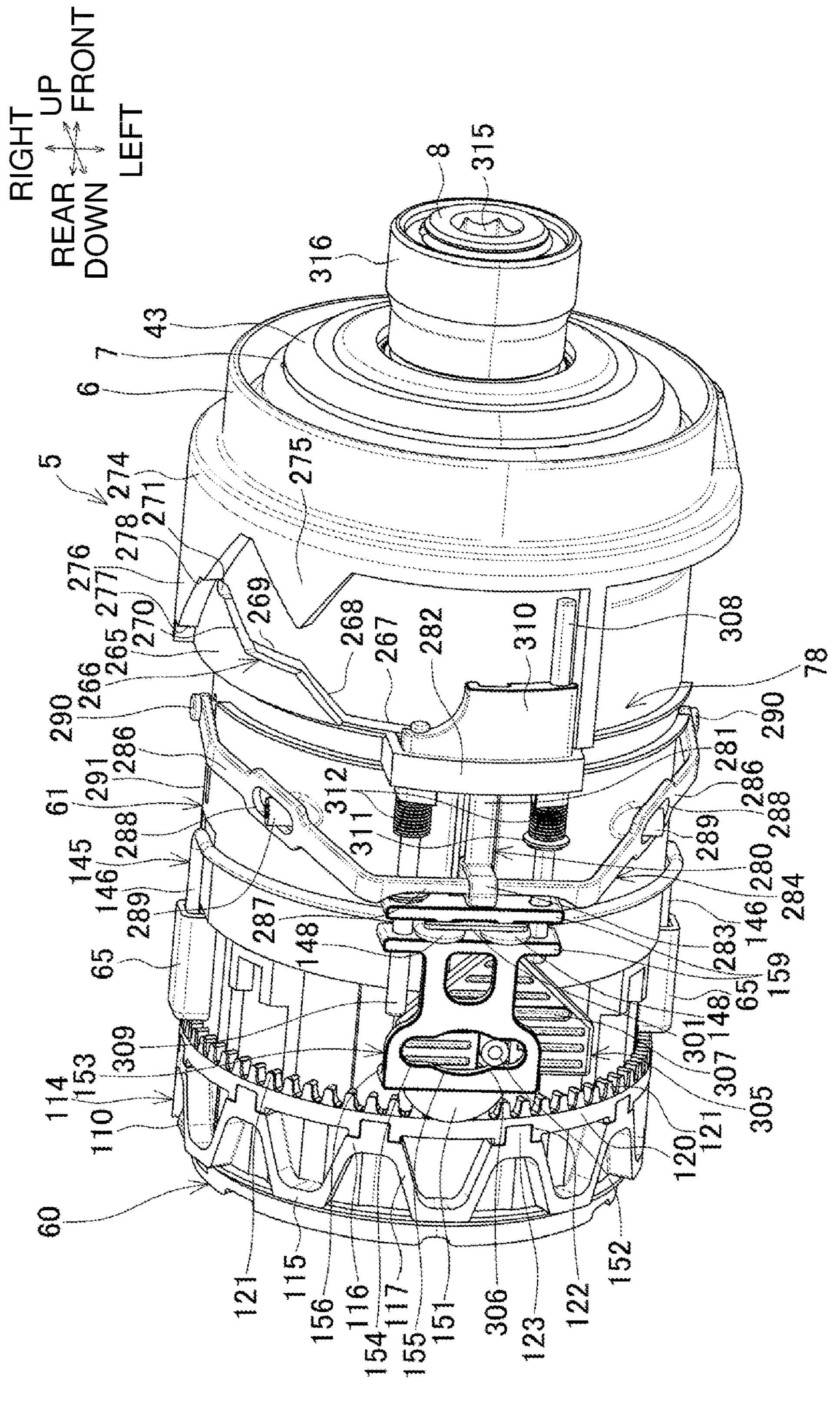
FIG. 27 is a bottom perspective view of the actuator unit.

As shown in FIGS. 23 and 27, a guide plate 265 is integral with the rear end of the mode change ring 6. The guide plate 265 is arc-shaped in the circumferential direction of the mode change ring 6 and extends rearward. The guide plate 265 has a guide slit 266 with bends. The guide slit 266 has a first slit portion 267 at its tip on the left in the rotation direction as viewed from the front. The first slit portion 267 extends rightward in the rotation direction of the guide plate 265. The first slit portion 267 is continuous with a second slit portion 268. The second slit portion 268 slopes frontward toward the right in the rotation direction from the terminal end of the first slit portion 267. The second slit portion 268 is continuous with a third slit portion 269. The third slit portion 269 extends rightward in the rotation direction from the terminal end of the second slit portion 268. The third slit portion 269 is continuous with a fourth slit portion 270. The fourth slit portion 270 slopes frontward toward the right in the rotation direction from the terminal end of the third slit portion 269. The fourth slit portion 270 is continuous with a fifth slit portion 271. The fifth slit portion 271 extends rightward in the rotation direction from the terminal end of the fourth slit portion 270.

Figure 12B:
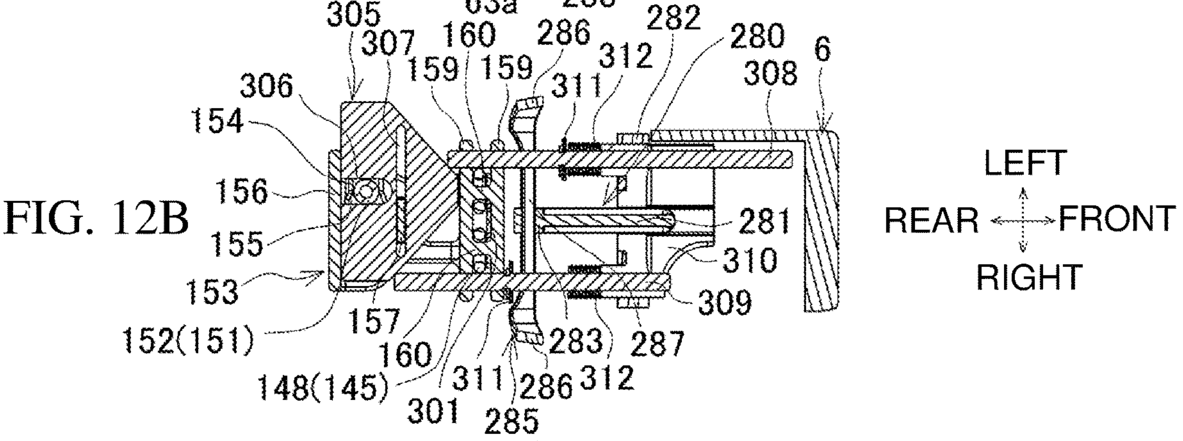
FIG. 12B is a partial sectional view taken along line F-F in FIG. 9B.
Figure 12C:
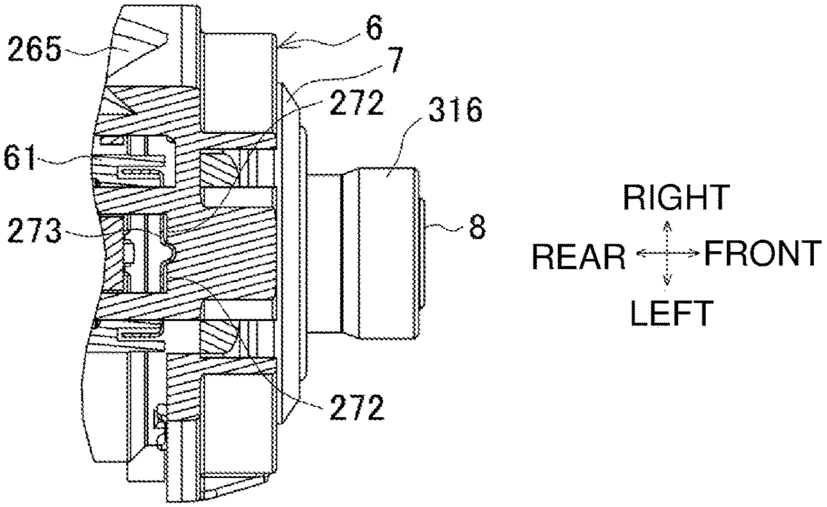
FIG. 12C is a partial sectional view taken along line G-G in FIG. 9B.

The ridge 260 on the mode change ring 6 has multiple protrusions 272 circumferentially on its rear surface inward from the guide plate 265. The protrusions 272 are at circumferentially predetermined intervals. A leaf spring 273 is retained on the lower surface of the front gear case 61 behind the protrusions 272, as shown in FIG. 12C as well. The leaf spring 273 elastically engages between the protrusions 272. The engagement positions of the leaf spring 273 serve as the switching positions for operational modes.

The guide plate 265 has a thick part 274 on its outer surface excluding the guide slit 266. The outer surface of the thick part 274 protrudes radially outward from the guide slit 266. The thick part 274 has a first chevron 275 in front of the second slit portion 268 and the third slit portion 269. The first chevron 275 is triangular and protrudes rearward. The thick part 274 has a second chevron 276 with an oblique side extending, from the front of the fourth slit portion 270 and the fifth slit portion 271, rearward toward the right in the rotation direction. The oblique side of the second chevron 276 extends rearward beyond the terminal end of the fifth slit portion 271. The oblique side of the second chevron 276 has a rear flat section 277 and a front flat section 278 that are short in the circumferential direction. The front flat section 278 is in front of the fifth slit portion 271.

The guide slit 266 is engaged with a mode change lever 280 located below the front gear case 61. The mode change lever 280 has a front linear portion 281 extending in the front-rear direction. The linear portion 281 extends through a support frame 282 on the lower surface of the front gear case 60 and is supported by a rod holder 310 (described later). The mode change lever 280 has a square frame 283 extending vertically at the rear end of the linear portion 281. The linear portion 281 has an upward guide projection 284 on its upper surface at the rear end. The guide projection 284 engages with the guide slit 266 from outside to be movable relatively within the guide slit 266.

A mode change shifter 285 located below the front gear case 61 extends through the square frame 283 in the mode change lever 280. The mode change shifter 285 has a pair of left and right linkage sections 286 and a connecting section 287. The connecting sections 287 connect the pair of left and right linkage sections 286 to each other. The connecting section 287 laterally extends through the square frame 283 in the mode change lever 280. The linkage sections 286 each extend upward and laterally outward from the left or right end of the connecting section 287. Each linkage section 286 has an elongated hole 288 in its middle portion. The elongated hole 288 extends in the direction in which the linkage section 286 extends. The front gear case 61 has a pair of left and right support shafts 289 protruding outward from its peripheral surface at the lower half, as shown in FIG. 18C as well. The support shafts 289 are loosely placed through the respective elongated holes 288.

The upper end of each linkage section 286 receives an engagement pin 290 placed through from outside in the radial direction of the front gear case 61. The front gear case 61 has left and right guide holes 291 extending in the front-rear direction on its side surface. Each engagement pin 290 extends through the corresponding guide hole 291 and engages with the annular groove 215 on the hammer sleeve 168 in the front gear case 61.

As the mode change ring 6 is rotated, the mode change lever 280, having the guide projection 284 engaged with the guide slit 266, is guided by the guide slit 266 to move forward and backward. The connecting section 287 in the mode change shifter 285 then moves forward and backward, causing each of the left and right linkage sections 286 to swing forward and backward about the corresponding support shaft 289. This then causes the hammer sleeve 168 engaged with the upper end engagement pins 290 to move linearly forward and backward.

In this example, each linkage section 286 is connected to the corresponding support shaft 289 through an elongated hole 288. Thus, any forward and backward swing of the lower end of the linkage section 286 causes relative motion of the corresponding support shaft 289 in the elongated hole 288. Each engagement pin 290 thus moves linearly forward and backward along the corresponding guide hole 291. With the engagement pins 290 constantly located outward on the left and right of the axis, the hammer sleeve 168 smoothly moves linearly without tilting. The loose placement of the support shafts 289 through the elongated holes 288 facilitates joining of the mode change shifter 285 formed from a hard material.

A linkage winder 295 is located inward from the guide plate 265. The linkage winder 295 is an arc-shaped plate fixed to the guide plate 265 from inside in an overlapping manner. The linkage winder 295 has a guide window 296 in the circumferential direction. The rear end of the guide window 296 includes a bent-shaped guide end 297. The guide end 297 has a first end portion 298 at its tip on the left in the same rotation direction as for the guide plate 265. The first end portion 298 extends in the circumferential direction of the linkage winder 295. The first end portion 298 is continuous with a second end portion 299. The second end portion 299 slopes frontward toward the right in the rotation direction from the terminal end of the first end portion 298. The second end portion 299 is continuous with a third end portion 300. The third end portion 300 extends circumferentially from the terminal end of the second end portion 299.

The linkage winder 295 is engaged with a linkage bar 301. The linkage bar 301 is a plate extending in the front-rear direction within a band groove 303 (FIGS. 18C and 23) extending in the front-rear direction on the lower surface of the front gear case 61. The linkage bar 301 has a hanging pin 302 on its front end. The hanging pin 302 engages with the guide end 297 of the linkage winder 295 from the front. The rear portion of the linkage bar 301 is located above the speed switching holder 153. The rear portion of the linkage bar 301 is bent downward between the holder plates 159. The rear portion of the linkage bar 301 extends between the connecting plates 160 in front of the projections 148 of the speed switching wire 145. The linkage bar 301 has an inverted T-shaped lower end below the speed switching holder 153 to avoid slipping off.

Thus, the linkage bar 301 is movable forward and backward with the hanging pin 302 engaged with the first end portion 298 of the guide end 297. When the linkage winder 295 rotates with the mode change ring 6 leftward as viewed from the front, the linkage bar 301 slides forward along the slope on the second end portion 299. The linkage bar 301 is restricted from moving backward with the hanging pin 302 engaging with the third end portion 300.

A linkage cam 305 is located above the rear portion of the speed switching holder 153. As shown in FIGS. 12B and 14, the linkage cam 305 is a plate having left and right slopes and tapered in the lateral width toward the front. The linkage cam 305 has a cutout 306 extending frontward from the rear end in the laterally middle portion of its rear portion. The eccentric pin 152 on the speed switching gear 151 extends through the cutout 306 from above. The linkage cam 305 has a guide recess 307 in the lateral direction on its lower surface. The guide recess 307 is engaged with the guide projection 157 on the upper surface of the speed switching holder 153. The linkage cam 305 thus moves forward and backward together with the speed switching holder 153. The linkage cam 305 slides laterally on the speed switching holder 153 in response to the lateral eccentric motion of the eccentric pin 152.

The holder plates 159 of the speed switching holder 153 receive a left rod 308 and a right rod 309 extending in parallel through the left and right portions of the holder plates 159 in the front-rear direction. The rear ends of the left and right rods 308 and 309, which extend through the holder plate 159, face the respective left and right slopes of the linkage cam 305. The right rod 309 is shorter than the left rod 308 in the front-rear direction. The front portions of the left and right rods 308 and 309 extend through the respective left and right portions of the rod holder 310. The rod holder 310 is supported within the support frame 282 in the front gear case 61 and allows the linear portion 281 of the mode change lever 280 to extend through the rod holder 310. The upper surface of the rod holder 310 supports the linkage bar 301.

The left and right rods 308 and 309 are thus supported in parallel by the holder plate 159 and the rod holder 310 to be slidable forward and backward. The left and right rods 308 and 309 receive circlips 311 to avoid slipping off and coil springs 312 for cushioning behind the rod holder 310. The front ends of the left and right rods 308 and 309, which extend through the rod holder 310, face the rear surface of the thick part 274 on the guide plate 265 in the mode change ring 6.

In the linkage switcher 78, as the mode change ring 6 is rotated, the hammer sleeve 168 switches between the forward position and the backward position with the mode change shifter 285.

As the mode change ring 6 is rotated, the speed switching holder 153 switches, with the linkage bar 301, between being permitted to move forward and backward and being restricted from moving backward at the forward position.

As the mode change ring 6 is rotated, the left and right rods 308 and 309 switch between being permitted to move forward and backward between the linkage cam 305 and the thick part 274, which are permitted to move forward and backward together with the speed switching holder 153, and being restricted from moving forward and backward by the linkage cam 305 and the thick part 274, which remain at the forward positions together with the speed switching holder 153.

Selecting from combinations of these states allows the selection from four mechanical operational modes. Each operational mode will be described in detail later.

5. Bit Attachment

Figure 28:
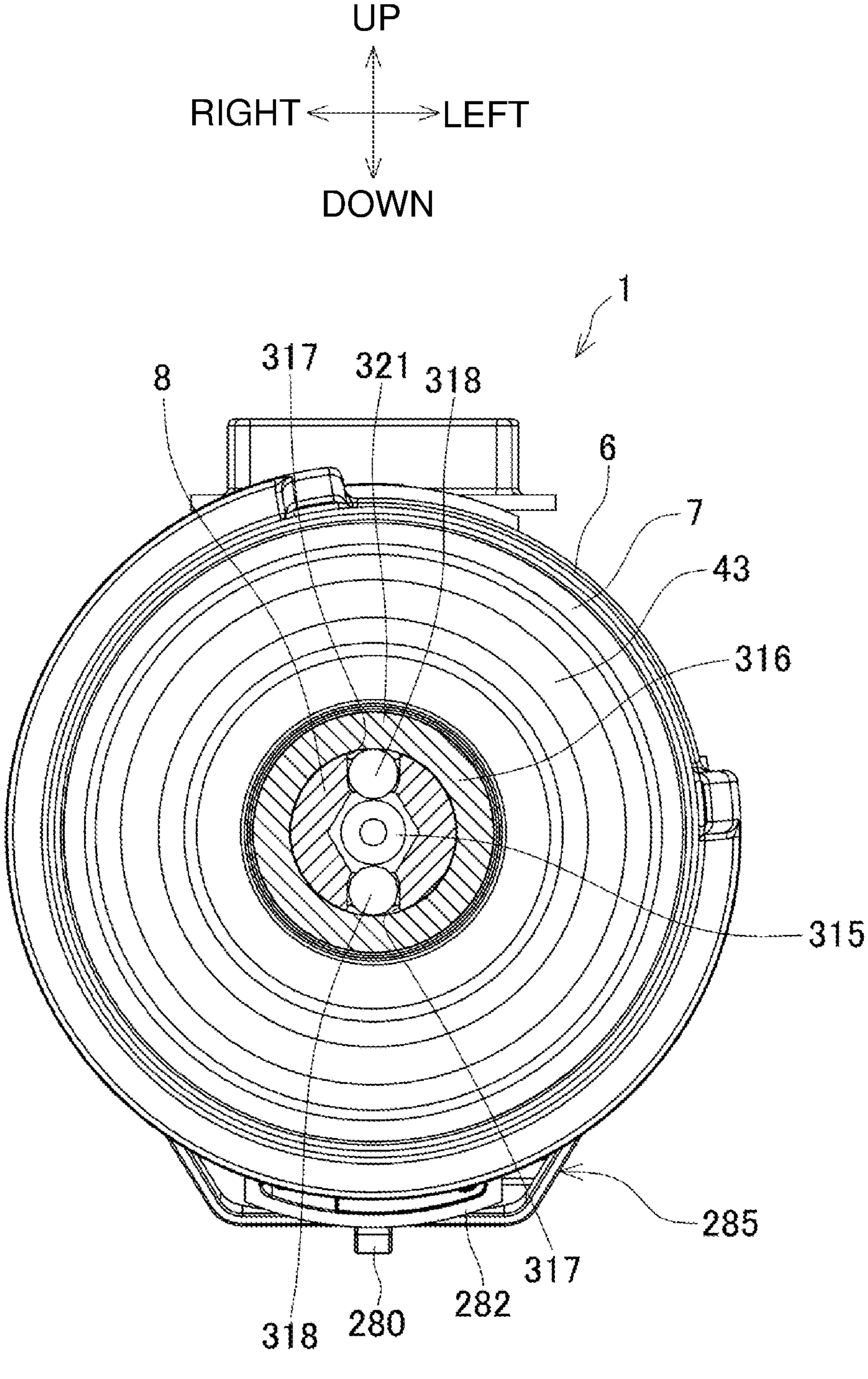
FIG. 28 is an enlarged sectional view taken along line W-W in FIG. 10.
Figure 29C:
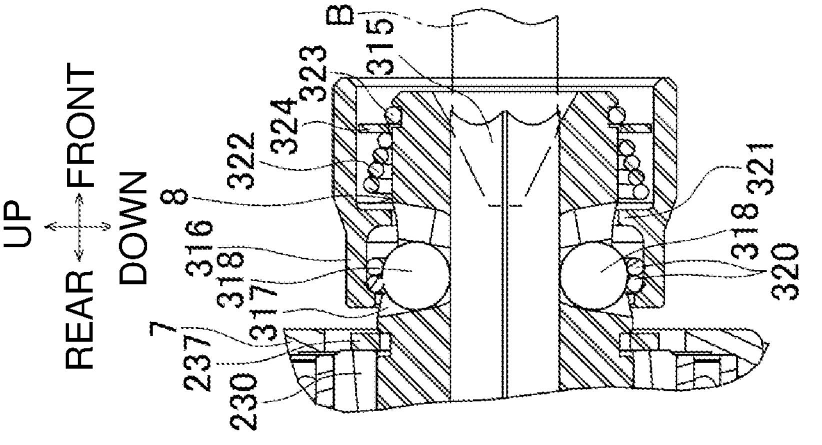
FIG. 29C is a diagram of the bit attachment with a bit being removed.

As shown in FIGS. 28 to 29C as well, the anvil 8 has a bit insertion hole 315 being open at the front end along the axis. The bit insertion hole 315 has a regular hexagonal cross section. A bit sleeve 316 is externally mounted on the front end of the anvil 8 in a manner movable forward and backward. The anvil 8 has a pair of ball housings 317 inward from the bit sleeve 316. The ball housings 317 are elliptical and extend in the front-rear direction. The ball housings 317 are point symmetric with each other about the bit insertion hole 315. The ball housings 317 are tapered with the cross section decreasing radially inward. The pair of ball housings 317 house a pair of balls 318. The balls 318 are housed in the respective ball housings 317 in a manner movable radially and in the front-rear direction. Each ball 318 has a larger diameter than the radially inner opening of the ball housing 317. The ball 318 can protrude into the bit insertion hole 315 from the opening at a position radially inside. The anvil 8 has an annular groove 319 at the rear of the ball housings 317, as shown in FIG. 25 as well. Two front and rear O-rings 320 are externally received on the groove 319.

The bit sleeve 316 has an annular stopper 321 on its inner circumference. The stopper 321 at a position outward from the balls 318 locks the balls 318 at the position at which the balls 318 protrude from the opening of the ball housings 317. A conical spring 322 having a larger diameter toward the rear is externally mounted on the anvil 8 in front of the stopper 321. The front end of the conical spring 322 is in contact with a flat washer 324, which is positioned at the front end of the anvil 8 by the ring spring 323. The rear end of the conical spring 322 is in contact with the stopper 321. The bit sleeve 316 is thus urged backward by the conical spring 322. A circlip 237 engaged with the anvil 8 is located behind the bit sleeve 316. As shown in FIG. 10, the bit sleeve 316 is thus urged at a backward position at which the bit sleeve 316 is in contact with the circlip 237. At the backward position, the stopper 321 is outward from the balls 318.

With the bit sleeve 316 at the backward position, a bit B is placed into the bit insertion hole 315. As shown in FIG. 29A, the balls 318 coming into contact with the bit B move backward to behind the stopper 321 in the ball housings 317 against the urging force from the O-rings 320. The balls 318 then move backward to the rear portion of the ball housings 317. Thus, the bit B can be simply placed into the bit insertion hole 315 without the bit sleeve 316 sliding forward. The ball housings 317 are tapered radially inward. The balls 318 at the rear portion of the ball housings 317 after being in contact with the bit B then move away from the bit insertion hole 315 along the tapered portion. This reduces the load to insert a bit.

Figure 29B:
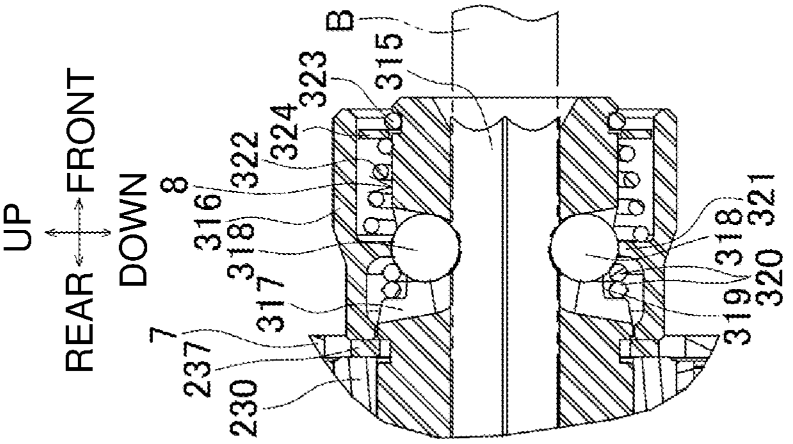
FIG. 29B is a diagram of the bit attachment with a bit attached.
Figure 29A:
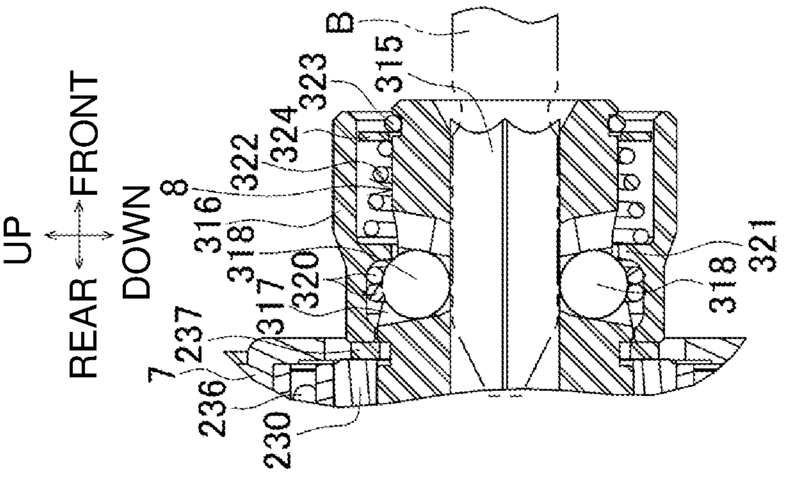
FIG. 29A is a diagram of a bit attachment with a bit being inserted.

When the bit is fully inserted, as shown in FIG. 29B, the balls 318 move inward from the stopper 321 under an urging force from the O-rings 320. Thus, the balls 318 return to the position protruding from the ball housings 317 to engage with the bit B, preventing the bit B from slipping off.

When the bit sleeve 316 is slid forward against the urging force from the conical spring 322 as shown in FIG. 29C, the stopper 321 releases the balls 318 to be movable. This allows removal of the bit B from the bit insertion hole 315. When the bit B is removed, the balls 318 return to the position protruding from the ball housings 317 under an urging force from the O-rings 320, or to the state in FIG. 29B.

In this example, the conical spring 322 urges the bit sleeve 316. The conical spring 322 with a long free length is less susceptible to budding. This can reduce attachment and detachment failure of the bit B, and also increase the urging force. The bit B is thus less likely to slip off under vibration.

Operational Modes

Figure 9B:
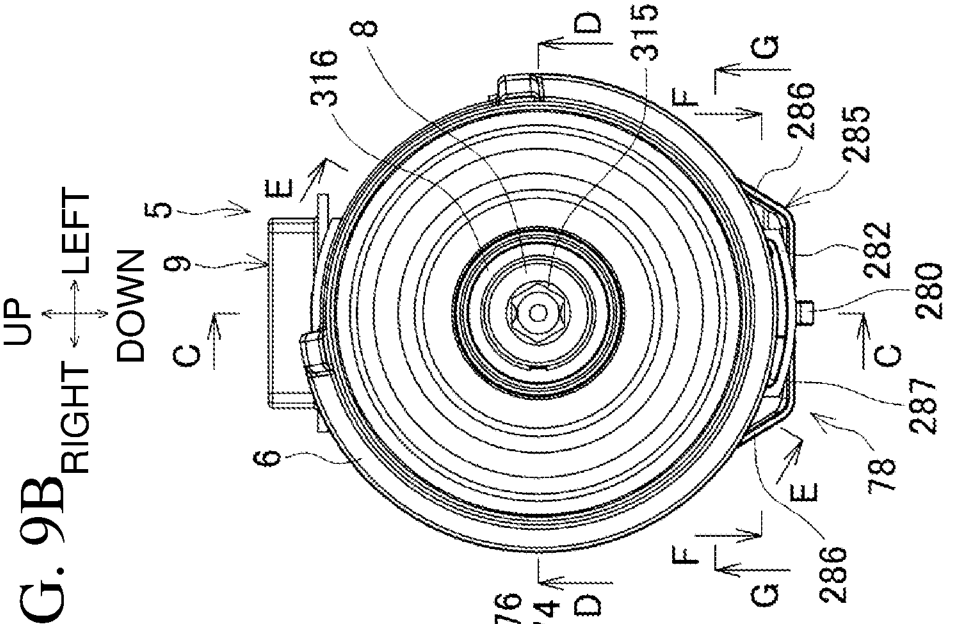
FIG. 9B is a front view of the actuator unit.
Figure 9A:
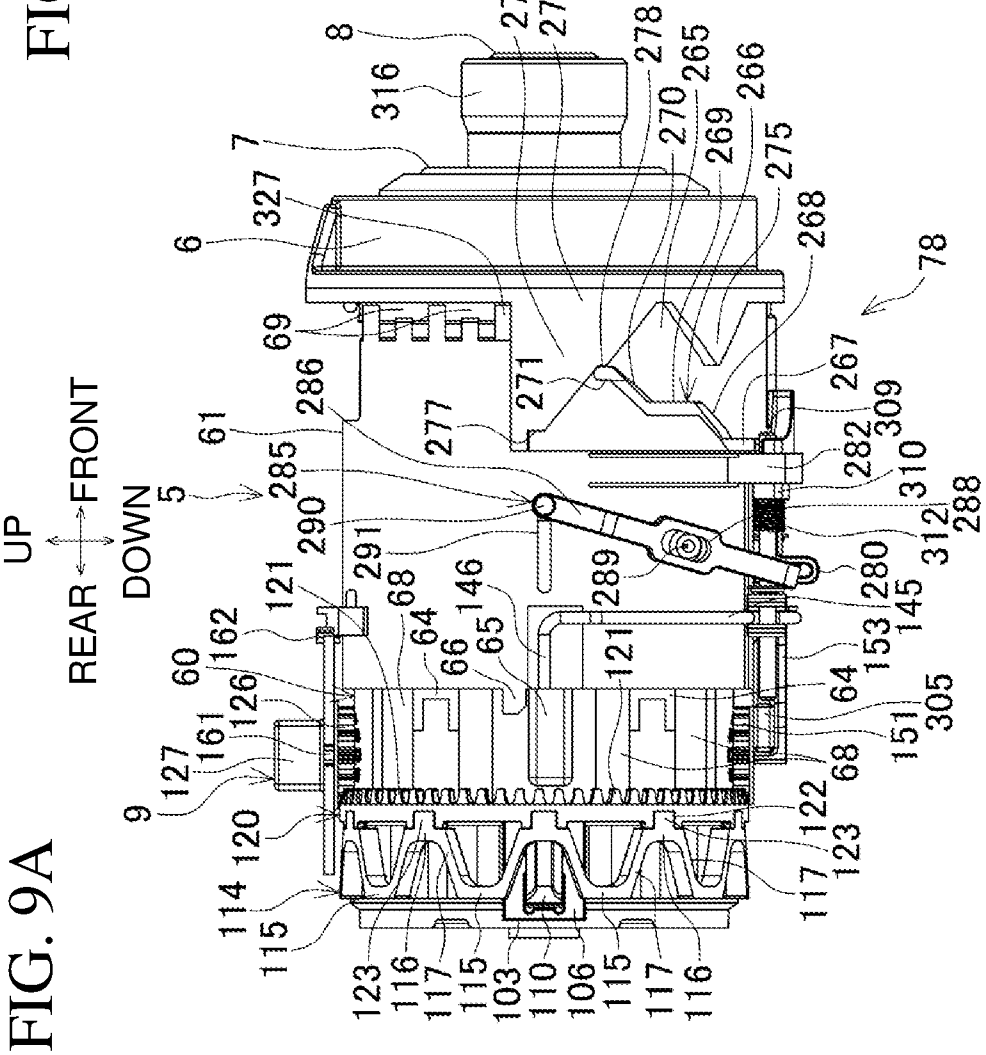
FIG. 9A is a side view of an actuator unit.

The switching of the operational modes performed by the linkage switcher 78 and the details of the operations will now be described. The front gear case 61 has front stopper ribs 327 protruding from its left and right side surfaces (FIGS. 9A, 13, and 23). The stopper ribs 327 restrict the left and right rotational positions of the guide plate 265 resulting from the rotational operation on the mode change ring 6.

1. Drill Mode

As shown in FIG. 19A, the mode change ring 6 is rotated to the rightmost position as viewed from the front to enable a drill mode.

In the drill mode, the guide plate 265 is also at the right rotational position. The first and second chevrons 275 and 276 in the thick part 274 are retracted from in front of the left and right rods 308 and 309 (FIGS. 19B and 19C).

Thus, the mode change lever 280 is at the backward position at which the guide projection 284 is in the first slit portion 267 of the guide slit 266. In this state, the connecting section 287 in the mode change shifter 285 at the backward position causes the left and right linkage sections 286 to swing about the respective support shafts 289 and the upper end engagement pins 290 to slide to the front ends of the respective guide holes 291.

Thus, the hammer sleeve 168 moves to the forward position, with the rear groove portion 211 and the middle groove portion 212 on each outer fitting groove 210 being outward from the corresponding retainer slit 201. The five connecting balls 216 are thus restricted from moving under any centrifugal force, restricting backward motion of the inner hammer 166 (FIGS. 19D and 19E).

The hanging pin 302 on the linkage bar 301 engages with the first end portion 298 of the guide end 297 of the linkage winder 295 and is permitted to move forward. This allows the speed switching holder 153 to move forward and backward and the speed switching gear 151 to rotate, thus allowing the selection from the first to fourth speeds with the speed switching dial 9.

In contrast, the cutouts 261 on the ridge 260 on the mode change ring 6 are circumferentially off the respective vibration switching plates 234. The vibration switching plates 234 thus move to the backward position (FIG. 19E).

In the drill mode, after the bit B is attached to the anvil 8, the trigger 18 is pressed to turn on the switch 17. The motor 4 is then powered to rotate the rotational shaft 53 together with the rotor 46.

The speed of the input from the input gear 74 is then reduced by the reducer 75 at a selected speed and transmitted to the spindle 165. The inner hammer 166 rotates together with the outer hammer 167, the hammer sleeve 168, and the spindle 165 to rotate the anvil 8 with the arms 172. The bit B can, for example, drill a workpiece.

The inner hammer 166 is restricted from moving backward. Thus, any increase in torque applied to the bit B and the anvil 8 causes no striking motion performed by the striker 76. The vibration switching plates 234 are at the backward position. The vibrator 77 causes no vibration in the anvil 8.

2. Vibration Drill Mode

As shown in FIG. 20A, the mode change ring 6 is rotated left by a predetermined angle as viewed from the front in the drill mode to enable a vibration drill mode.

In the vibration drill mode, the guide plate 265 is at a rightward rotational position. The first and second chevrons 275 and 276 in the thick part 274 are at positions to permit forward and backward motion of the left and right rods 308 and 309. The mode change lever 280 is at the backward position, with the guide projection 284 being at the end of the first slit portion 267. The hammer sleeve 168 is thus at the forward position to restrict backward motion of the inner hammer 166 (FIGS. 20B to 20D).

The hanging pin 302 on the linkage bar 301 remains engaged with the first end portion 298 of the guide end 297 of the linkage winder 295 and is permitted to move forward. This allows the speed switching holder 153 to move forward and backward and the speed switching gear 151 to rotate, thus allowing the selection from the first to fourth speeds with the speed switching dial 9.

In contrast, the cutouts 261 on the ridge 260 on the mode change ring 6 are forward from the tapered portions 254 of the vibration switching plates 234. The vibration switching plates 234 thus move forward to move the restriction ring 232 to the engagement position with the rear cam 231 (FIG. 20E).

In the vibration drill mode, after the bit B is attached to the anvil 8, the trigger 18 is pressed to turn on the switch 17. The motor 4 is then powered to rotate the rotational shaft 53 together with the rotor 46.

The speed of the input from the input gear 74 is then reduced by the reducer 75 at a selected speed and transmitted to the spindle 165. The inner hammer 166 rotates together with the outer hammer 167, the hammer sleeve 168, and the spindle 165 to rotate the anvil 8 with the arms 172. The bit B can, for example, drill a workpiece.

The rear cam 231 is restricted from rotating. Thus, as the bit B is pressed against a workpiece to move backward, the rotating front cam 230 engages with the rear cam 231. This causes the anvil 8 to vibrate in the axial direction.

The inner hammer 166 is restricted from moving backward. Thus, any increase in torque applied to the bit B and the anvil 8 causes no striking motion performed by the striker 76.

3. High Impact Mode

As shown in FIG. 21A, the mode change ring 6 is rotated left by a predetermined angle as viewed from the front in the vibration drill mode to enable a high impact mode.

In the high impact mode, the guide plate 265 also rotates left, moving the guide projection 284 on the mode change lever 280 relative to the third slit portion 269 through the second slit portion 268. This moves the mode change lever 280 forward to the middle position. The connecting section 287 in the mode change shifter 285 then moves forward, causing the left and right linkage sections 286 to swing about the respective support shafts 289. This moves the upper end engagement pins 290 backward to the middle position in the respective guide holes 291 and slides the hammer sleeve 168 to the middle position (FIGS. 21B to 21E). At the middle position, the middle groove portions 212 of the outer fitting grooves 210 are located outward from the respective retainer slits 201.

The cutouts 261 on the ridge 260 on the mode change ring 6 are circumferentially off the respective vibration switching plates 234. The vibration switching plates 234 thus move to the backward position (FIG. 21E).

In contrast, the guide plate 265 moves the first chevron 275 in the thick part 274 to a position in front of the left rod 308. The guide plate 265 also moves the front flat section 278 in the second chevron 276 to a position in front of the right rod 309. The left and right rods 308 and 309 are thus restricted from moving forward.

The linkage winder 295 also rotates left to move the hanging pin 302 on the linkage bar 301 relative to the third end portion 300 from the first end portion 298 through the second end portion 299. The linkage bar 301 thus slides to the forward position and moves the speed switching holder 153 and the linkage cam 305 to the forward positions.

In this state, as the linkage cam 305 moves forward, its oblique side comes in contact with the left rod 308, which is restricted from moving forward. Thus, the linkage cam 305 slides rightward as guided by the oblique side and rotates the speed switching gear 151 to the position corresponding to the third speed with the eccentric pin 152. The right rod 309 does not interfere with the sliding of the linkage cam 305. In this manner, the linkage cam 305 is restricted from sliding backward and leftward. This restricts rotation of the speed switching gear 151 and the speed switching dial 9, thus fixing the third speed in the reducer 75.

In the high impact mode, after the bit B is attached to the anvil 8, the trigger 18 is pressed to turn on the switch 17. The motor 4 is then powered to rotate the rotational shaft 53 together with the rotor 46.

The speed of the input from the input gear 74 is then reduced by the reducer 75 at the third speed and transmitted to the spindle 165. The inner hammer 166 rotates together with the outer hammer 167, the hammer sleeve 168, and the spindle 165 to rotate the anvil 8 with the arms 172. This allows, for example, tightening a screw with the bit B. In this state, outer three of the five connecting balls 216, including the rearmost connecting ball, move radially outside under a centrifugal force. Thus, the outer hammer 167 and the hammer sleeve 168 rotate together with the inner hammer 166.

Figure 30B:
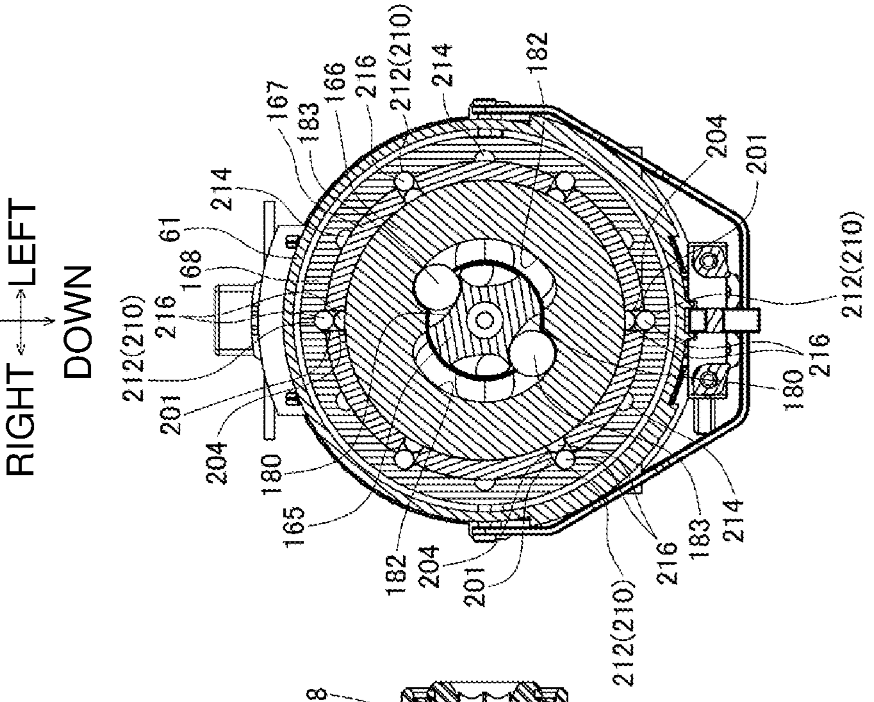
FIG. 30B is a sectional view taken along line X-X in FIG. 30A.
Figure 30A:
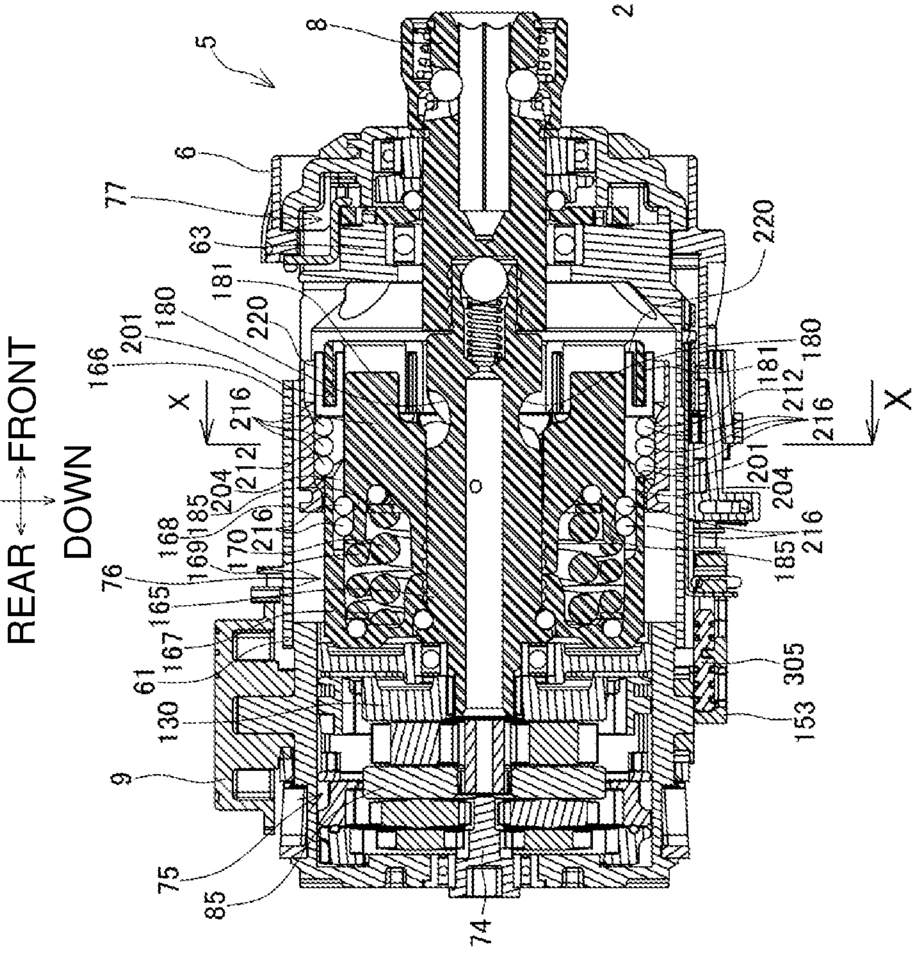
FIG. 30A is a central longitudinal sectional view of the actuator unit showing an inner hammer retracted to a maximum stroke position in the high impact mode.

As the screw is tightened to increase the torque of the anvil 8, the inner hammer 166 rotates and moves backward against an urging force from the outer and inner coil springs 169 and 170 while rolling the cam balls 183 along the inner cam grooves 180 on the spindle 165, as shown in FIGS. 30A and 30B. At this time, two connecting balls 216 in each inner fitting groove 185 move backward in the corresponding support groove 204 on the outer hammer 167. The three radially outward connecting balls 216 are together fitted between the corresponding retainer slit 201 in the outer hammer 167 and the corresponding middle groove portion 212 on the hammer sleeve 168. The outer hammer 167 and the hammer sleeve 168 thus rotate following the rotation of the inner hammer 166 along the inner cam grooves 180.

After the tabs 181 are disengaged from the arms 172, the inner hammer 166 is guided by the inner cam grooves 180 under an urging force from the outer and inner coil springs 169 and 170 and rotates with the outer hammer 167 and the hammer sleeve 168 while moving forward. This engages the tabs 181 again with the arms 172, thus causing a rotational striking force (impact) in the anvil 8. This process is repeated to further tighten the screw. The impact is produced by adding the mass of the outer hammer 167 and the hammer sleeve 168 to the inner hammer 166, thus increasing the total inertia force (about 3.7 times greater than the inertia force for the low impact mode). The anvil 8 is then rotated at the third speed and thus reduces camming out of the screw under any greater torque.

The outer and inner coil springs 169 and 170 used in this example each have a short free length and the same number of turns. This increases the elastic energy of the inner hammer 166 at the backmost position. In contrast, the urging force for the inner hammer 166 at the forward position is reduced. The two outer and inner coil springs 169 and 170 thus involve a lower mounting load. This also facilitates backward motion of the inner hammer 166, causing the tabs 181 on the inner hammer 166 to move beyond the arms 172 of the anvil 8 earlier.

4. Low Impact Mode

As shown in FIG. 22A, the mode change ring 6 is rotated left by a predetermined angle as viewed from the front in the high impact mode to enable a low impact mode. In the low impact mode, the guide plate 265 also rotates left, moving the guide projection 284 on the mode change lever 280 relative to the fifth slit portion 271 through the fourth slit portion 270. This moves the mode change lever 280 to the forward position. The connecting section 287 in the mode change shifter 285 then moves forward, causing the left and right linkage sections 286 to swing about the respective support shafts 289. This moves the upper end engagement pins 290 to the backward position in the respective guide holes 291 and slides the hammer sleeve 168 to the backward position (FIGS. 22B to 22E).

The cutouts 261 on the ridge 260 on the mode change ring 6 are circumferentially off the respective vibration switching plates 234. The vibration switching plates 234 thus move to the backward position (FIG. 22E).

In contrast, the guide plate 265 moves the first chevron 275 in the thick part 274 to the left of the left rod 308 from in front of the left rod 308. The guide plate 265 also moves the rear flat section 277 in the second chevron 276 to a position in front of the right rod 309. This permits forward motion of the left rod 308 while causing the right rod 309 to come in contact with the slope on the second chevron 276 to move backward.

Although the linkage winder 295 also rotates left, the hanging pin 302 on the linkage bar 301 remains at the third end portion 300. The linkage bar 301 and the speed switching holder 153 thus remain at the forward positions.

However, for the linkage cam 305, the right rod 309 pressed backward by the second chevron 276 comes in contact with the oblique side. Thus, the linkage cam 305 slides leftward as guided by the oblique side and rotates the speed switching gear 151 to the position corresponding to the fourth speed with the eccentric pin 152. The left rod 308 comes in contact with the oblique side as the linkage cam 305 slides. The left rod 308 thus moves forward between the first chevron 275 and the second chevron 276. In this manner, the linkage cam 305 is restricted from sliding backward and rightward. This restricts rotation of the speed switching gear 151 and the speed switching dial 9, thus fixing the fourth speed in the reducer 75.

In the low impact mode, after the bit B is attached to the anvil 8, the trigger 18 is pressed to turn on the switch 17. The motor 4 is then powered to rotate the rotational shaft 53 together with the rotor 46.

The speed of the input from the input gear 74 is then reduced by the reducer 75 at the fourth speed and transmitted to the spindle 165. The inner hammer 166 rotates together with the spindle 165 to rotate the anvil 8 with the arms 172. This allows, for example, tightening a screw with the bit B.

When the hammer sleeve 168 is at the backward position, the deepest front groove portion 213 of each outer fitting groove 210 is outward from the corresponding retainer slit 201 in the outer hammer 167. Thus, all the five connecting balls 216 move radially outward under a centrifugal force. In the inner hammer 166, inner two of the connecting balls 216 are disengaged from the corresponding inner fitting groove 185 radially outward. Thus, the inner hammer 166 alone rotates together with the spindle 165.

As the screw is tightened and increases the torque of the anvil 8, the inner hammer 166 rotates and moves backward against an urging force from the outer and inner coil springs 169 and 170 while rolling the cam balls 183 along the inner cam grooves 180 on the spindle 165. After the tabs 181 are disengaged from the arms 172, the inner hammer 166 is guided by the inner cam grooves 180 under an urging force from the outer and inner coil springs 169 and 170 and rotates while moving forward. This engages the tabs 181 again with the arms 172, thus causing a rotational striking force (impact) in the anvil 8. This process is repeated to further tighten the screw. The impact in this mode is generated by the inner hammer 166 alone at the fourth speed, with lower torque at any high speed. This reduces camming out and overtightening of the screw.

5. Screwdriver (Clutch) Mode

A screwdriver mode can be selected by operating the display 27 in the drill mode or the vibration drill mode.

In the screwdriver mode, the controller 25 monitors the output torque (motor current and rotational speed) of the motor 4. In response to an output torque reaching or exceeding a predetermined value, the controller 25 stops the rotation of the motor 4. The predetermined output torque can be changed by selecting the number of gears on the display 27. In the screwdriver mode, the reducer 75 allows selection from first to fourth speeds with the speed switching dial 9.

In each operational mode, the fan 35 rotates together with the rotation of the rotational shaft 53, thus drawing in outside air through the inlets 16. The air passes through the body 12 to cool the motor 4. The air then flows radially outward from the fan 35 and is discharged outside through the outlets 33. At the upper two outlets 33A, the inner edges guide the air upward to discharge the air upward. This reduces entry of foreign objects from above through the outlets 33A.

In response to the switch 17 being turned on, the lamp 21 turns on to illuminate ahead of the bit B. This facilitates work in dark places. The lamp 21 may be turned on and off as appropriate with a touch on the display 27.

Advantageous Effects of Selecting from Variable Speeds to Match Operational Modes The impact driver 1 according to the above embodiment includes the motor 4, the reducer 75 that reduces the rotation from the motor 4, and the striker 76 and the vibrator 77 (a plurality of actuators) to be actuated by the rotation reduced by the reducer 75. The impact driver 1 includes a linkage switcher 78 (switcher) that selects, from the striker 76 and the vibrator 77, a specific actuator to be actuated in the drill mode, vibration drill mode, high impact mode, or low impact mode (predetermined operational mode). The reducer 75 selects from four variable speeds.

Upon selecting the striker 76 (specific actuator), the linkage switcher 78 causes the reducer 75 to cooperate with the striker 76 and actuates the reducer 75 at the third speed and fourth speed (predetermined variable speed) corresponding respectively to the high impact mode and the low impact mode of the striker 76.

This allows the reducer 75 having four variable speeds to appropriately select from the variable speeds to match the multiple operational modes, including the drill mode, the vibration drill mode, the high impact mode, and the low impact mode.

The reducer 75 allows selection from the four variable speeds. The mechanical reducer 75 thus provides a wider range of selection with improved usability. The reducer 75 also allows selection from variable speeds appropriate for multiple operational modes.

The actuator includes the striker 76 that strikes the anvil 8 in the rotation direction. The actuator to be actuated at a specific speed is the striker 76 operable in the high impact mode or low impact mode as the operational mode. The striker 76 can thus be used at a speed appropriate to the striking force.

The impact mode is switchable between the high impact mode to apply a greater striking force to the anvil 8 and the low impact mode to apply a less striking force than in the high impact mode. The linkage switcher 78 causes the reducer 75 to cooperate with the striker 76 at a higher speed in the low impact mode (fourth speed in this example) than in the high impact mode (third speed in this example). Thus, the two impact modes can each be used at an appropriate speed. The high impact mode is expected to reduce camming out of screws and increase the torque, whereas the low impact mode allows high work speed with less breaking off of the screw head and overtightening of screws.

The linkage switcher 78 switches an operational mode to the drill mode in which the striker 76 does not strike the anvil 8. In the drill mode, the reducer 75 allows selection from the four variable speeds. The drill mode thus has improved usability.

The actuator includes the vibrator 77 that vibrates the anvil 8 in the axial direction. The linkage switcher 78 switches an operational mode to the vibration drill mode in which the striker 76 does not strike the anvil 8 and the vibrator 77 vibrates the anvil 8. In the vibration drill mode, the reducer 75 allows selection from the four variable speeds. The vibration drill mode thus has improved usability.

The reducer 75 includes the speed switching holder 153 and the linkage cam 305 (position changing member) that change their positions for each of the variable speeds. The linkage switcher 78 includes the mode change ring 6 (mode switching member) to allow a selection operation from the actuators. The guide plate 265, the linkage winder 295, the linkage bar 301, the left rod 308, and the right rod 309 (linkage member) are located between the speed switching holder 153 or the linkage cam 305 and the mode change ring 6 to forcibly move the speed switching holder 153 and the linkage cam 305 to the position corresponding to a predetermined variable speed (in this example, the third speed and the fourth speed) in response to an operation on the mode change ring 6.

Thus, the speed appropriate for the operational mode is automatically selected in response to the rotation operation on the mode change ring 6.

The mode change ring 6 is rotatable to select from the striker 76 and the vibrator 77. The mode change ring 6 thus facilitates switching between operational modes.

The reducer 75 includes three gear stages aligned in the axial direction and housed in the cylindrical rear gear case 60 (case). The three gear stages include the internal gears 81A to 81C, the planetary gears 80A to 80C that revolve within the internal gears 81A to 81C, and the rear carrier 85 and the front carrier 130 supporting the planetary gears 80A to 80C. Thus, the reducer allows easy setting of variable speeds.

The reducer 75 includes two rotatable internal gears 81A and 81B adjacent to each other in the axial direction and having different reduction ratios from each other. The reducer 75 also includes the speed switching plates 110 (engagement member) each engageable selectively with one of the internal gears 81A and 81B to restrict the rotation of the selected one of the internal gears 81A and 81B. The other internal gear 81C is rotatable and slidable in the axial direction between the backward position (first slide position) and the forward position (second slide position). At the backward position, the internal gear 81C is restricted from rotating in the rear gear case 60 and revolves the planetary gears 80C. At the forward position, the internal gear 81C is not restricted from rotating in the rear gear case 60 and engages with both the planetary gears 80C and the front carrier 130. Restricting the rotation of one of the two internal gears 81A and 81B performed by the speed switching plates 110 is combined with setting the slide position of the internal gear 81C to allow selection from the four variable speeds.

The mechanical reducer 75 thus provides the four variable speeds.

Each speed switching plate 110 has a middle portion being supported and the two ends being swingable. Each speed switching plate 110 is switchable between the backward-tilting posture (first swing posture) and the forward-tilting posture (second swing posture). The backward-tilting posture is a posture in which a first end of the two ends is engaged with the outer circumference of the internal gear 81A and a second end of the two ends is not engaged with the outer circumference of the internal gear 81B. The forward-tilting posture is a posture in which the first end is not engaged with the outer circumference of the internal gear 81A and the second end is engaged with the outer circumference of the internal gear 81B. Thus, the swing of one pair of speed switching plates 110 easily restrict and release rotation of the two internal gears 81A and 81B.

The power tool includes the rotatable speed switching ring 114 (annular member) outward from the speed switching plates 110 in the rear gear case 60. The speed switching ring 114 includes the rear pressing portions 115 (first pressing portion) that press the first end of each speed switching plate 110 to switch the speed switching plate 110 to the backward-tilting posture, and the front pressing portions 116 (second pressing portion) that press the second end to switch the speed switching plate 110 to the forward-tilting posture. The rear pressing portions 115 and the front pressing portions 116 alternate with each other at predetermined angles in the rotation direction. The speed switching ring 114 is rotated by a rotational operation on the speed switching dial 9 (rotational operation member) on the rear gear case 60 to selectively restrict rotation of the internal gears 81A and 81B.

Thus, the posture of each speed switching plate 110 can be switched easily and in a space-saving manner using the speed switching ring 114 and the speed switching dial 9.

The speed switching ring 114 includes multiple teeth 121 circumferentially. The speed switching dial 9 includes the upper gear 126 (gear) that meshes with the teeth 121. The speed switching ring 114 is rotatable by a rotational operation on the speed switching dial 9. Thus, rotating the speed switching dial 9 switches the posture of each speed switching plate 110.

The impact driver 1 according to above embodiment includes the motor 4, the reducer 75 drivable by the motor 4 to select from predetermined variable speeds, an inner hammer 166 (hammer) to be actuated by the reducer 75 to perform striking motion, and a linkage switcher 78 (switcher) that switches the speed of the reducer 75 and switches the striking motion of the inner hammer 166 between being enabled and being disabled. The linkage switcher 78 limits selection from variable speeds in the reducer 75 upon enabling the striking motion of the inner hammer 166 and allows selection from variable speeds in the reducer 75 upon disabling the striking motion of the inner hammer 166.

The impact driver 1 according to the above embodiment includes the motor 4 and the reducer 75 drivable by the motor 4 to select from predetermined variable speeds. The impact driver 1 is drivable in the drill mode, vibration drill mode, screwdriver mode, and impact mode. In the drill mode, vibration drill mode, and screwdriver mode of the impact driver 1, the reducer 75 allows selection from variable speeds. In the impact mode (high impact mode and low impact mode), the reducer 75 limits selection from variable speeds.

Thus, the impact mode (the high impact mode and the low impact mode) can be used at an appropriate variable speed constantly.

Selecting the variable speeds to match operational modes may be modified in the manner described below.

The reducer may have three speeds or five or more speeds, rather than four speeds.

In the above embodiment, the third speed is selected for the high impact mode, and the fourth speed is selected for the low impact mode. The speeds may be selected to match the modes in different manners. For example, the same speed may be selected for both the high impact mode and the low impact mode.

The impact mode may include any modes other than the two high and low impact modes. The striker may include a single hammer to allow selection of a single impact mode alone. The impact mode may include three modes including a medium impact mode in addition to the low impact mode and the high impact mode.

The operational modes other than the impact mode are not limited to the examples in the above embodiments. One or two of the drill mode, vibration drill mode, and screwdriver mode may be eliminated.

In the above embodiment, the predetermined variable speeds are selected for the impact mode alone. The predetermined variable speeds may be selected for operational modes other than the impact mode.

The present disclosure is also applicable to impact tools that allow selection from multiple impact modes alone. The present disclosure is also applicable to power tools without an impact mode.

The speed switching holder and the linkage cam may have any shapes other than described above. The position changing member may be replaced by any components other than the speed switching holder and the linkage cam.

The linkage member may be changed to any members other than those in the above embodiment as appropriate. For example, the linkage bar may be integral with the speed switching holder.

The position changing member and the linkage member may be located on the left or right of the actuator unit, rather than on the bottom. The position changing member and the linkage member may be housed in the case.

The motor is not limited to a brushless motor. The power supply may be alternating current (AC), instead of the battery pack.

The impact driver according to the above embodiment is a mechanical four-mode impact driver. The present disclosure is not limited to such an impact driver. For example, the present disclosure is also applicable to impact drivers incorporating a mechanical clutch rather than an electronic clutch, impact tools such as angle impact drivers, and power tools such as driver drills.

Advantageous Effect of Two Internal Gears and Engagement Member

The impact driver 1 according to the above embodiment includes the motor 4, the reducer 75 that reduces the rotation from the motor 4, and the striker 76 and the vibrator 77 to be actuated by the rotation reduced by the reducer 75. The reducer 75 includes three gear stages aligned in the axial direction. The three gear stages include the internal gears 81A to 81C, the planetary gears 80A to 80C that revolve within the internal gears 81A to 81C, and the rear carrier 85 and the front carrier 130 supporting the planetary gears 80A to 80C.

The reducer 75 includes the rotatable internal gear 81A in a preceding stage (preceding internal gear) and the internal gear 81B in a succeeding stage succeeding the internal gear 81A (succeeding internal gear) rotatable at a reduction ratio different from the reduction ratio of the internal gear 81A. The reducer 75 also includes the speed switching plates 110 (engagement member) radially outward from the internal gears 81A and 81B. Each speed switching plate 110 is switchable between the backward-tilting posture (first position) and the forward-tilting posture (second position). The backward-tilting posture is a posture in which the speed switching plate 110 is engaged with the internal gear 81A to restrict the rotation of the internal gear 81A. The forward-tilting posture is a posture in which the speed switching plate 110 is engaged with the internal gear 81B to restrict the rotation of the internal gear 81B. The reducer 75 includes the speed switching ring 114 and the speed switching dial 9 (operation unit) operable to switch the speed switching plates 110 selectively to the backward-tilting posture or the forward-tilting posture.

The reducer 75 with the structure has an axially small size and allows smooth and stable switching between variable speeds.

Each speed switching plate 110 has its middle portion being supported and the two ends being swingable. In the backward-tilting posture, a first end of the two ends is engaged with the outer circumference of the internal gear 81A. In the forward-tilting posture, a second end of the two ends is engaged with the outer circumference of the internal gear 81B. Thus, one pair of speed switching plates 110 can restrict and release rotation of the two internal gears 81A and 81B in a space-saving and rational manner.

The reducer 75 is housed in the cylindrical rear gear case 60. The operation unit includes the speed switching ring 114 and the speed switching dial 9. Thus, the speed switching plates 110 are easily switchable between the postures with the speed switching ring 114 in a space-saving manner. In particular, the speed switching ring 114 includes the multiple teeth 121 continuously in the circumferential direction. The speed switching dial 9 integrally includes the upper gear 126. Thus, rotating the speed switching dial 9 easily rotates the speed switching ring 114.

The speed switching ring 114 integrally includes the face gear ring 120 (gear ring) including the teeth 121. Thus, the speed switching ring 114 can easily include the teeth 121.

The speed switching ring 114 is a frame meandering circumferentially with the rear pressing portions 115 and the front pressing portions 116 protruding in the axial direction in a staggered manner. The structure of the speed switching ring 114 is thus simple.

The multiple speed switching plates 110 reliably restrict rotation of the internal gears 81A and 81B.

The speed switching plates 110 are point symmetric with each other about the axis of the internal gears 81A and 81B. This allows rotation restriction of the internal gears 81A and 81B without tilt of the internal gears 81A and 81B from the axis.

The internal gear 81A includes the multiple rear engagement ribs 91 (engagement ribs) extending in the axial direction on its outer circumference at circumferentially predetermined intervals. The internal gear 81B includes the multiple front engagement ribs 95 (engagement ribs) extending in the axial direction on its outer circumference at circumferentially predetermined intervals. Each speed switching plate 110 has the rear engagement portion 112 on one end to engage with the rear engagement ribs 91 and the front engagement portion 113 on the other end to engage with the front engagement ribs 95. This structure reliably restricts and releases rotation of the internal gears 81A and 81B.

The rear engagement portion 112 and the front engagement portion 113 are curled and easily engageable with the rear engagement ribs 91 and the front engagement ribs 95.

The internal gears 81A and 81B are adjacent to each other in the axial direction with the O-ring 93 (seal) located between their facing surfaces. The internal gear 81A includes the rear flange 90 protruding radially inward at its end opposite to the facing surface, and the internal gear 81B includes the front flange 94 protruding radially inward at its end opposite to the facing surface. This defines the retaining space S between the internal gears 81A and 81B to retain the grease radially inside the internal gears 81A and 81B, reducing dry-out of grease.

The impact driver 1 according to the above embodiment includes the motor 4, the rear carrier 85 rotatable by the motor 4, the pins 86 retained by the rear carrier 85, the planetary gears 80A (first planetary gear) retained by the pins 86 and each including a first number of teeth, the planetary gears 80B (second planetary gear) retained by the pins 86 and each including a second number of teeth different from the first number of teeth, the internal gear 81A (first internal gear) meshing with the planetary gears 80A, the internal gear 81B (second internal gear) meshing with the planetary gears 80B, and the speed switching plates 110 (locking member) that disable rotation of either the internal gear 81A or the internal gear 81B.

In this structure, one pair of speed switching plates 110 can selectively disable the rotation of the two internal gears 81A and 81B. The reducer 75 with the structure thus has an axially small size and allows smooth and stable switching between variable speeds.

The two internal gears and the engagement member may be modified in the manner described below.

The speed switching plates (engagement member) may restrict rotation of any two internal gears in preceding and succeeding stages other than the internal gears in the first and second stages. For example, the engagement member may restrict rotation of the internal gears in the second and third stages. The reducer may have variable speeds other than four. Multiple sets of engagement member and two internal gears may be used.

The number of engagement members is not limited to two. For example, three or more engagement members may be located circumferentially along the internal gears to restrict rotation.

The engagement member may be shaped in any manner different from the shape of the speed switching plates in the above embodiment. The front and rear engagement portions may not be curled. For example, the front and rear engagement portions may simply be bent ends. Separate parts may be attached to be the front and rear engagement portions. For example, the engagement member may be elastic, and the front and rear engagement portions may be pins.

The engagement member may be supported on its middle portion by any structure other than the speed switching supporter in the above embodiment. The engagement member may be supported by a partition extending directly on the case. A pin may support the middle portion of the engagement member.

The annular member may be other than the speed switching ring in the above embodiment. The annular member may be a strip, rather than the frame meandering circumferentially. Thus, the teeth may be directly located on the annular member, instead of using a separate gear ring.

Multiple seals may be located between two internal gears for speed change. Any seal other than the O-ring may be used.

The two internal gears may be sealed together at their facing surfaces without a seal. For example, one of the facing surfaces has annular ridge to be fitted in a groove on the other of the facing surfaces.

The two internal gears for speed change may not be axially adjacent to each other. In this case, the seal between the facing surfaces of the internal gears may be eliminated. The flanges may also be eliminated.

The motor is not limited to a brushless motor. The power supply may be AC, instead of the battery pack.

Although the mechanical four-mode impact driver is described in the above embodiment, the present disclosure is applicable to any power tool, rather than impact drivers, that includes a reducer using planetary gears and internal gears, such as impact tools, driver drills, and screwdrivers.

Advantageous Effects of Lever Member

The impact driver 1 according to the above embodiment includes the mode change ring 6 (operation member), the linkage sections 286 (lever member) in the mode change shifter 285 that swing about the respective support shafts 289 in response to an operation on the mode change ring 6, and the hammer sleeve 168 (switching member) linked with a swing of the linkage sections 286 to move linearly. The linkage sections 286 are swingable with the respective support shafts 289 placed through the linkage sections 286. The linkage sections 286 each have the elongated hole 288 (long hole) through which the corresponding support shaft 289 is placed. The elongated hole 288 extends along the linkage section 286. This structure allows the axis of the hammer sleeve 168 to be parallel to the movement paths of the ends of the linkage sections 286, which are swingable about the respective support shafts 289. This structure reduces the likelihood of slipping of the linkage sections 286 off the hammer sleeve 168 or failure in switching between the operational modes for any longer stroke of the hammer sleeve 168. In other words, the operational modes can be switched smoothly. The linkage sections 286 can also be joined easily.

The hammer sleeve 168 is inside the front gear case 61. The mode change ring 6 and the linkage sections 286 are external to the front gear case 61. The support shafts 289 protrude from the outer surface of the front gear case 61. Thus, the hammer sleeve 168 can be smoothly moved linearly through the front gear case 61. The mode change shifter 285 can also be easily joined outside the front gear case 61.

The linkage sections 286 and the hammer sleeve 168 are linked with each other with the engagement pins 290 on the respective ends of the linkage sections 286 engaged with the hammer sleeve 168. The swing of the linkage sections 286 is thus converted to the linear motion of the hammer sleeve 168.

Each engagement pin 290 is engaged with the hammer sleeve 168 through the corresponding linear guide hole 291 formed in the front gear case 61 in the direction in which the hammer sleeve 168 moves linearly. This structure guides the engagement pins 290 to move along the axis of the hammer sleeve 168.

The front gear case 61 houses the striker 76 that includes the spindle 165 and the inner hammer 166 (hammer) externally mounted on the spindle 165. The switching member includes the hammer sleeve 168 (sleeve member) externally mounted on the inner hammer 166 to be movable in the axial direction. The striker 76 can thus smoothly switch between the impact modes.

The hammer sleeve 168 has the annular groove 215 on its outer circumference. The annular groove 215 is engaged with the engagement pins 290. Thus, the hammer sleeve 168 can be smoothly moved linearly.

The connecting section 287 connects the pair of linkage sections 286 to each other at first ends of the pair of linkage sections 286. The connecting section 287 swings in response to an operation on the mode change ring 6. The engagement pin 290 on a second end of each linkage section 286 is engaged with the annular groove 215. Thus, the hammer sleeve 168 can be reliably moved linearly.

The engagement pins 290 are at point symmetric with each other about the axis of the hammer sleeve 168. Thus, the hammer sleeve 168 is less likely to tilt.

The mode change ring 6 switches an operational mode. Thus, the hammer sleeve 168 moves linearly in response to switching the operational mode.

The mode change ring 6 switches the operational mode in response to a rotational operation. Thus, the operational mode can be switched easily.

The impact driver 1 according to the above embodiment includes the motor 4, the anvil 8 rotatable by the motor 4, the inner hammer 166 that strikes the anvil 8 in the rotation direction, and the hammer sleeve 168 externally mounted on the inner hammer 166 to switch an operational mode. The impact driver 1 also includes the annular groove 215 on the outer circumference of the hammer sleeve 168, the engagement pins 290 (engagement part) engaged with the annular groove 215, and the linkage sections 286 that move the engagement pins 290 in the axial direction of the hammer sleeve 168.

This structure also reduces the likelihood of slipping of the linkage sections 286 off the hammer sleeve 168 or failure in switching between the operational modes. The operational mode can be thus switched smoothly. The linkage sections 286 can also be joined easily.

The lever member may be modified in the manner described below.

The long hole in each linkage section may be elliptical or square, rather than being elongated.

The engagement pins may be integral with the linkage sections.

The two left and right linkage sections may swing independently of each other without being connected to each other by the connecting section.

The linkage sections may be housed in the case.

The lever member may be used to switch the operational mode other than the impact mode. Thus, the switching member may be, for example, the internal gears for speed change included in the reducer.

In the above embodiment, the gear case has the support shafts, and the linkage sections have the long holes. Conversely, the gear case may have the long holes, and the linkage sections may have the support shafts. In other words, the linkage sections with the support shafts and the gear case with the long holes can also move the switching member such as the hammer sleeve or the internal gear in the axial direction alone.

The motor is not limited to a brushless motor. The power supply may be AC, instead of the battery pack.

The present disclosure is applicable to power tools other than impact drivers.

The present disclosure is also applicable to work tools powered by air or engine, in addition to power tools.

Advantageous Effect of Overlap between Planetary Gears

The impact driver 1 according to the above embodiment includes the motor 4, the reducer 75 that reduces the rotation from the motor 4, and the striker 76 and the vibrator 77 to be actuated by the rotation reduced by the reducer 75. The reducer 75 includes three gear stages aligned in the axial direction. The three gear stages include the internal gears 81A to 81C, the planetary gears 80A to 80C that revolve within the internal gears 81A to 81C, and the rear carrier 85 and the front carrier 130 supporting the planetary gears 80A to 80C with the pins 86 and 131. Each planetary gear 80A in the preceding stage and the corresponding planetary gear 80B in the succeeding stage adjacent to each other in the axial direction are supported by the corresponding single pin 86 in a manner radially overlapping each other.

The reducer 75 with this structure has an axially small size and is highly durable.

The preceding planetary gears 80A have the gear sections 83 adjacent to the succeeding planetary gears 80B and the bearing sections 84 extending radially inside portion of the respective planetary gears 80B. The planetary gears 80B are externally mounted on the respective bearing sections 84 in an overlapping manner. Thus, the planetary gears 80A and the planetary gears 80B can overlap each other to reduce the size. The planetary gears 80B are not in contact with the pins 86. Thus, the planetary gears 80B cause less mechanical loss from frictional resistance in use.

The bearings 87 are located between the respective bearing sections 84 and pins 86. Thus, a single bearing 87 can support the two planetary gears 80A and 80B.

The bearings 87 are needle bearings. This allows a radially small design. The needle bearings can provide lubrication appropriately for any grease drying.

The preceding internal gear 81A and the succeeding rear internal gear 81B are rotatable. The internal gear 81A and the internal gear 81B are selectively restricted from rotating by the speed switching plates 110, the speed switching ring 114, and the speed switching dial 9 (rotation restrictor). Thus, switching the rotation restricting between the two internal gears 81A and 81B easily allows two variable speeds.

The overlap between the planetary gears may be modified in the manner described below.

Any planetary gears other than in the first and second stages may overlap each other. For example, the planetary gears in the second and third stages may overlap each other. The reducer may have variable speeds other than four.

In the above embodiment, the preceding planetary gears have the bearing sections, and the succeeding planetary gears are externally mounted on the respective bearing sections. Conversely, the succeeding planetary gears may have the bearing sections, and the preceding stage planetary gears may be externally mounted on the respective bearing sections. More specifically, the succeeding planetary gears may be supported by the respective pins to form bearing sections that extend to the preceding stage, and the preceding stage planetary gears may be externally mounted on the respective bearing sections.

The bearings between the bearing sections and the pins may be other than needle bearings. The bearings may be eliminated.

In the above embodiment, the planetary gears in the second stage are externally mounted on the respective bearing sections in the first stage in an overlapping manner. The planetary gears in the third or subsequent stages may also be externally mounted on the respective bearing sections. In other words, planetary gears in three or more stages overlap one another in one embodiment of the present disclosure.

The motor is not limited to a brushless motor. The power supply may be AC, instead of the battery pack.

Although the mechanical four-mode impact driver is described in the above embodiment, the present disclosure is applicable to any power tool, rather than impact drivers, that includes a reducer using planetary gears and internal gears, such as impact tools, driver drills, and screwdrivers.

Nailing Bit

Figure 31A:
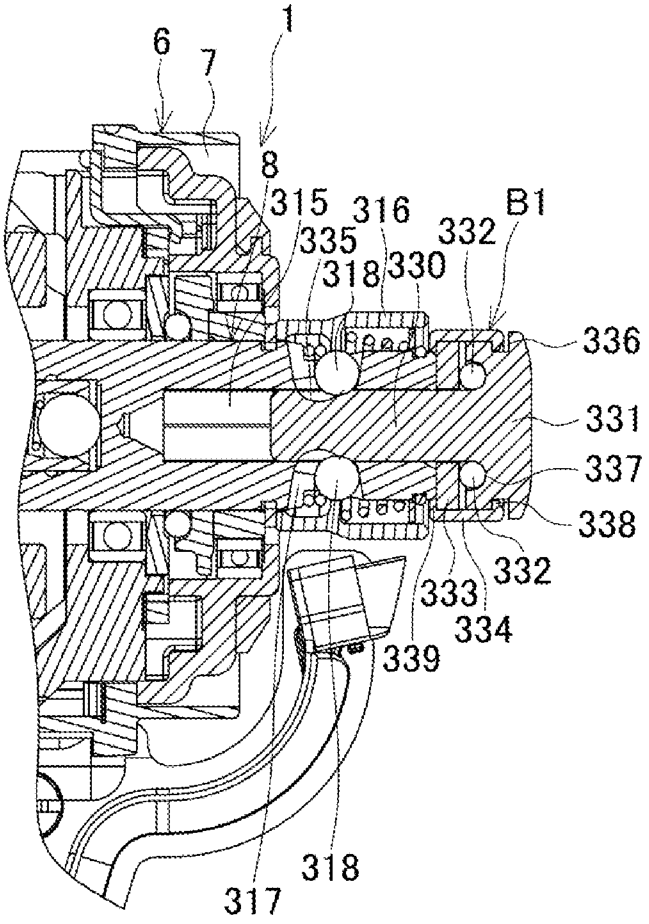
FIG. 31A is a longitudinal sectional view of an anvil to which a nailing bit is attached.
Figure 31B:
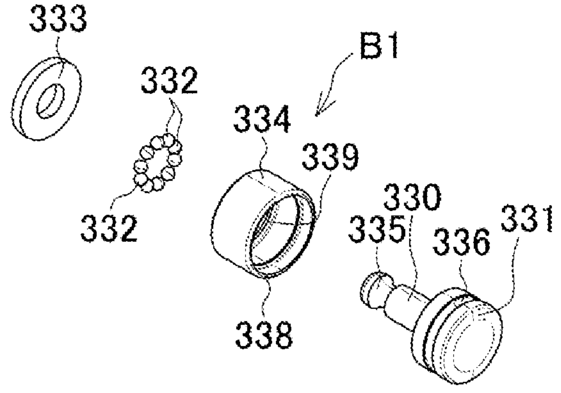
FIG. 31B is an exploded perspective view of the nailing bit.

The vibration drill mode allows nailing with a nailing bit. As shown in FIGS. 31A and 31B, a nailing bit B1 includes a shaft 330, a head 331, multiple balls 332, a washer 333, and a rubber sleeve 334.

The shaft 330 is inserted into the bit insertion hole 315 in the same manner as the normal bit B. The shaft 330 is circular in cross section, instead of being regular hexagonal. Thus, the shaft 330 is held rotatably in the bit insertion hole 315. The rear end of the shaft 330 includes a narrow portion 335. The narrow portion 335 engaged with the balls 318 in the ball housings 317 when inserted in the bit insertion hole 315.

The head 331 is integral with the shaft 330. The head 331 is circular and has a large diameter, with the front end being flat excluding the outer periphery. The head 331 has an annular fitting groove 336 on its front outer circumference. The head 331 has an annular recess 337 on its rear surface at the base of the shaft 330. The balls 332 are fitted in the annular recess 337.

The shaft 330 is placed through the washer 333 behind the head 331. The washer 333 receives the balls 332.

The rubber sleeve 334 extends externally between the head 331 and washer 333. The rubber sleeve 334 has a front smaller diameter end 338 and a rear smaller diameter end 339. The smaller diameter ends 338 and 339 are folds toward the middle. The front smaller diameter end 338 is fitted in the fitting groove 336 on the head 331. The rear smaller diameter end 339 is fitted to the rear end of the washer 333. Thus, the washer 333 is connected to the head 331 while being in contact with the balls 332.

The shaft 330 of the nailing bit B1 is inserted into the bit insertion hole 315 in the same manner as for the bit B. The balls 318 in the ball housings 317 then engage with the narrow portion 335 to prevent the shaft 330 from slipping off. At the same time, the washer 333 comes into contact with the front end surface of the anvil 8. In this state, the rear end of the head 331 is not in contact with the washer 333.

To drive a nail, the front end surface of the head 331 is placed into contact with the head of the nail. The impact driver 1 is then actuated in the vibration drill mode. The vibration in the front-rear direction occurring in the anvil 8 is transmitted to the nail through the head 331. Thus, pushing the impact driver 1 forward drives the nail into the workpiece. In this state, the washer 333 may be rotated by the rotation of the anvil 8. However, the balls 332 between the head 331 and the washer 333 restrict transmission of the rotation without rotating the head 331.

This nailing bit B1 can be attached to impact drivers or power tools (power tools having a vibration mode and a hexagonal hole in the final output shaft for bit attachment and detachment) other than the mechanical four-mode impact driver in the above embodiment.

REFERENCE SIGNS LIST

1 impact driver
2 main body
3 handle
4 motor
5 actuator unit
6 mode change ring
7 hammer case
8 anvil
9 speed switching dial
10 body housing
11 rear cover
12 body
13 grip
25 controller
30 cap
31 screw reception
53 rotational shaft
60 rear gear case
61 front gear case
74 input gear
75 reducer
76 striker
77 vibrator
78 linkage switcher
80A to 80C planetary gear
81A to 81C internal gear
85 rear carrier
106 speed switching supporter
110 speed switching plate
114 speed switching ring
120 face gear ring
126 upper gear
130 front carrier
145 speed switching wire
151 speed switching gear
153 speed switching holder
165 spindle
166 inner hammer
167 outer hammer
168 hammer sleeve
169 outer coil spring
170 inner coil spring
216 connecting ball
230 front cam
231 rear cam
234 vibration switching plate
280 mode change lever
285 mode change shifter
295 linkage winder
301 linkage bar
305 linkage cam
B bit
B1 nailing bit

What is claimed is:

1. A power tool, comprising:
a motor;
a reducer configured to reduce rotation from the motor, the reducer including
at least two stages of internal gears aligned in an axial direction,
a preceding planetary gear in a preceding stage,
a succeeding planetary gear in a succeeding stage adjacent to the preceding planetary gear in the axial direction, the preceding planetary gear and the succeeding planetary gear being configured to revolve within and engage the internal gears, and
at least two stages of gear carriers aligned in the axial direction, a gear carrier of the gear carriers supporting the preceding planetary gear and the succeeding planetary gear radially overlapping with a single pin; and
an actuator configured to be actuated by the rotation reduced by the reducer, wherein:
the preceding planetary gear includes a gear section adjacent to and overlapping the succeeding planetary gear in the axial direction and a bearing section extending from the gear section in the axial direction; and
the succeeding planetary gear is mounted on and around the bearing section such that (i) the bearing section is inside the succeeding planetary gear and (ii) the succeeding planetary gear and the bearing section overlap in a radial direction that is perpendicular to the axial direction.

2. The power tool according to claim 1, wherein
a bearing is between the bearing section and the pin.

3. The power tool according to claim 2, wherein
the bearing includes a needle bearing.

4. The power tool according to claim 1, wherein
the internal gears include a preceding internal gear in the preceding stage meshing with the preceding planetary gear and a succeeding internal gear in the succeeding stage meshing with the succeeding planetary gear,
the preceding internal gear and the succeeding internal gear are adjacent in the axial direction,
the reducer includes a seal between a facing surface of the preceding internal gear and a facing surface of the succeeding internal gear,
the preceding internal gear includes a first flange protruding radially inward at an end opposite to the facing surface of the preceding internal gear, and
the succeeding internal gear includes a second flange protruding radially inwardly at an end opposite to the facing surface of the succeeding internal gear.

5. The power tool according to claim 4, wherein
the preceding internal gear and the succeeding internal gear are rotatable, and
the power tool further comprises a rotation restrictor configured to selectively restrict rotation of the preceding internal gear and the succeeding internal gear.

6. The power tool according to claim 5, wherein
the rotation restrictor includes
an engagement member (i) radially outward from the preceding internal gear and the succeeding internal gear and (ii) being switchable between a first position and a second position, and
an operation unit operable to switch the engagement member selectively to either the first position or the second position, and the engagement member, the preceding internal gear and the succeeding internal gear are configured such that:

the engagement member is engaged with the preceding internal gear and configured to restrict rotation of the preceding internal gear when the engagement member is in the first position; and the engagement member is engaged with the succeeding internal gear and configured to restrict rotation of the succeeding internal gear when the engagement member is in the second position.

7. The power tool according to claim 6, wherein the engagement member has a middle portion that is supported and two ends that are swingable, a first end of the two ends is engaged with an outer circumference of the preceding internal gear when the engagement member is in the first position, and a second end of the two ends is engaged with an outer circumference of the succeeding internal gear when the engagement member is in the second position.

8. The power tool according to claim 6, further comprising a plurality of the engagement members.

9. The power tool according to claim 8, wherein the plurality of engagement members are point symmetric about an axis of the preceding internal gear and the succeeding internal gear.

10. The power tool according to claim 6, wherein each of the preceding internal gear and the succeeding internal gear includes a plurality of engagement ribs at predetermined intervals circumferentially on an outer circumference, the plurality of engagement ribs extend in the axial direction, and two ends of the engagement member include engagement parts circumferentially engaged with the plurality of engagement ribs.

11. The power tool according to claim 10, wherein the engagement parts are curled.

12. The power tool according to claim 2, wherein the internal gears include a preceding internal gear in the preceding stage meshing with the preceding planetary gear and a succeeding internal gear in the succeeding stage meshing with the succeeding planetary gear, the preceding internal gear and the succeeding internal gear are adjacent to in the axial direction, the reducer includes a seal between a facing surface of the preceding internal gear and a facing surface of the succeeding internal gear, the preceding internal gear includes a first flange protruding radially inward at an end opposite to the facing surface of the preceding internal gear, and the succeeding internal gear includes a second flange protruding radially inward at an end opposite to the facing surface of the succeeding internal gear.

13. The power tool according to claim 3, wherein the internal gears include a preceding internal gear in the preceding stage meshing with the preceding planetary gear and a succeeding internal gear in the succeeding stage meshing with the succeeding planetary gear, the preceding internal gear and the succeeding internal gear are adjacent in the axial direction, the reducer includes a seal between a facing surface of the preceding internal gear and a facing surface of the succeeding internal gear, the preceding internal gear includes a first flange protruding radially inward at an end opposite to the facing surface of the preceding internal gear, and the succeeding internal gear includes a second flange protruding radially inward at an end opposite to the facing surface of the succeeding internal gear.

14. The power tool according to claim 1, wherein the preceding planetary gear is independently rotatable with respect to the succeeding planetary gear.

15. The power tool according to claim 1, wherein a longitudinal axis of the single pin is a co-axial with an axis of rotation of the preceding planetary gear and the succeeding planetary gear.

16. A power tool, comprising:

a motor;

a reducer configured to reduce rotation from the motor, the reducer including at least two stages of internal gears aligned in an axial direction, a preceding planetary gear in a preceding stage, a succeeding planetary gear in a succeeding stage adjacent to the preceding planetary gear in the axial direction, the preceding planetary gear and the succeeding planetary gear being configured to revolve within and engage the internal gears, and at least two stages of gear carriers aligned in the axial direction, a gear carrier of the gear carriers supporting the preceding planetary gear and the succeeding planetary gear radially overlapping with a single pin; and an actuator configured to be actuated by the rotation reduced by the reducer, wherein the internal gears include a preceding internal gear in the preceding stage meshing with the preceding planetary gear and a succeeding internal gear in the succeeding stage meshing with the succeeding planetary gear, the preceding internal gear and the succeeding internal gear are adjacent in the axial direction, the reducer includes a seal between a facing surface of the preceding internal gear and a facing surface of the succeeding internal gear, the preceding internal gear includes a first flange protruding radially inward at an end opposite to the facing surface of the preceding internal gear, the succeeding internal gear includes a second flange protruding radially inward at an end opposite to the facing surface of the succeeding internal gear, the preceding internal gear and the succeeding internal gear are rotatable, the power tool further comprises a rotation restrictor configured to selectively restrict rotation of the preceding internal gear and the succeeding internal gear, the rotation restrictor includes:

an engagement member (i) radially outward from the preceding internal gear and the succeeding internal gear and (ii) being switchable between a first position and a second position; and an operation unit operable to switch the engagement member selectively to either the first position or the second position, the engagement member, the preceding internal gear and the succeeding internal gear are configured such that:

the engagement member is engaged with the preceding internal gear and configured to restrict rotation of the preceding internal gear when the engagement member is in the first position; and the engagement member is engaged with the succeeding internal gear and configured to restrict rotation of the succeeding internal gear when the engagement member is in the second position, the engagement member has a middle portion that is supported and two ends that are swingable, a first end of the two ends is engaged with an outer circumference of the preceding internal gear, when the engagement member is in the first position, a second end of the two ends is engaged with an outer circumference of the succeeding internal gear when the engagement member is in the second position, the reducer is housed in a cylindrical case, and the operation unit includes an annular member rotatably on an outer circumference of the case and including a first pressing portion and a second pressing portion alternating circumferentially, the first pressing portion being configured to press the first end of the engagement member from outside in a radial direction of the case to switch the engagement member to the first position, the second pressing portion being configured to press the second end of the engagement member from outside in the radial direction to switch the engagement member to the second position, and a rotational operation member configured to rotate the annular member on the outer circumference of the case by a predetermined angle.

17. The power tool according to claim 16, wherein the annular member includes a plurality of teeth continuously in a circumferential direction, and the rotational operation member integrally includes a gear meshing with the plurality of teeth.

18. The power tool according to claim 17, wherein the annular member integrally includes a gear ring including the plurality of teeth.

19. The power tool according to claim 16, wherein the annular member includes a frame meandering circumferentially with the first pressing portion and the second pressing portion protruding in the axial direction in a staggered manner.

20. The power tool according to claim 17, wherein the annular member includes a frame meandering circumferentially with the first pressing portion and the second pressing portion protruding in the axial direction in a staggered manner.

* * * * *